United States Patent [19]

Sasser et al.

[11] Patent Number: 4,904,994
[45] Date of Patent: Feb. 27, 1990

[54] APPARATUS AND METHOD FOR IDENTIFYING NEXT MATRICES FOR VECTOR DRAWING

[75] Inventors: Carey J. Sasser, Itasca, Ill.; Vahid A. Samiee, Tualatin, Oreg.

[73] Assignee: Auto-trol Technology Corporation, Denver, Colo.

[21] Appl. No.: 94,469

[22] Filed: Sep. 8, 1987

[51] Int. Cl.[4] ............................................... G09G 1/14
[52] U.S. Cl. ..................................... 340/744; 340/747
[58] Field of Search ............... 340/739, 722, 747, 744, 340/723, 745, 746

[56] References Cited

U.S. PATENT DOCUMENTS

| | | | |
|---|---|---|---|
| 3,130,397 | 4/1964 | Simmons | 340/746 |
| 3,778,811 | 12/1973 | Gicca et al. | 340/324 |
| 3,781,850 | 12/1973 | Gicca et al. | 340/722 |
| 3,906,480 | 9/1975 | Schwartz et al. | 340/739 |
| 3,925,776 | 12/1975 | Swallow | 340/324 |
| 4,107,780 | 8/1978 | Grimsdale et al. | 364/521 |
| 4,254,467 | 3/1981 | Davis et al. | 364/521 |
| 4,458,330 | 7/1984 | Imsand et al. | 364/900 |
| 4,607,340 | 8/1986 | Nagai | 364/521 |
| 4,609,918 | 9/1986 | Nakanishi et al. | 340/722 |
| 4,615,012 | 9/1986 | Arazu et al. | 340/739 |
| 4,648,049 | 3/1987 | Dines et al. | 340/723 |
| 4,677,575 | 6/1987 | Redin | 364/521 |
| 4,698,768 | 10/1987 | Thuy et al. | 364/521 |
| 4,731,606 | 3/1988 | Bantz et al. | 340/709 |
| 4,816,814 | 3/1989 | Lumelsky | 340/744 |

OTHER PUBLICATIONS

Crow and Howard, "A Frame Buffer System with Enhanced Functionality," Computer Graphics, vol. 15, No. 3, (Aug. 1981), pp. 63–69.

Foley and VanDam, Fundamentals of Interactive Computer Graphics, (Addison Wesley, 1982), Chapter 11, Raster Algorithms and Software, pp. 431–478.

*Primary Examiner*—Gerald Brigance
*Assistant Examiner*—Richard Hjerpe
*Attorney, Agent, or Firm*—Rothgerber, Appel, Powers & Johnson

[57] ABSTRACT

A system to convert vector data to pixel data for drawing a vector on display screen that is divided into groups of pixels (matrices) having selected numbers of pixels in the x and y coordinate directions. The vector data is processed to define the slope of the vector and the number of matrices in the x and y directions the vector extends through. Counters are set to such numbers. Starting with the first matrix in which one end of the vector is located, a circuit defines which pixels must be enabled to draw the vector through that matrix. According to the location of the vector relative to decision points in the first matrix, a circuit identifies the next matrix through which the vector extends and causes the counter to count. This continues until the last matrix is identified and the pixels therein are enabled. An additional circuit masks those pixels, if any, in the first and last matrices that are beyond the end of the vector.

18 Claims, 21 Drawing Sheets

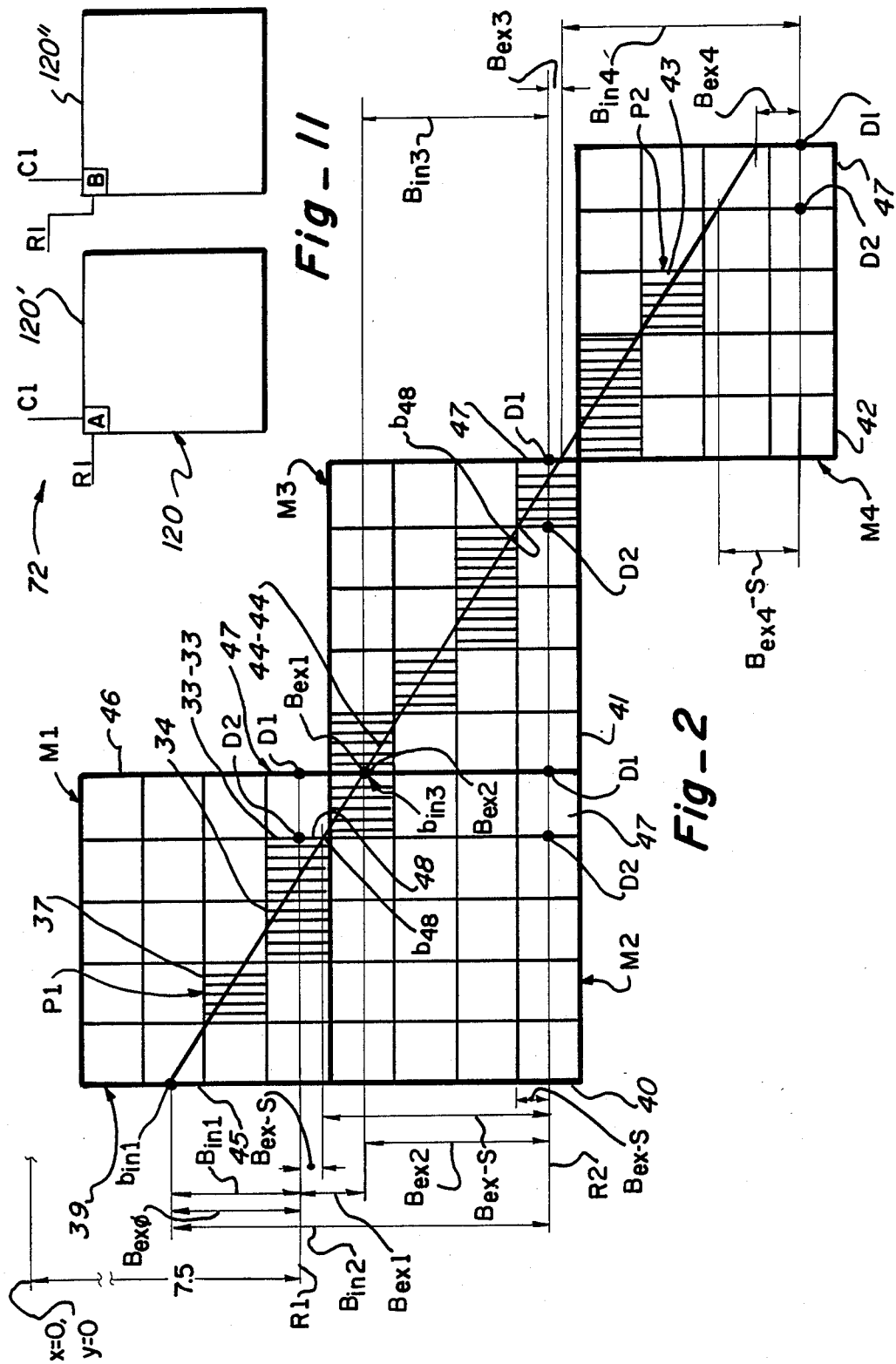

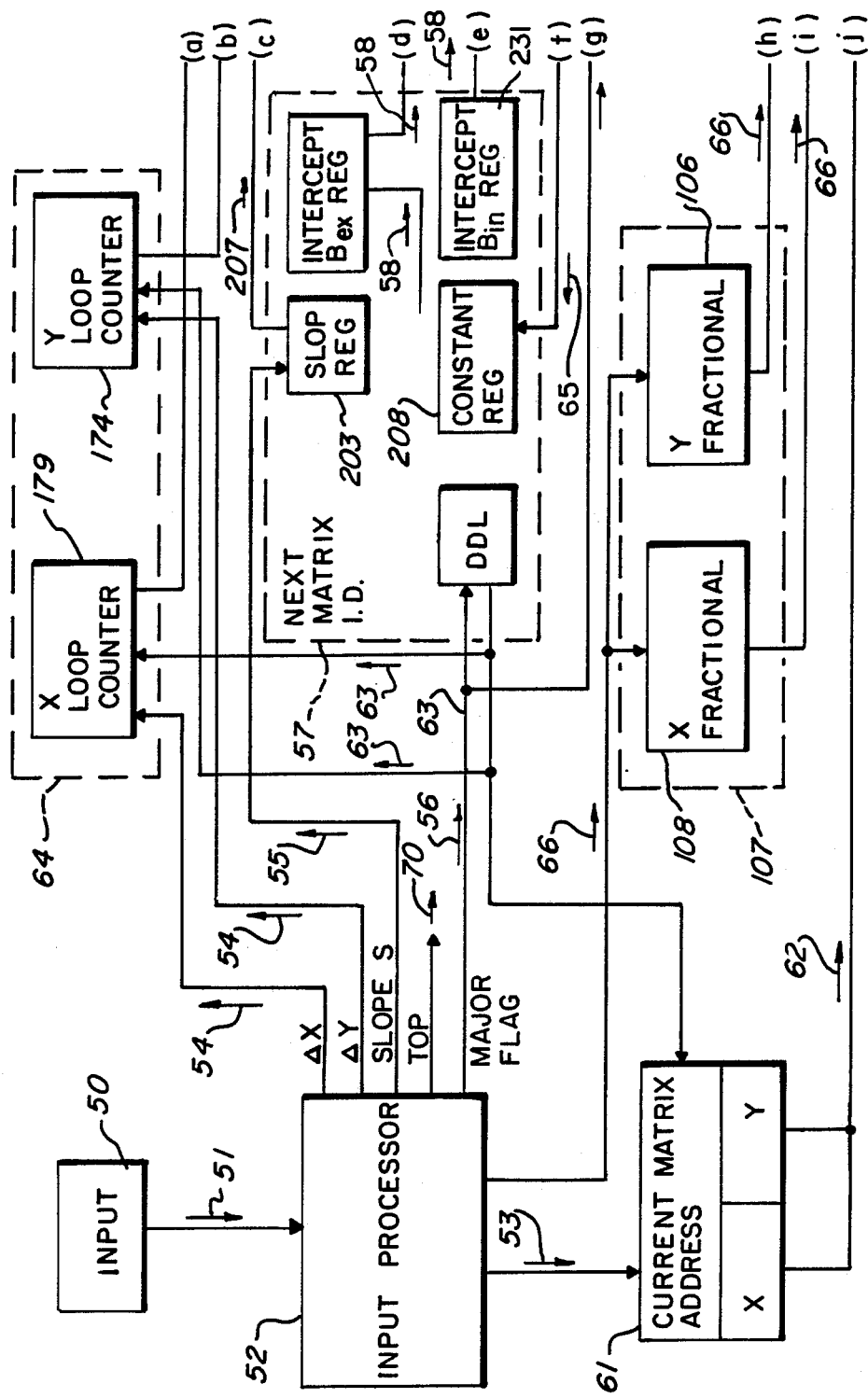
Fig_3A

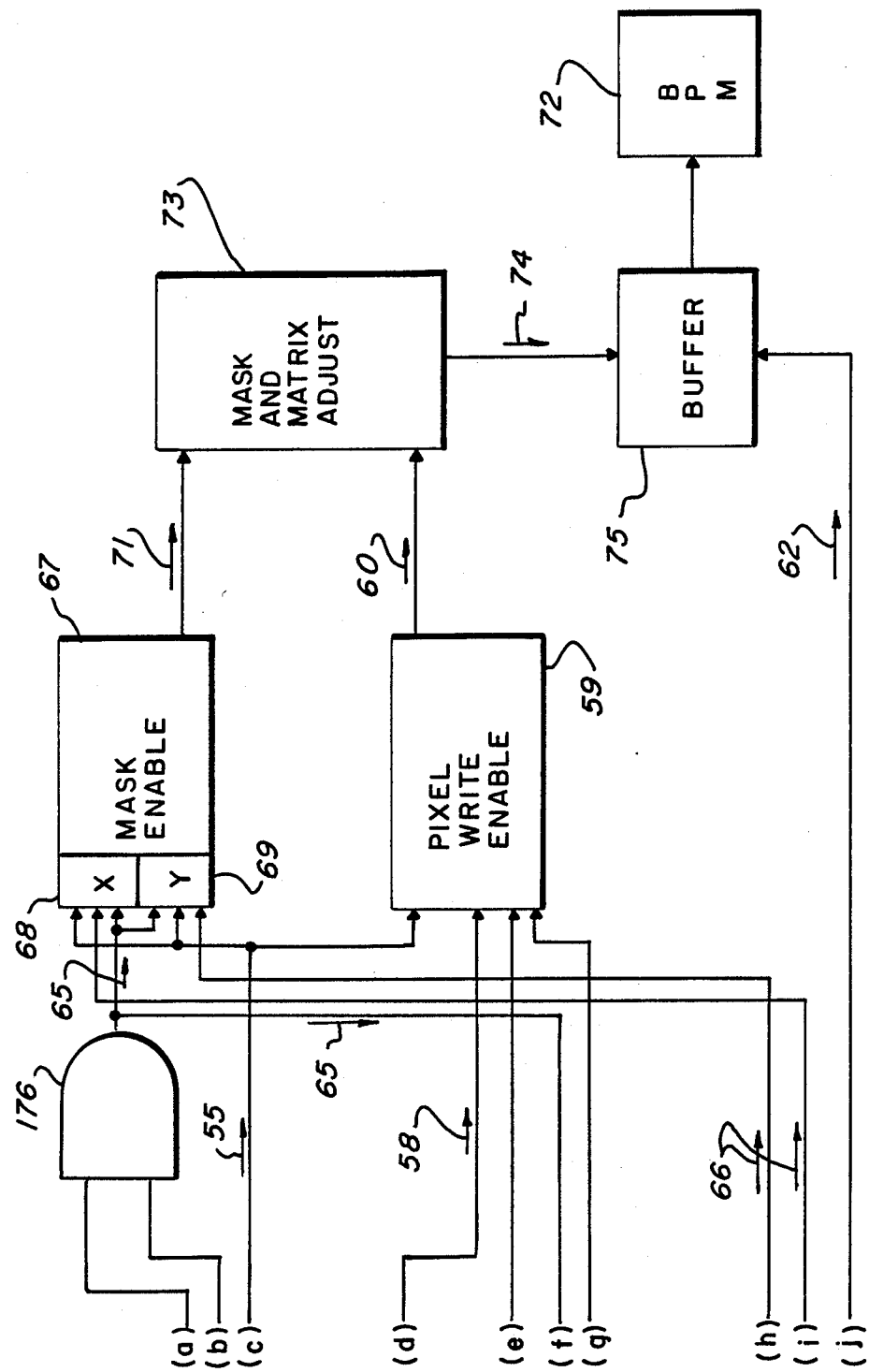

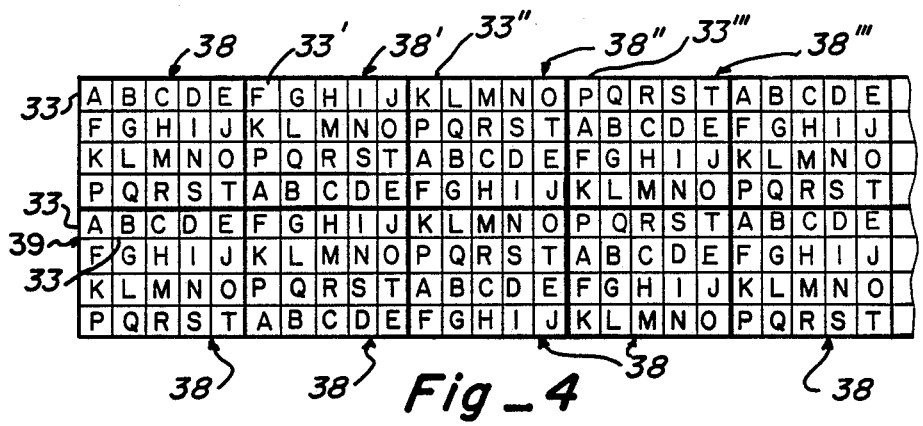
Fig_4
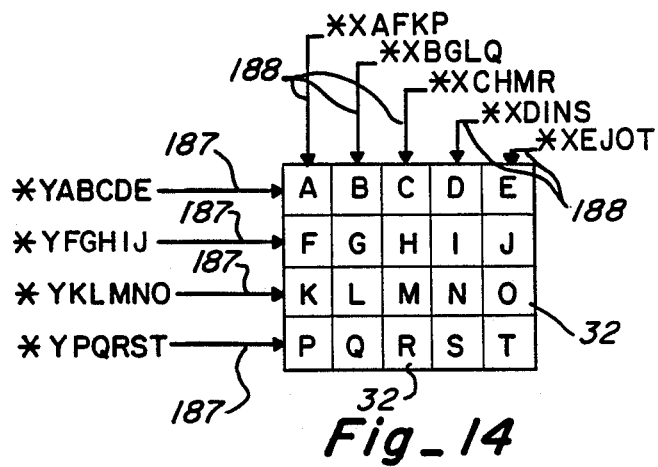
Fig_14
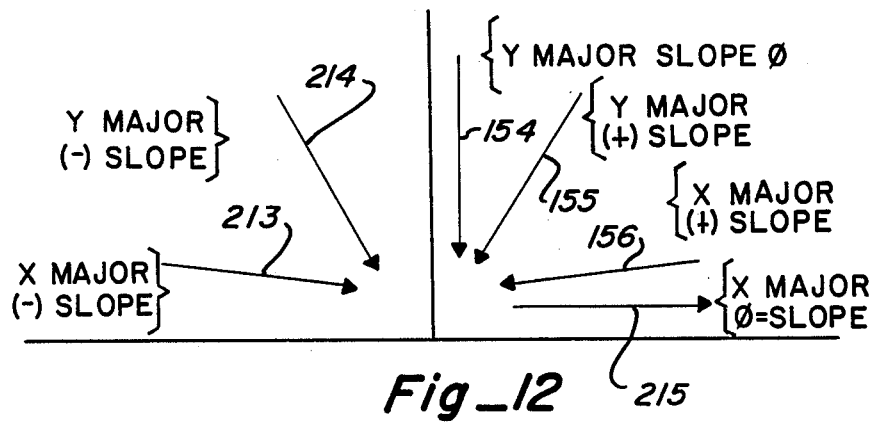
Fig_12

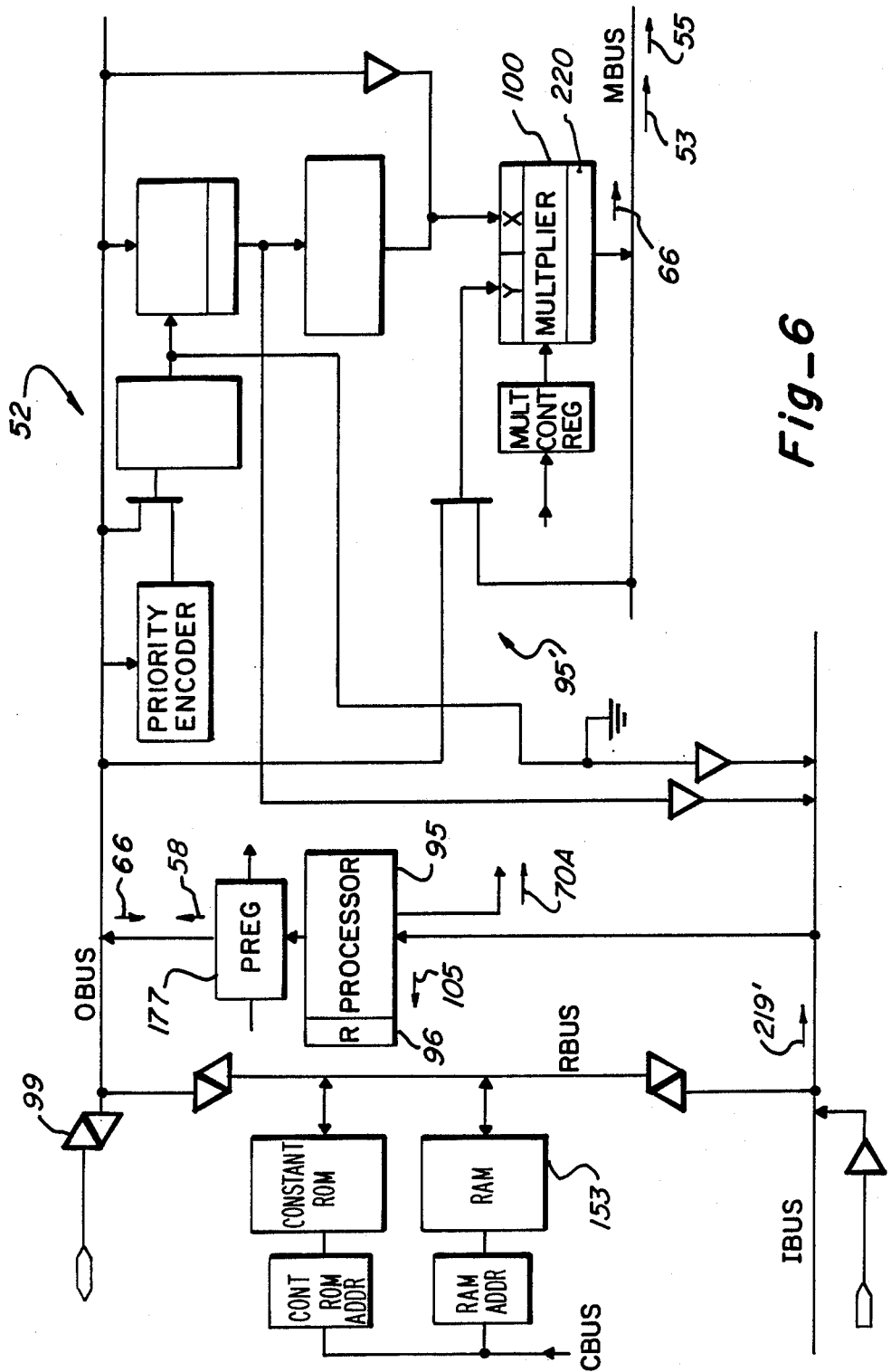

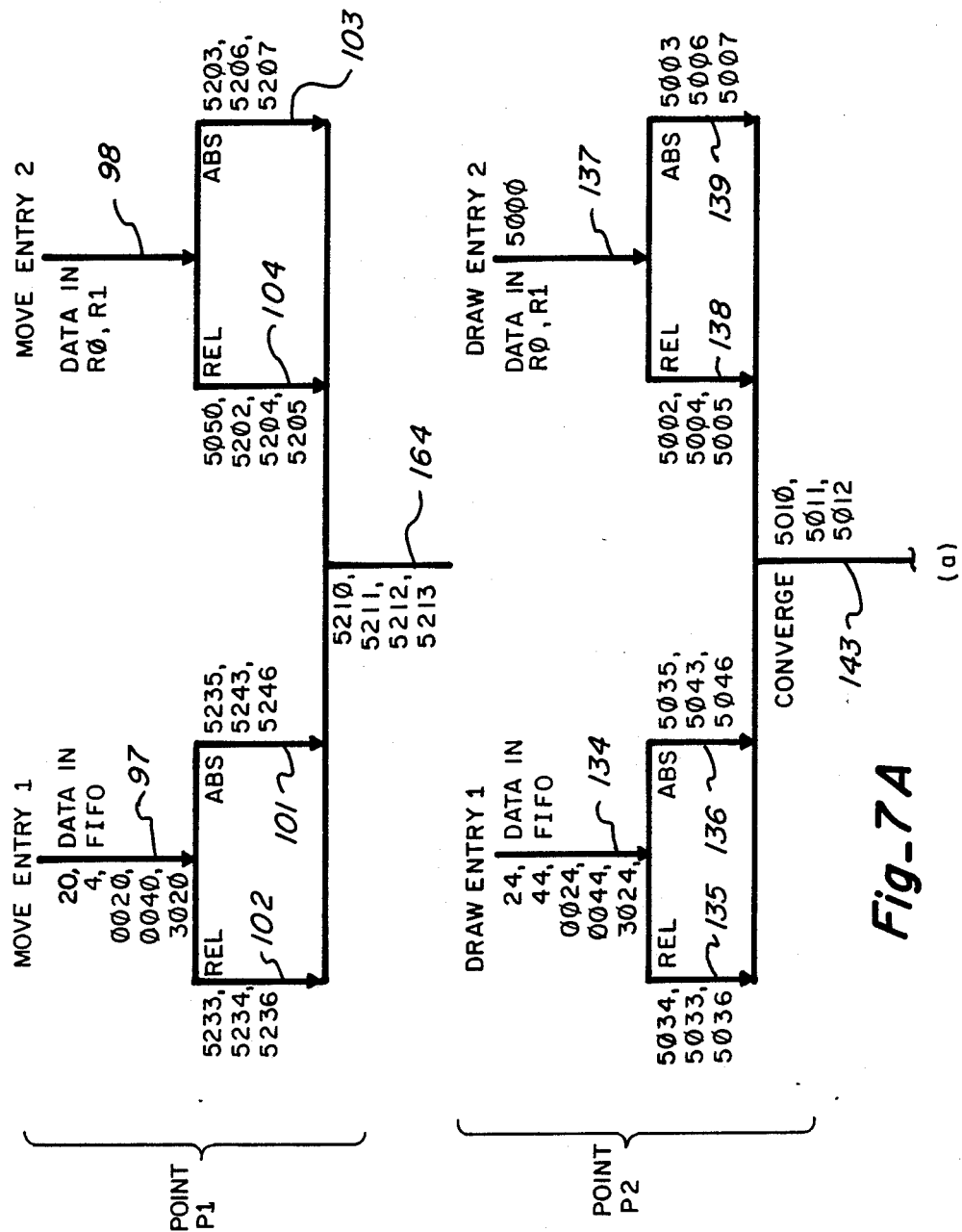

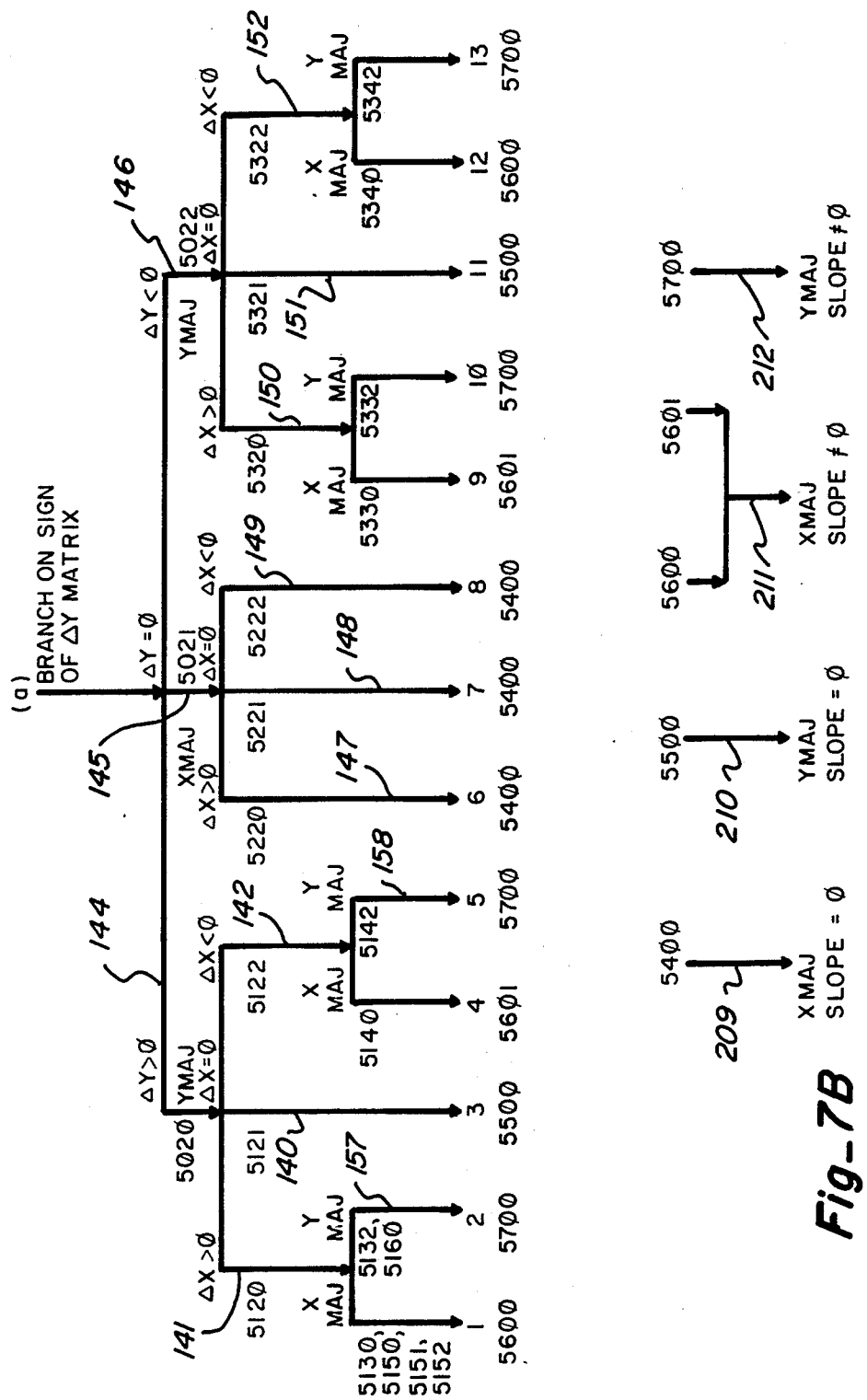
Fig_7B

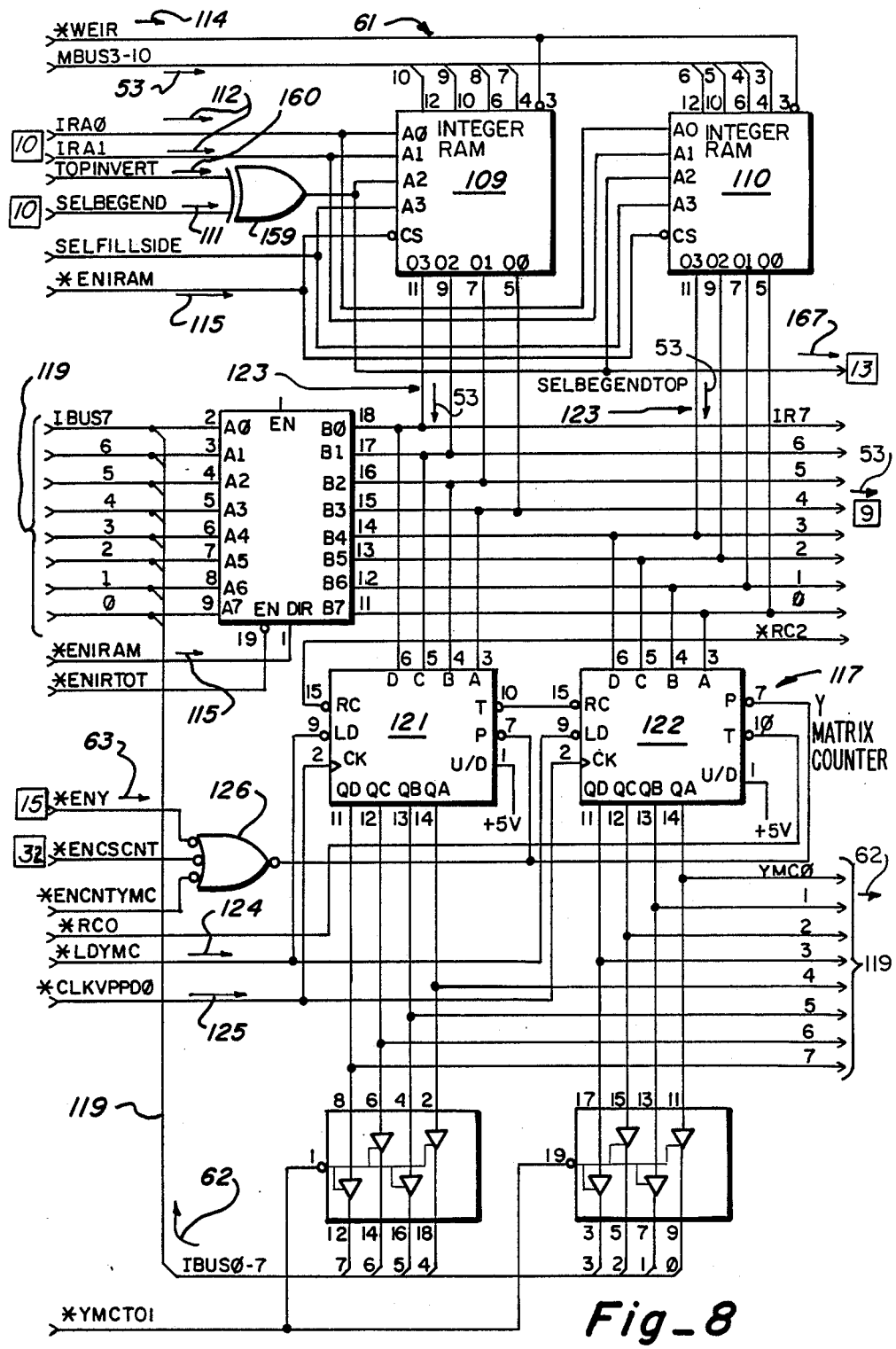
Fig_8

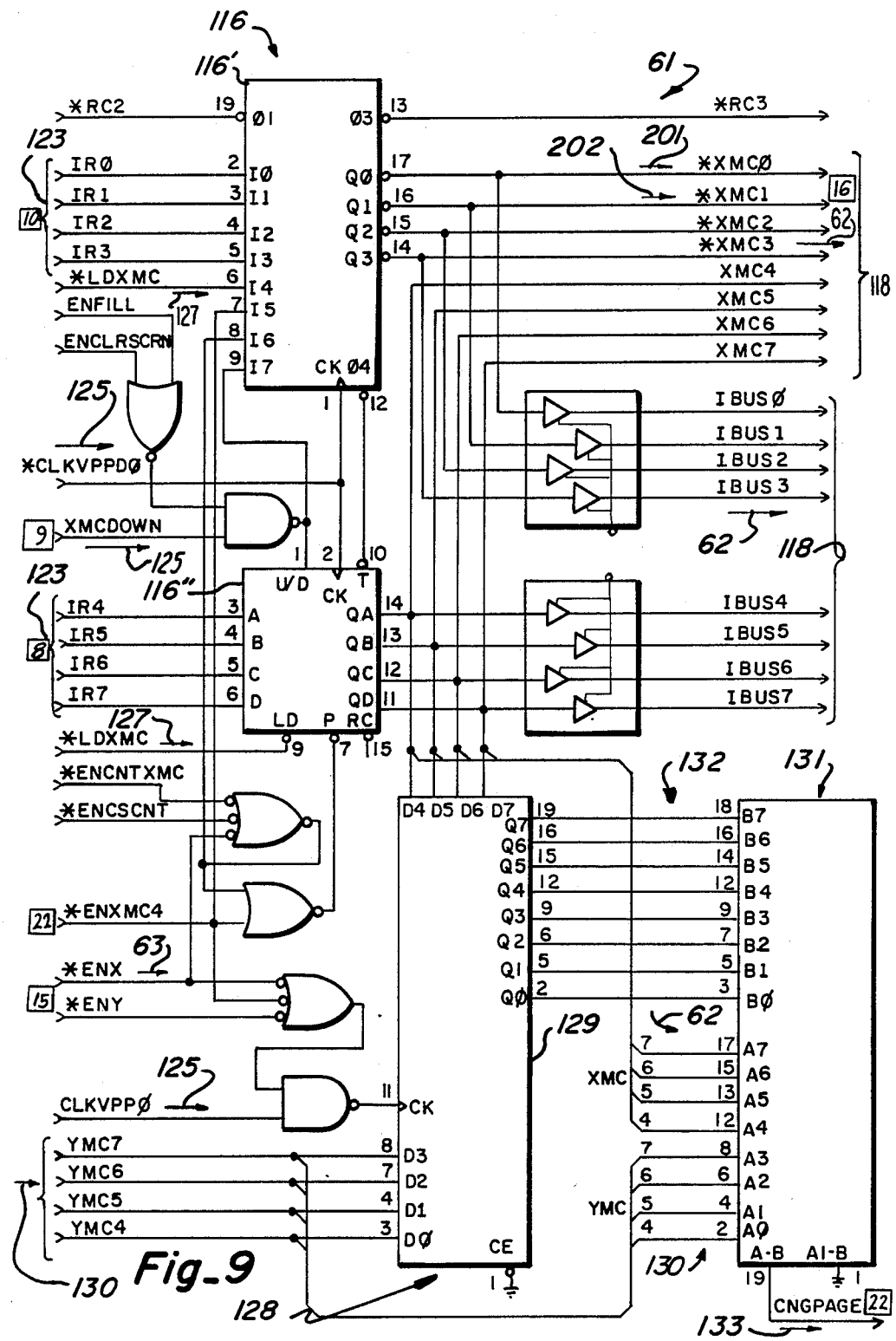
Fig_9

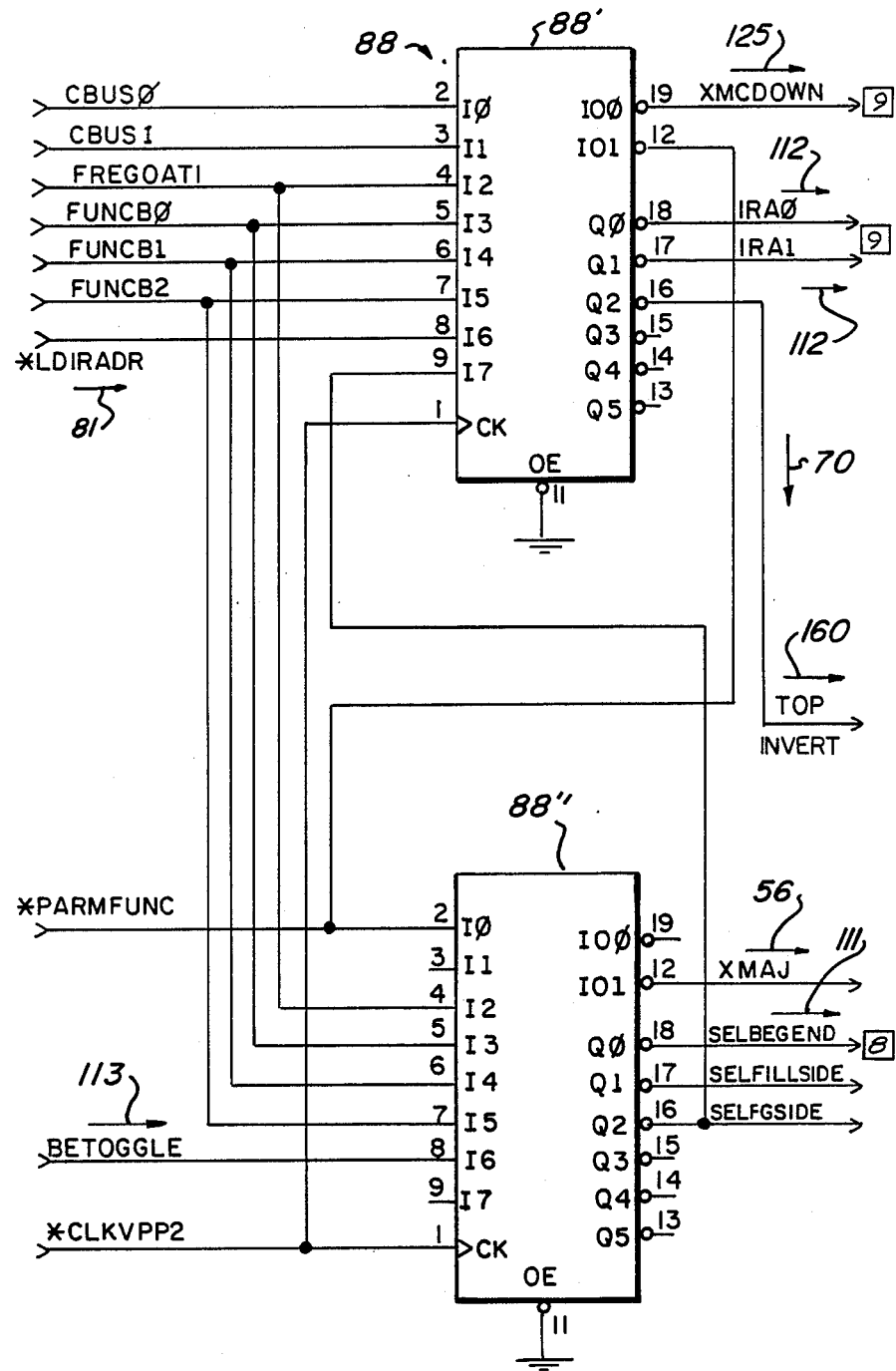
Fig_10

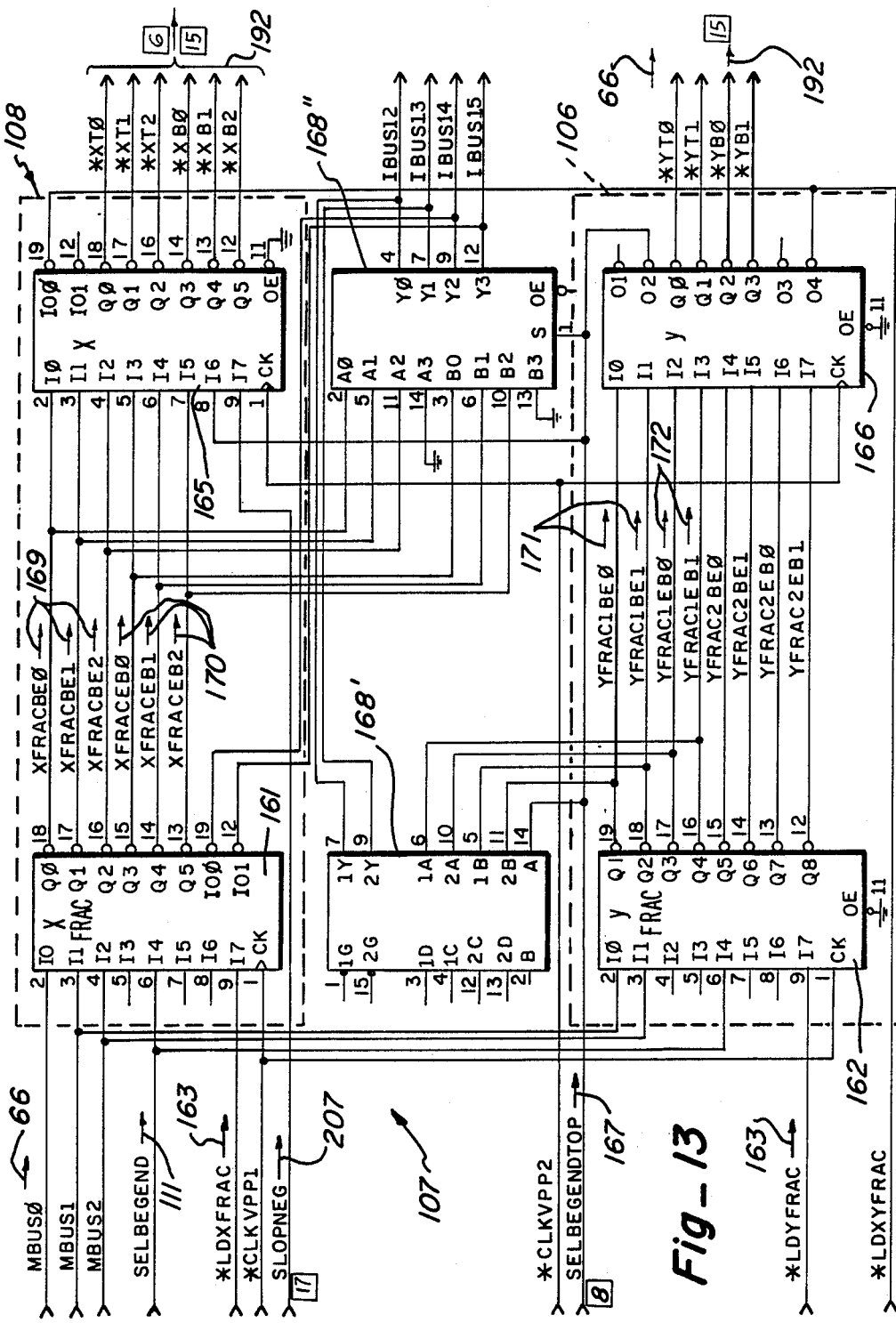
Fig_13

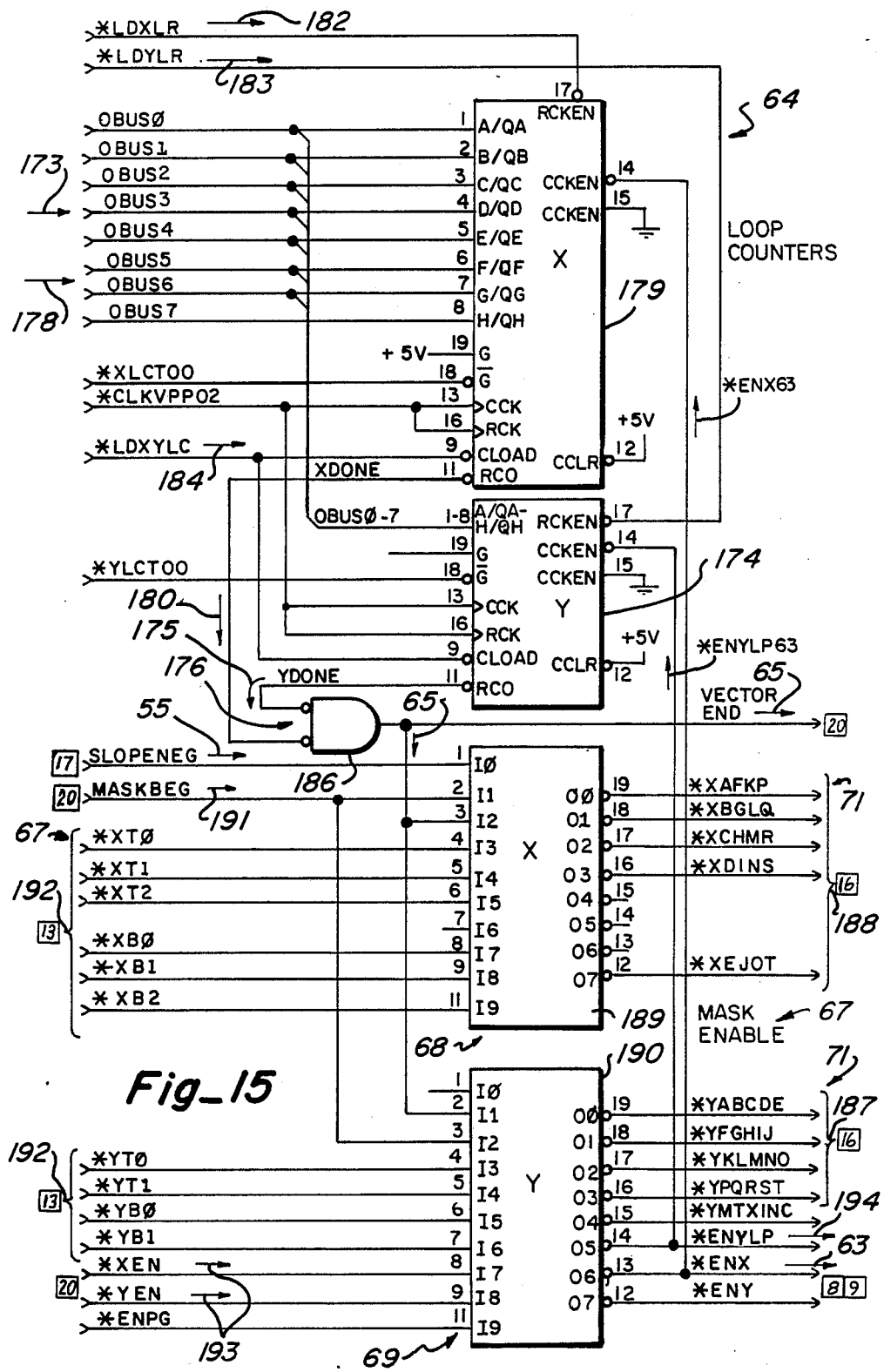
Fig_15

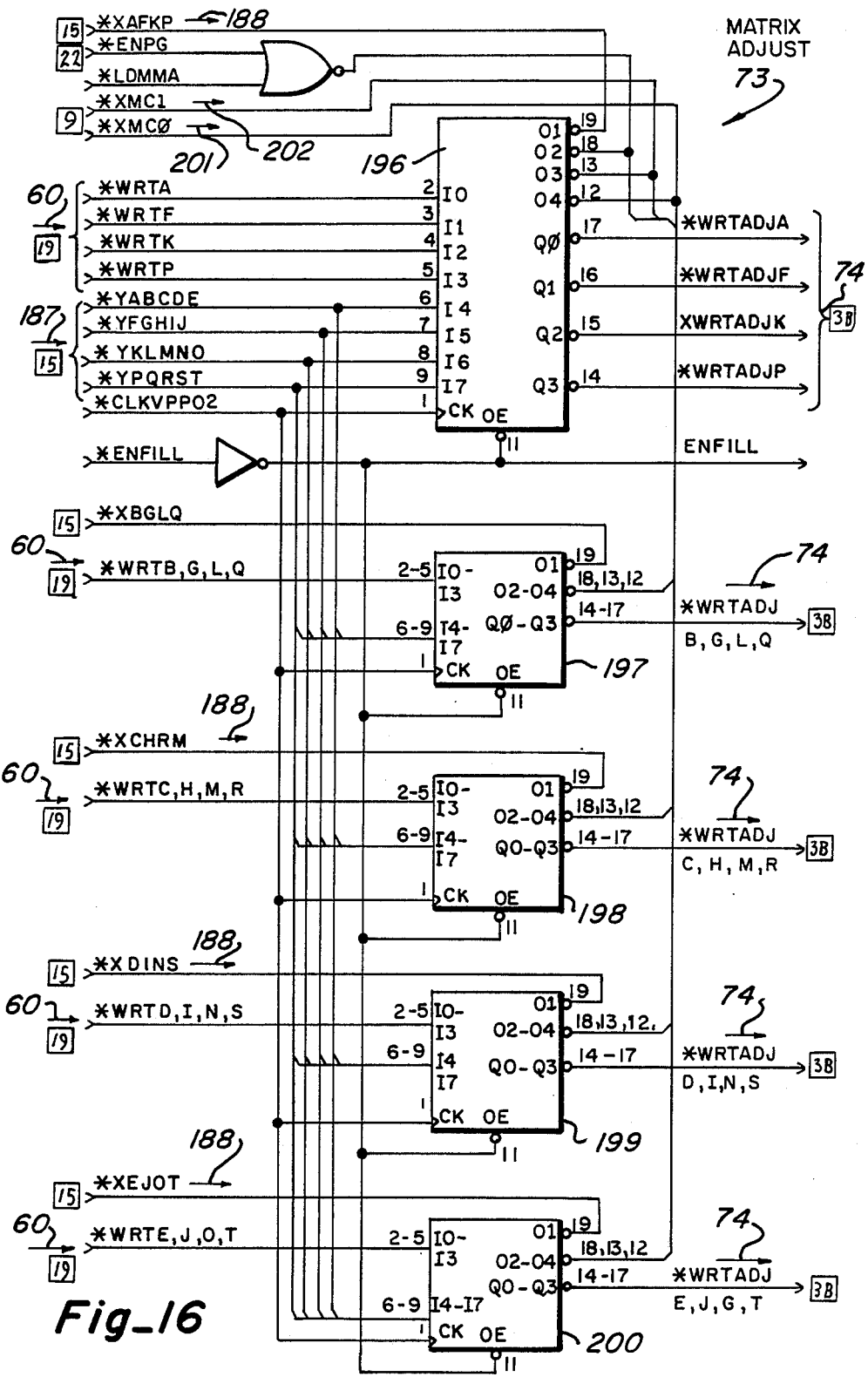
Fig_16

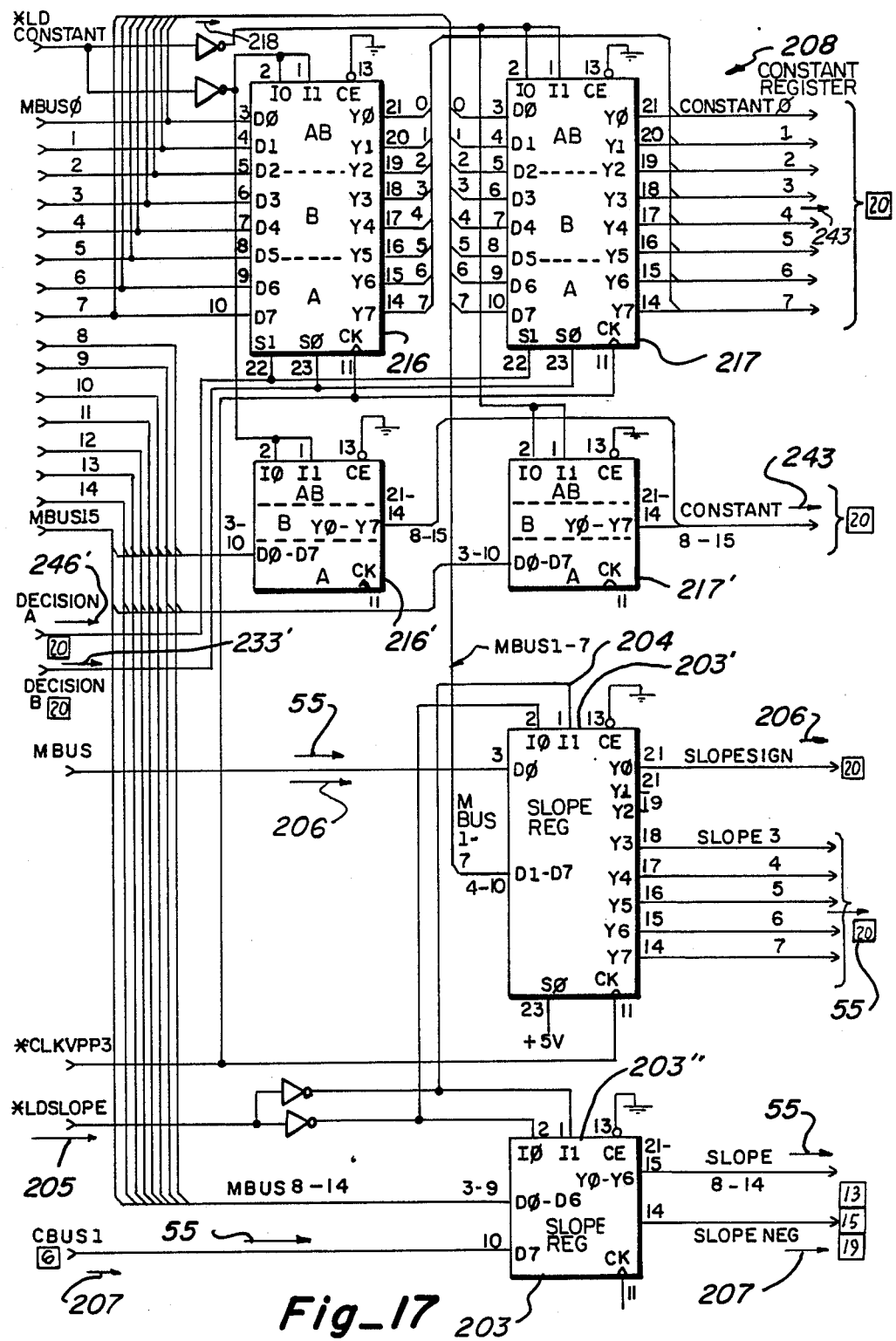
Fig_17

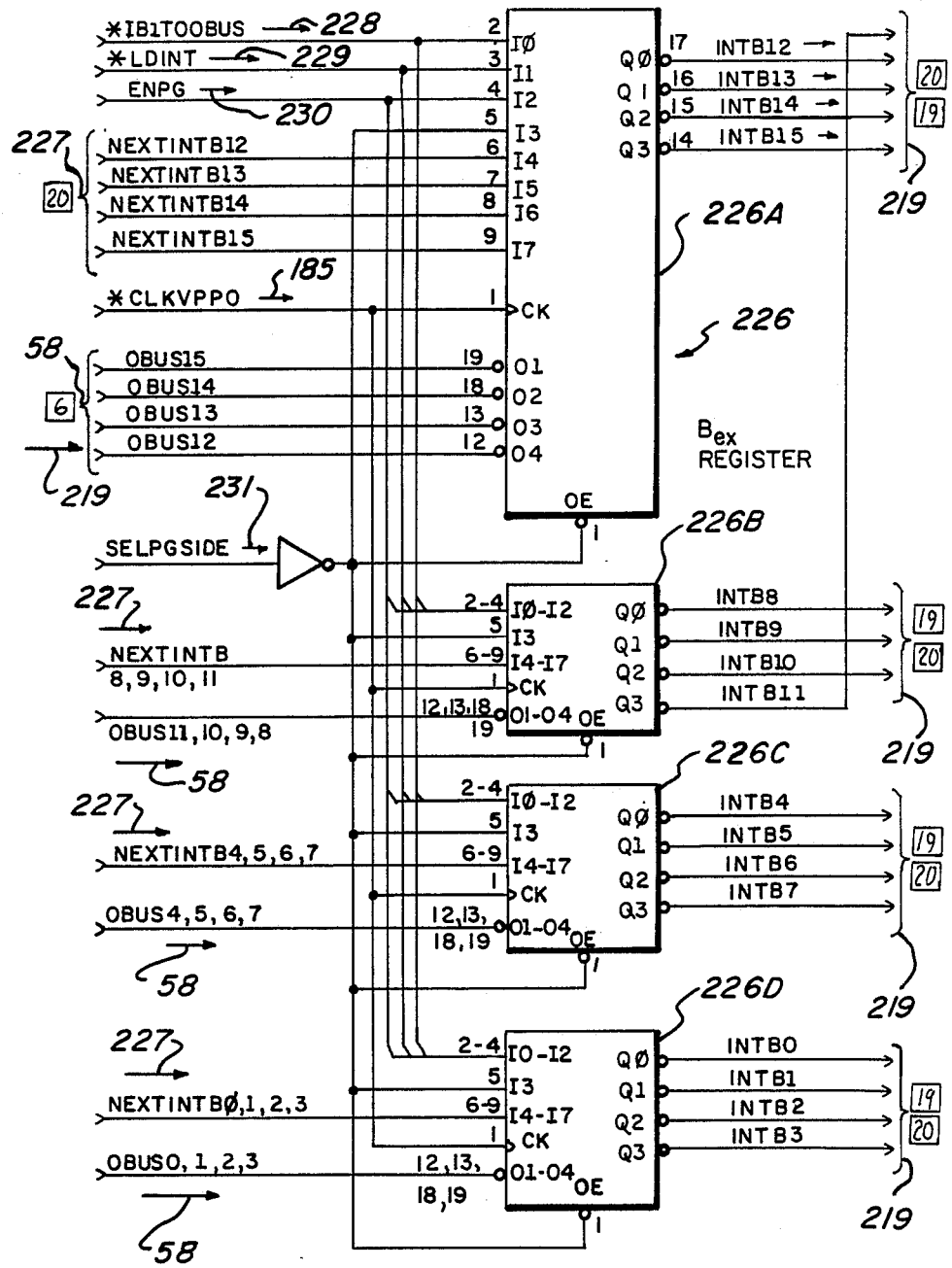
Fig_18

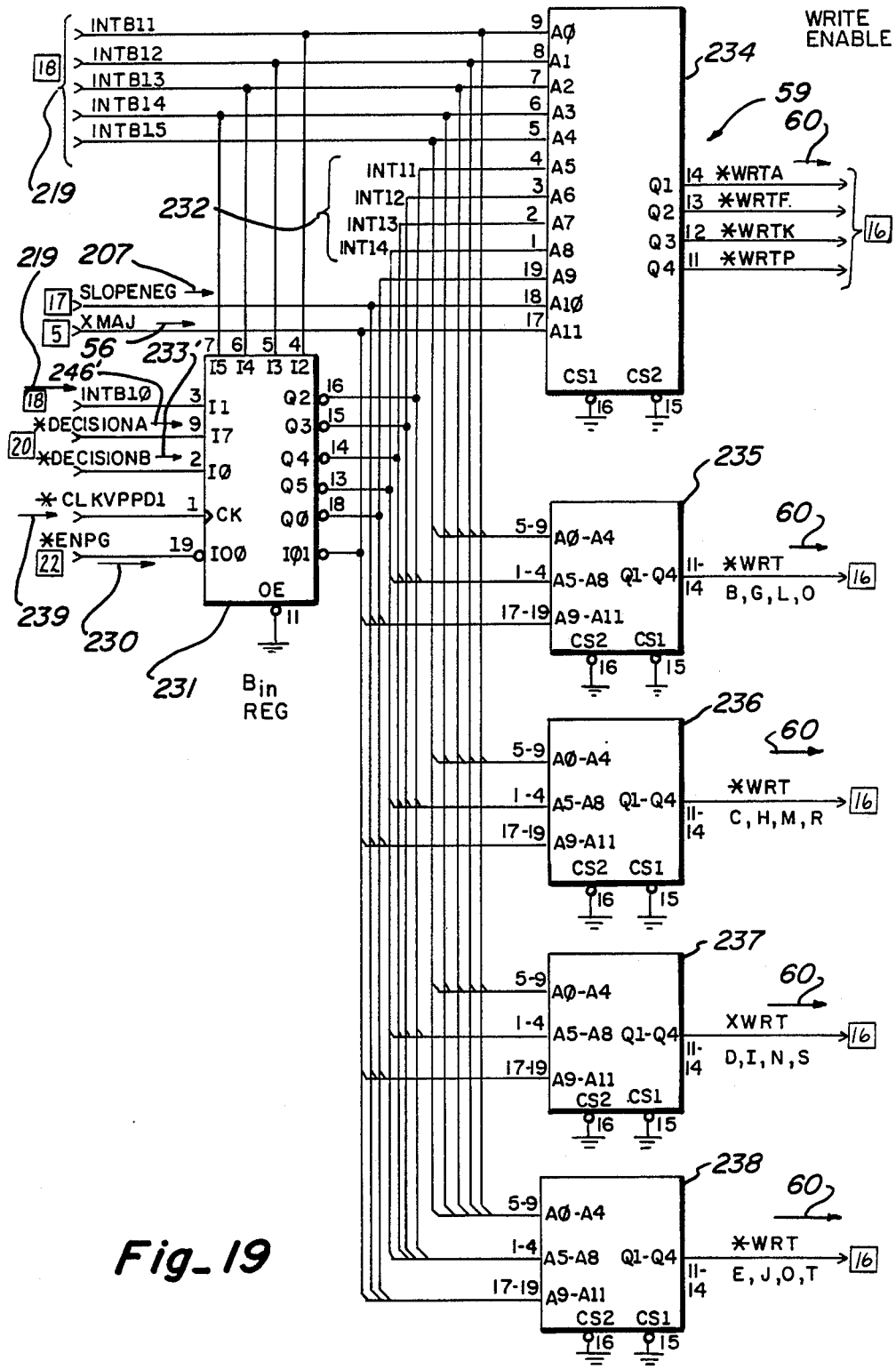
Fig_19

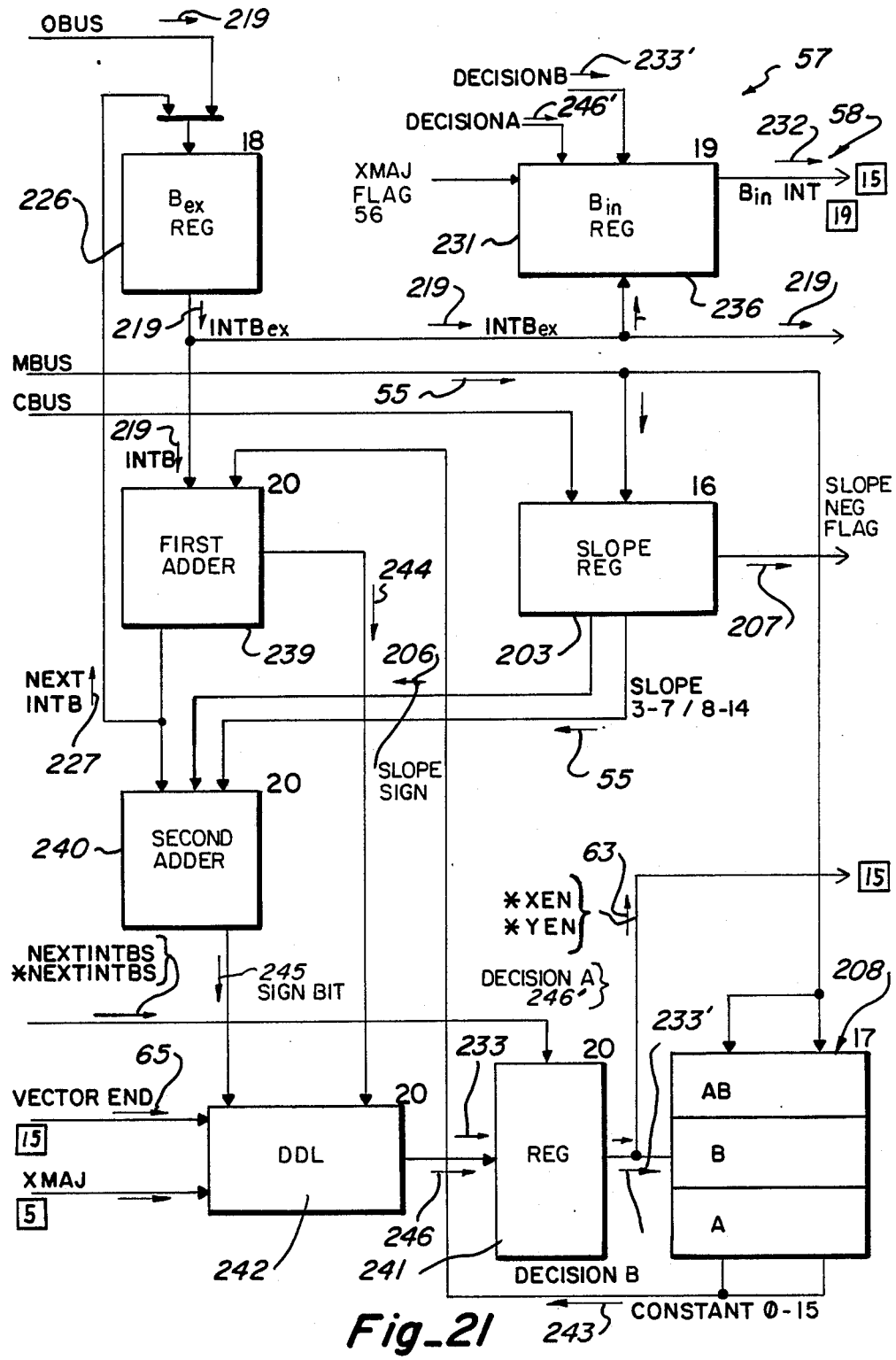
Fig_21

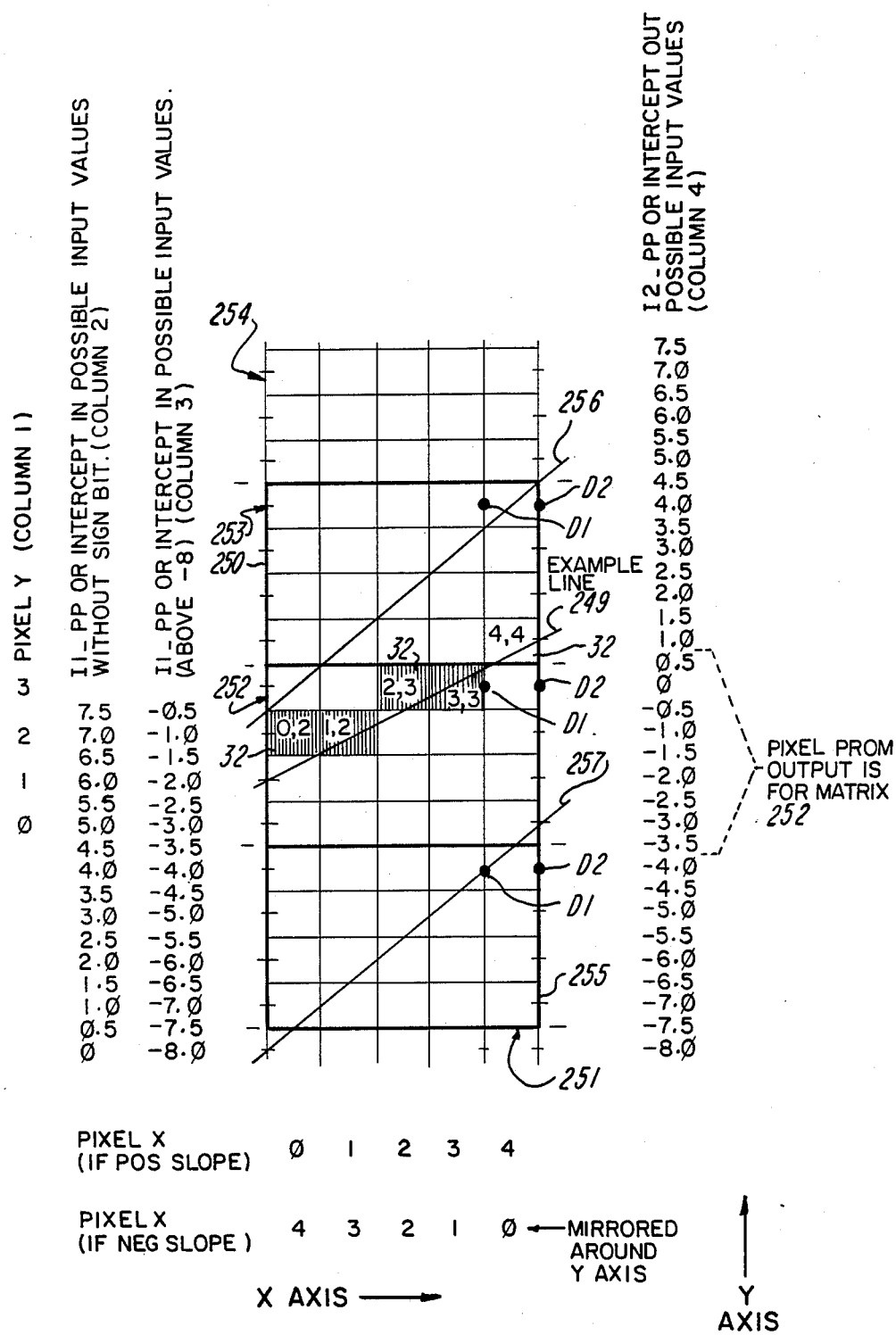
Fig_22

APPARATUS AND METHOD FOR IDENTIFYING NEXT MATRICES FOR VECTOR DRAWING

BACKGROUND OF THE INVENTION

1. Field of the Invention

The present invention relates to the field of computer graphics and more particularly to the field of displaying objects on the screen of a display device.

2. Description of the Prior Art

Computer graphics systems for displaying objects on the screen of a display device require very rapid processing of large amounts of data to enable the displayed object to be moved or shading of the surface of the object to vary with variations in the location of a source of light that is shining on the object. This need for rapid computation has resulted in reduction of the time required to specify the object to be displayed in terms of the many points or vertices that are used to define the surface of the object. With the location of such points defined, when the display device is a cathode ray tube (CRT), the next step in displaying the object is to rapidly convert such points into data indicating which picture elements ("pixels") on the screen of the CRT must be illuminated or turned ON in order to display the object. This involves the steps of processing pairs of vertices that define a line. The processing indicates which pixels on the screen must be turned ON to draw the line between the pairs of vertices. Also, because the screen may have hundreds of pixels in each of the x and y coordinate directions (such as 1280 by 1024), the data defining which pixels must be turned ON must be stored in a manner suitable for controlling the video function of the CRT. For example, when the CRT functions on a scan line by scan line basis as is customary, the manner in which the pixels of the screen are processed for drawing lines and for data storage purposes must be specially related to the scan lines so as to minimize storage requirements without reducing the speed of the scanning operation.

To achieve some of these objectives, in the past the screen of the CRT has been divided into blocks, where each block has a given row address (a DRAM row address) within a DRAM chip that stores the pixel ON data. Such blocks of the screen have been related to column addresses within the DRAM (DRAM column addresses), such as by having a given screen block for a given DRAM row address extend 128 DRAM column addresses in the x direction on the screen and two rows of screen blocks in the y direction on the screen. To reduce the number of times that a given line drawn on the screen of the CRT requires a new DRAM row address (which slows down addressing), others have related the DRAM row addresses to the screen blocks more symmetrically by providing, for a given DRAM row address, a screen block that extends in the x direction 16 columns and 16 columns in the y direction. As a result, regardless of the direction of the line, it is more likely that the line will extend through more DRAM column addresses before a new DRAM row address must be addressed.

Having reduced the number of times that a new DRAM row address is required as the line is drawn from screen block to screen block, others have then organized the pixels within a given screen block into groups, such as groups of 64 pixels formed by 8 pixels in the x direction on the screen and 8 pixels in the y direction on the screen. Others have used groups of 20 pixels formed by groups of 5 pixels in the x direction and 4 pixels in the y direction. Such group of pixels has been referred to as a "matrix". Each matrix in a given screen block has a specific DRAM column address and has the DRAM row address common to the entire screen block.

Such pixel group or matrix has been used in the past to define a unit or group of pixels that are written into the DRAM at the same time. Initially, the determination of which pixel out of the 20 pixels in such 5 by 4 matrix will be ON has been performed on a pixel-by-pixel basis using a number of machine cycles, where one machine cycle occurs for every one clock cycle of a bit slice processor, for example. Once the pixel-by-pixel determination has been completed for all of the pixels in the matrix, then the entire matrix, representing the pixels that should be ON and OFF of the group of 20 pixels, is written into the DRAM in one or more additional machine cycles. In this approach, there is no need to determine which matrix the line will extend into next (the "next matrix") during the computation of the pixels for a particular or ("current") matrix. Rather, only when the next "ON" pixel of the next matrix is identified is the next matrix identified. This occurs after the writing of the current matrix into the DRAM. In this prior method, it may be understood that it required 5 machine cycles to identify the 5 pixels that must be turned on in order to have a line completely cross a given matrix. Thus, 5 machine cycles were required to identify such 5 ON pixels and one (or more) additional cycle to write them into the DRAM.

SUMMARY OF THE INVENTION

In contrast to the prior art that required a number of machine cycles to determine which pixels within a matrix of pixels would be ON and then one or more additional cycles to write same to storage, and in which no "next matrix" determination was made during every machine cycle, the preferred embodiment of the present invention processes all of the pixels within a given matrix every machine cycle, and defines the next matrix during each machine cycle to enable rapid line drawing between points.

Line drawing apparatus and method according to the present invention reduce the time required to define the pixels that are "ON" within a given matrix of pixels so that an object may be displayed on the screen of a CRT more quickly.

The present invention also identifies, during each machine cycle after set up, that next matrix into which the line being drawn will extend as it leaves the current matrix, such that the next matrix is defined each clock cycle after set up.

Apparatus and method for drawing lines according to the present invention also simplify line drawing by using a lookup table to define the "ON" pixels in a given matrix in response to data defining the entry and exit intercepts of the matrix, whether the line is a major or minor line and the sign of the slope of the line. To assure that the same pixels are ON regardless of whether the line is drawn from a first point P1 to a second point P2 or is drawn from the second point P2 to the first point P1, the first-drawn point of a line is always defined as the top point. Thus, the lookup table is always used to provide pixel ON data for a line drawn from top to bottom, even though the second point P2 may be at the top.

Line drawing apparatus and method of the present invention also identify the first and last matrices through which a line extends. In the event that the line only partially extends through either of such matrices, a masking operation is performed to avoid turning ON those pixels that are beyond the ends of the line being drawn.

Line drawing apparatus and method of the present invention also adjust the pixel ON data according to the storage address relationship between a given pixel in a selected location in one of the matrices and the location in storage at which the pixel ON data is written for the given pixel.

With these objects in mind, the present line drawing apparatus and method include an input processor for receiving an input signal. The input signal may include a "move" signal that defines a first point P1. The input signal also may include a "draw" signal to provide an instruction that a line be drawn between the point P1 and a point P2, for example. Considering the points P1 and P2, those points identify the endmost two pixels on the screen that must be ON to display the line. The screen is divided into groups of pixels, such as rectangular groups having 5 pixels in the x direction and 4 pixels in the y direction of an x,y pixel coordinate system. The pixel that corresponds to the point P1, for example, is located in terms of what number pixel it is along the x and y axes from a 0,0 reference point or coordinate of the pixel coordinate system. The matrix in which that pixel is located on the screen is identified by multiplying the x axis pixel number by 1/5 and the y axis number by ¼. The resulting integers are the X and Y coordinates of the matrix. The resulting remainders, or fractional parts of the matrix in the x and y directions, represent the coordinates of the pixel within that matrix.

The input processor responds to the input signals and performs set-up operations. Such operations include determining the X and Y integer matrix coordinates of a first matrix (that includes the pixel or point P1) and of a last matrix (that includes the pixel or point P2). Also, the input processor determines the remainder, if any, that results from such multiplication of the x and y coordinates by 1/5 and ¼, respectively.

Integer storage receives a signal representing the integer coordinates of the first and last matrices. Fractional storage receives the fractional parts or remainders in the x and y directions. A flag indicates whether the beginning and end points are the top or bottom points. The input processor also determines whether the line is drawn from the point P1 to the point P2 or from the point P2 to the point P1 and outputs delta signals indicating the integer (or whole number) of matrices along the x axis and the integer (or whole number) of matrices along the y axis that are between the P1 and P2 pixels. The input processor also outputs a signal representing a directional characteristic of the line P1P2, such as the slope S. The input processor obtains the difference between $\Delta x$ and $\Delta y$ in the pixel coordinate system and, depending on which is greater, generates an x MAJOR or y MAJOR flag signal, representing another directional characteristic of the line P1P2.

In response to the coordinate location of the P1 pixel in the first (or M1) matrix and the slope S, a next matrix identification circuit generates intercept signals representing the intercepts $B_{in}$ and $B_{ex}$ at which the line P1P2 respectively enters and exits the M1 matrix. The entry and exit intercept signals, the sign of the slope signal, and the MAJOR flag signal are input to a pixel write enable (or lookup storage) circuit. The write enable circuit identifies those pixels within the M1 matrix that must be ON in order to display the line P1P2 from the P1 pixel to the P2 pixel and generates pixel write enable signals to represent such pixels.

A current matrix address circuit is responsive to the X and Y integer matrix coordinate signals representing the address of the current matrix for generating current matrix address signals for each matrix as the pixel write enable signals are output for each current matrix.

In response to the exit intercept and the slope S, the next matrix identification circuit determines the position of the line P1P2 relative to a pair of decision points positioned at predetermined spaced locations within the current matrix. Depending upon whether the line extends above, below, or between the decision points, the next matrix identification circuit determines either that the next matrix is in the x direction or in the y direction or is diagonally in the x and y directions. The next matrix identification circuit causes the current matrix address circuit to increment the X and/or Y integer matrix address signals according to the direction of the next matrix. A succession of current matrix address signals identifies the sequence, such as M1, M2, M3 and M4, of the matrices through which the line P1P2 is drawn. The write enable signals from the write enable circuit are output for each current matrix to identify which pixels are to be ON with each current matrix.

In response to the delta signals, a counter circuit is set. With each next matrix identification, the counter circuit adjusts the X matrix count and/or the Y matrix count according to the location of the next matrix. When both such counts reach a predetermined value, a vector end signal interrupts the next matrix identification circuit to indicate that the current matrix is the last matrix through which the line P1P2 extends.

In response to the address of the first matrix, identification of such matrix as the first matrix and the sign of the slope of the line, a mask enable signal is input to a mask circuit. The write enable signals that identify the pixels within the first matrix that are ON are also input to the mask circuit to provide write enable signals for only those pixels within the first matrix that are between the point P1 and the point P2. Similarly, the mask circuit is responsive to the vector end signal identifying the last matrix and to the identification of the ON pixels within the last matrix for masking those pixels that are not between the points P1 and P2. This is done by inhibiting the write enable signals for those pixels, such that mask enable signals correspond to only those pixels that are ON.

The write enable signals for the M2 and M3 matrices that are between the M1 and M4 end matrices allow color data to be stored in a bit plane memory according to the address of the particular matrix and the address therein of the ON pixels. Similarly, the mask enable signals allow color data to be written into the bit plane memory. However, to be compatible with reading such data from the bit plane memory on a scan line basis, for different rows of the matrices there are different storage address relationships between a given pixel in a selected location in one of the different matrices and the location in which the write enable signals for the given pixel is stored in the bit plane memory. To adjust the write enable signals and the mask enable signals according to such storage address relationship, the write enable signals and the mask enable signals are input to a matrix adjust circuit. The matrix adjust circuit varies the write enable signals of each current matrix according to the storage address relationship of that current matrix. For each current matrix the matrix adjust circuit generates final write enable signals that are written into a buffer and that then allow color data to be written into the bit plane memory.

In the method of the present invention for converting the line P1P2 to the write enable signals for displaying the line P1P2, the x,y coordinates of the first pixel which define one end of the line P1P2 are converted into matrix coordinates that define the address of the first (M1) matrix in which the first pixel is located. The number of matrices in the x and y directions between the M1 matrix and the M4 matrix in which an end pixel is located are identified. The x and y directions of the next matrix through which the line P1P2 extends upon exiting the M1 matrix are identified according to the location of the line P1P2 relative to two decision points in the first matrix. The next matrix is defined in terms of the x, y or both the x and y directions. The identifying step is repeated relative to two decision points in each next current next matrix until there are no more matrices through which the line P1P2 extends.

BRIEF DESCRIPTION OF THE DRAWINGS

Other objects, features and advantages of the present invention will be apparent from an examination of the following detailed descriptions which include the attached drawings in which:

FIG. 2 is an enlarged view of a portion of the display screen of FIG. 1 showing in detail a series of matrices through which the line passes as it extends between two points;

FIGS. 3A and 3B when joined at lines (a) to (j) form a block diagram of the line drawing apparatus of the present invention;

FIG. 4 is a front view of a portion of the display screen showing the pixels with letters identifying the relationship between a pixel location on the display screen and a DRAM chip in memory at which data for the pixel is stored;

FIG. 6 is a block diagram of an input processor circuit for supplying certain signals to set up a line drawing apparatus for processing the line;

FIGS. 7A and 7B form a diagram showing the processing paths that can be taken in response to move and draw input signals to set up the line drawing apparatus to draw a line;

FIG. 8 is a schematic diagram of a current matrix address circuit showing an integer RAM and a Y matrix counter;

FIG. 9 is a schematic diagram of an X matrix counter of the current matrix address circuit;

FIG. 10 is a schematic diagram of a parameter register that supplies control signals to the circuits shown in FIGS. 8 and 9;

FIG. 11 is a diagram illustrating two of twenty storage devices of a bit plane memory;

FIG. 12 is a diagram showing lines that can be drawn by the present line drawing system, where the lines have various slopes;

FIG. 13 is a schematic diagram of x and y fractional storage circuits;

FIG. 14 is a diagram depicting how mask enable signals for the rows and the columns of a matrix on the screen combine to mask certain pixels in a given matrix;

FIG. 15 is a schematic diagram of a mask enable circuit for generating the mask enable signals and a loop counter circuit that counts as each next matrix is identified in the x and y directions;

FIG. 16 is a schematic diagram showing a mask and a matrix adjust circuit;

FIG. 17 is a schematic diagram showing a constant register and a slope register of a next matrix circuit;

FIG. 18 is a schematic diagram of intercept registers for storing signals representing where the line enters a given matrix;

FIG. 19 is a schematic diagram of a write enable circuit for identifying the pixels that should be ON in order to draw the line through a given matrix;

FIG. 21 is a schematic diagram of the entire next matrix circuit; and

FIG. 22 is a schematic drawing of a number of matrices, showing how the intercepts are valued for use in calculating pixel ON data using a pixel_prom program.

In the schematic drawings, a number in a small box to the left or right of input or output lines designates the FIGURE to which that line is connected. In FIG. 21, a number without a lead line located generally at the upper right corner of a large box (representing a schematic), indicates the FIGURE that discloses that schematic in detail.

DETAILED DESCRIPTION OF THE PREFERRED EMBODIMENT

Organization of Pixels of Display Screen

Figure 1:
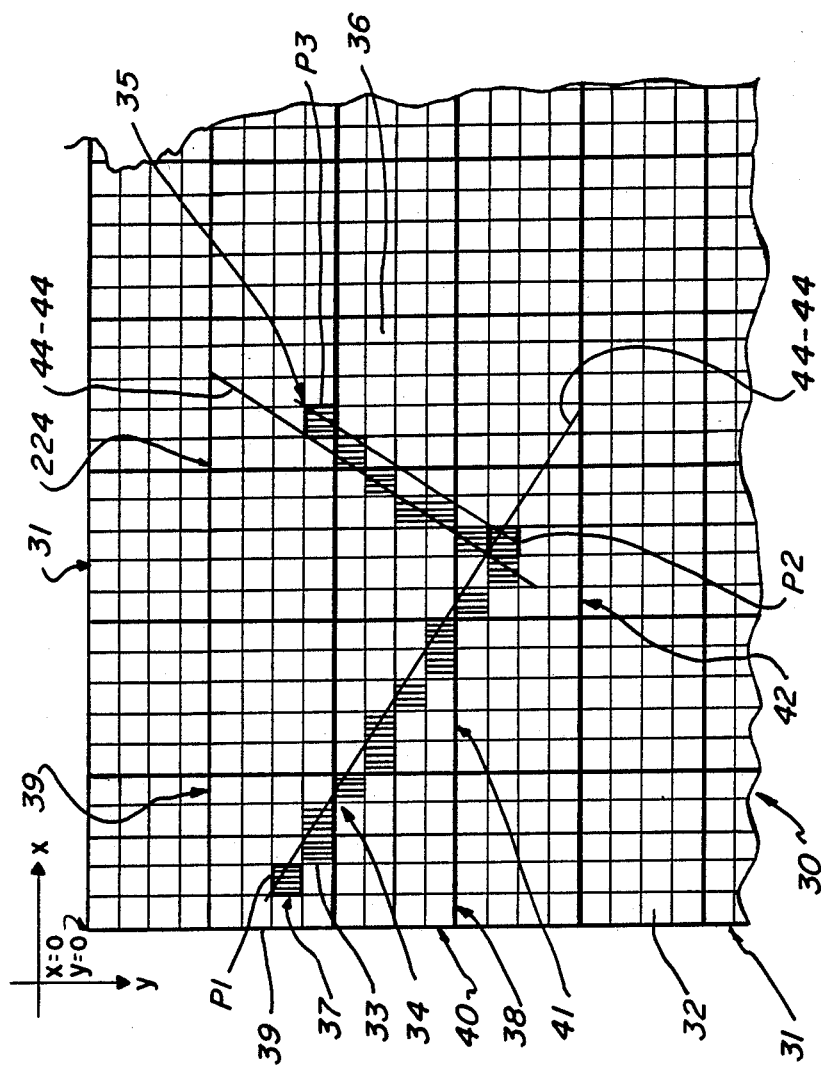
FIG. 1 is an enlarged front view of a portion of a cathode ray tube showing a display screen having pixels divided into groups of matrices for drawing a line on the display screen.

Referring now to FIG. 1 of the drawings, the preferred embodiment of the present invention is shown in connection with a display screen 30, which may be of a cathode ray tube (CRT) 31, for example. The display screen 30 is shown enlarged to illustrate numerous picture elements (pixels) 32. The CRT 31 is capable of selectively turning each of such pixels 32 either ON or OFF, and preferably according to a range of intensity that extends from light to dark and according to a selected color, such as red, blue, or green. The line drawing apparatus and method of the present invention are effective to identify those pixels 33 (shown in cross hatch) that must be illuminated or turned ON to draw a line 34 on the display screen 30 from point P1 to P2 (the P1P2 line 34) and then a line 35 from point P2 to point P3 (the P2P3 line 35). The remainder of the pixels 32 are OFF as shown by the pixel 36.

For purposes of description, the coordinate system used to identify locations on the display screen 30 is indicated by "+x" extending from left to right and "+y" extending from top to bottom. The x=0, y=0 coordinate is at the upper left corner of the display screen 30. A given pixel 32 is related to the x,y screen coordinate system according to the location of the upper left hand corner of the pixel 32. Thus, the pixel address of the point P1 is "1,6" representing the x and y screen coordinates of the upper left hand corner of a P1 pixel 37.

The pixels 32 on the display screen 30 are divided up into groups or matrices 38, where each matrix 38 is formed from four pixels 32 in the y direction and five pixels 32 in the x direction. The coordinate system used to identify the location of a particular matrix 38 is also the x,y screen coordinate system. However, the units of such matrix coordinate system are "matrices" and the matrix address is indicated by "X" and "Y". For example, the X address of the matrix 38 containing the point P1 is the 0 matrix integer. This is obtained by the x pixel address of "1" divided by 5 (since there are 5 pixels per matrix) which is "1/5" or 0 matrix integers. The y pixel address of the point P1 is 6, which yields a Y matrix address of "1" since 6 divided by 4 (pixels per matrix in the y direction) is an integer of 1. Thus, the first or M1 matrix 39 has a matrix address of 0,1 in the X,Y matrix coordinate system.

Referring in detail to FIG. 2, for purposes of describing the P1P2 line 34 drawn in the +y direction from the point P1 to the point P2, it may be understood that the point P1 is formed by the pixel 37 that is located within the matrix 38 that is designated as the first (or M1) matrix 39. The P1P2 line 34 to be drawn from the point P1 to the point P2 is seen as extending into a second (or M2) matrix 40 that is displaced from the first M1 matrix 39 in only the +y direction. This second M2 matrix 40 is the "next matrix" with respect to the first or M1 matrix 39 since it is the next matrix through which the P1P2 line 34 extends. For each of description, a next matrix is identified by an "N" following the reference number. The P1P2 line 34 is seen extending from the second (or M2) matrix 40 into a third (or M3) matrix 41 which is located in the +x direction from the second (or M2) matrix 40, such that the third (or M3) matrix 41N is the "next matrix" with respect to the second (or M2) matrix 40. The P1P2 line 34 is shown ending in a fourth (or M4) matrix 42 that is displaced from the third (or M3) matrix 41 in both the +x and the +y directions, such that with respect to the third (or M3) matrix 41, the fourth (or M4) matrix 42N is the "next matrix". The P1P2 line 34 is defined on the display screen 30 by the series of croshatched pixels 33-33 that extend from the P1 pixel 37 to a P2 pixel 43, it being understood that dark solid lines 44-44 in FIGS. 1 and 2 are shown only for purposes of illustration.

As indicated, the locations of the respective pixels 37 and 43 that represent the points P1 and P2 are referenced to the x,y screen coordinate system, which has its x=0 and y=0 values at the upper left hand corner of the display screen 30. Since FIG. 2 is an enlarged, partial view of FIG. 1, the point P1 shown in FIG. 2 has an x pixel value of +1 and a y pixel value of +6. An x,y coordinate system of the matrix 39, is also used. In this matrix coordinate system, the x pixel value is also +1 and the y pixel value is +2. Similarly, the point P2 (pixel 43) has a +x value of 12 and a +y value of 13 in the x,y screen coordinate system, and a +x value of 2, and a +y value of 1 in the matrix coordinate system.

The slope S of a line is the number of pixels 32 between the beginning and end points along the "minor" axis divided by the number of pixels 32 between the beginning and end points along the "major" axis. The minor axis is the y axis and the major axis is the x axis for the P1P2 line 34 since the line 34 always moves from one pixel 32 to the adjacent pixel 32 in the x direction as it extends from point P1 to P2, but doesn't always move from one pixel 32 to the adjacent pixel 32 in the y direction. Thus, the slope S of the P1P2 line 34 is defined by the number of pixels 32 in the y direction from point P1 to point P2 divided by the number of pixels 32 in the x direction from point P1 to point P2 or:

$$\frac{\Delta y}{\Delta x} = \frac{13 - 6}{12 - 1} = 0.64. \tag{1}$$

Line 34/Matrix 38 Relationship

To determine which matrix 38 is the next matrix 38 for a given line, such as the line 34, the location of the line 34 is related to a designated or current one of the matrices 38. For ease of description, a current matrix is referred to by a "C" following the reference number.

Referring to FIG. 2, the line 44-44 representing the P1P2 line 34 is shown extended to the left so that it intersects the left side 45 of the current M1 matrix 39C at an intercept "$b_{in1}$". The line 44-44 exits the right side 46 of the matrix 39C at an intercept $b_{ex1}$. In set up, an exit intercept $b_{ex0}$ from a given prior matrix 38 is determined as follows, where "x frac" and "y frac" are the x and y addresses of the pixel 37 in a matrix 38:

$$b_{ex0} = y \text{ frac} + (-S^*x \text{ frac}). \tag{2}$$

With respect to the matrix 39, when the x,y matrix coordinates (x=+1, y=+2) are substituted into Equation (1), the value of $b_{ex0}$ is as follows:

$$b_{ex0} = 2 + (-0.64^*1) = +1.36.$$

To determine what next matrix 38N the P1P2 line 34 extends into as it exits from the current M1 matrix 39C, a lower right hand corner or decision pixel 47 of each current matrix 38C, here the M1 matrix 39C, is identified. A reference line R is drawn horizontally through the center of the corner pixel 47, which, for the M1 matrix, is referred to as the reference line R1. The reference line R1 provides a new coordinate system or zero reference in the y direction for next matrix identification purposes, including specifying where the P1P2 line 34 enters the current M1 matrix 39C and where the P1P2 line 34 exits the current M1 matrix 39C. This is referred to as the decision point coordinate systems because the reference line R1 intersects the extended right side 46 of the matrix 39C and forms a first decision point D1. Similarly, a second decision point D2 is formed where the reference line R1 intersects the left side 48 of the corner pixel 47.

The above value of $b_{ex0} = +1.36$ was in the x,y matrix coordinate system. This is converted to the decision point coordinate system as follows, where "B" refers to an intercept in the decision point coordinate system:

$$B_{ex0} = b_{ex0} - 3.5; \text{ or}$$

$$B_{ex0} = +1.36 - 3.5 = -2.14. \tag{3}$$

Having $B_{ex0}$, the value of $B_{ex1}$ is:

$$B_{ex1} = B_{ex0} + 5s; \text{ or}$$

$$B_{ex1} = -2.14 + 3.2 = 1.06. \tag{4}$$

Then, $B_{in1}$ is obtained from $B_{ex0}$ directly as:

$$B_{in1} = B_{ex0} = -2.14. \tag{5}$$

It may be understood that once a next matrix 38N is identified, the zero reference line R for the current matrix 38C, which is the M1 matrix 38 shown in FIG. 2, must be transferred to the next matrix 38N. When the next matrix is the M2 matrix 40N, the reference line R (now shown as R2) is translated +4 in the y direction from the location of the reference line R1, such that the new $B_{in}$ and $B_{ex}$ intercepts, which are at the same location as they were for the M1 matrix 39, are calculated as follows:

$$B_{in2} = B_{in1} - 4; \text{ or}$$

$$B_{in2} = -2.14 - 4 = -6.14. \quad (6)$$

$$B_{ex2} = B_{ex1} - 4; \text{ or}$$

$$B_{ex2} = 1.06 - 4 = -2.94. \quad (7)$$

These values of $B_{in2}$ and $B_{ex2}$ are relative to the reference line R2. This translation of the reference line R of +4 involves a constant that is referred to as the "A" constant, which has a value of −4.

Similarly, when the next matrix 38N is the M3 matrix 41N relative to the current M2 matrix 40C, the reference line R2 does not translate in the y direction, but there is a translation of 5 pixels in the +x direction. Thus, $B_{in3}$ is obtained from $B_{ex2}$ directly, and:

$$B_{in3} = B_{ex2} = -2.94. \quad (8)$$

It is noted that $B_{ex2}$ equals $B_{in3}$ since there is no translation in the y direction of the reference line R2 for use with the M3 matrix 41. Since the P1P2 line 34 has the slope S, the location of $B_{ex3}$ for the M3 matrix 41 is obtained as follows:

$$B_{ex3} = B_{ex2} + (5*0.64) = +0.26. \quad (9)$$

This calculation of $B_{ex3}$ from $B_{ex2}$ to account for the slope S involves a constant that is referred to as the "B" constant, which is +3.20 for the P1P2 line 34.

With this background in mind, it may be understood that in the translation from the M3 matrix 41 to the M4 matrix 42, there is both an x direction translation and a y direction translation, such that both the A and B constants are involved. Thus:

$$B_{in4} = B_{ex3} - 4; \text{ or}$$

$$B_{in4} = 0.26 + A; \text{ or}$$

$$B_{in4} = 0.26 + (-4) = -3.74; \text{ and} \quad (10)$$

$$B_{ex4} = B_{ex3} + A + B; \text{ or}$$

$$B_{ex4} = +0.26 + A + B, \text{ or}$$

$$B_{ex4} = +0.26 + (-4) + (3.2) = -0.54. \quad (11)$$

Such translation of the next matrix 38N and the conversion of $B_{in}$ and $B_{ex}$ to account for both the A constant and the B constant involves a constant referred to as the "AB" constant, which is −0.8 for the P1P2 line 34.

GENERAL DESCRIPTION OF APPARATUS AND METHOD

Referring to FIGS. 2, 3A and 3B, line drawing apparatus 49 of the present invention includes an input circuit 50 for providing an input signal 51, such as one indicating to "MOVE" to the point P1 represented by the P1 pixel 37. The next input signal 51 may be one indicating to "DRAW" a line, such as the line 34, between the points P1 and P2, for example. The "set-up" of the line drawing apparatus 49 in response to the "MOVE" and "DRAW" input signals 51 is described below with respect to FIG. 7A.

An input processor circuit 52 responds to the input signals 51 for producing signals 53 that represent the X and Y integer-matrix coordinates (or address) of the first M1 matrix 39 that contains the P1 pixel 37 and of the last M4 matrix 42 that contains the P2 pixel 43. The integer-matrix coordinates are obtained by multiplying the x coordinate of the pixel by 0.2 for the integer-matrix coordinate X and by multiplying the y coordinate of the pixel by 0.25 for the integer-matrix Y coordinate as described above with respect to the P1P2 line 34 shown in FIG. 1. There, the M1 integer-matrix 39 has 0,1 matrix coordinates. The "integer-matrix coordinates" are referred to below as "matrix coordinates". The number of pixels 32 that are remainders in such multiplication represents the address of the P1 pixel 37 within the M1 matrix 39 and of the P2 pixel 43 within the M4 matrix 42, and are referred to as fractional matrix values.

Also, the input processor circuit 52 determines the direction in which the P1P2 line 34 moves from the P1 pixel 37 to the P2 pixel 43 and outputs delta signals 54 indicating the number of integer (or whole number of) matrices 38 along the x axis and the number of integer matrices 38 along the y axis that are between the P1 pixel 37 and the P2 pixel 43. The input processor circuit 52 also outputs a signal 55 representing the slope S of the P1P2 line 34. The input processor circuit 52 obtains the difference between Δx and Δy in the pixel coordinate system and, depending on which is greater, generates an x MAJOR or y MAJOR flag signal 56.

In response to the coordinate location of the P1 pixel 37 in the first M1 matrix 39 and the slope S, a next matrix identification circuit 57 generates intercept signals 58 representing the intercepts $B_{in}$ and $B_{ex}$ at which the P1P2 line 34 respectively enters and exits the first M1 matrix 39. The entry and exit intercept signals 58, the sign of the slope or SLOPENEG signal 55, and the MAJOR flag signal 56 are input to a pixel write enable (or lookup storage) circuit 59. The write enable circuit 59 identifies those pixels 33–33 within the first M1 matrix 39 that must be ON in order to display the P1P2 line 34 from the P1 pixel 37 to the P2 pixel 43 and generates pixel write enable signals 60 to represent such pixels 33. A current matrix address circuit 61 is responsive to the X and Y integer-matrix coordinate signals 53 (that represent the address of the current or first M1 matrix 39C) for generating current matrix address signals 62 for each matrix 38 as the pixel write enable signals 60 are output for each current matrix 38C. Thus, as a succession of current matrix address signals 62 identifies the address of each matrix in the sequence M1, M2, M3 and M4 of the matrices 39 through 42, respectively, through which the P1P2 line 34 is drawn, the write enable signals 60 from the write enable circuit 59 are output for each current matrix 38C to identify which pixels 33 are to be ON within each current matrix 38C.

In response to the respective signals 58 and 55 for the exit intercept $B_{ex}$ and the slope S, the next matrix identification circuit 57 determines the position of the P1P2 line 34 relative to the two decision points D1 and D2

(FIG. 2) positioned at predetermined spaced locations within the current M1 matrix 39C. Depending upon whether the P1P2 line 34 extends above, below, or between the decision intercepts D1 and D2, the next matrix identification circuit 57 indicates either that the next matrix 38N is in the x direction or in the y direction or is diagonally in the x and y directions relative to the current matrix 39C. This indication by the next matrix identification circuit 57 is in the form of a next matrix signal 63 to which the current matrix address circuit 61 responds by changing the current matrix address signals 62 to represent the address of the next matrix 40N, which then becomes the current matrix 40C.

In response to the delta signals 54, a loop counter circuit 64 is set. With each next matrix identification, the next matrix signal 63 causes the loop counter circuit 64 to adjust the X matrix count and/or the Y matrix count according to the location of the next matrix 38N. When both such counts reach a predetermined value, a vector end signal 65 interrupts the next matrix identification circuit 57 to indicate that the current matrix 42C is the last matrix (e.g. the M4 matrix 42) through which the P1P2 line 34 extends.

With the identification of the integer-matrix coordinates of the first matrix 39, the input processor circuit 52 also generates fractional signals 66 that represent both the x and y coordinates (of the address within the first matrix 39) of the pixel 37 that represents the point P1 of the P1P2 line 34. Since the P1P2 line 34 starts at the first pixel 37, the pixels 36 beyond the P1P2 line 34 should not be write enabled. However, the write enable signals 60 represent the path of the P1P2 line 34 across the entire first (M1) matrix 39. Thus, the write enable signals 60 for the pixels 36 beyond the P1P2 line 34 must be disabled or "masked". For this purpose, a mask enable circuit 67 having separate X and Y sections 68 and 69, respectively, responds to a vector end signal 65 from a prior line that had the point P1 as the last point. In the example of the P1P2 line 34 in which the P1 point is not a last point of a prior line, upon starting the operation of the line drawing system the loop counter circuit 64 is set so as to immediately generate the vector end signal 65. In this manner, the mask enable circuit 67 will be effective to prevent the enabling of the pixels 38 beyond the beginning of the P1P2 line 34. Similarly, the vector end signal 65 representing the last (M4) matrix 42 of the P1P2 line 34 initiates a masking operation. The mask enable circuit 67 also responds to the fractional signals 66 and to the slope signal 55 to generate x and y mask enable signals 71. The mask enable signals 71 represent the ON pixels 33 in the first, M1 matrix 39 that were write enabled and that are not beyond the end pixel 37 of the P1P2 line 34. The mask enable circuit 67 also generates the mask enable signals 71 for the last or M4 matrix 42.

The write enable signals 60 for the respective M2 and M3 matrices 40 and 41 that are between the respective M1 and M4 end matrices 39 and 42 are effective to cause color data to be stored in a bit plane memory 72 according to the address of the particular matrix 38. Referring now to FIG. 4, to be compatible with reading such data from the bit plane memory 72 on a scan line basis, there are different memory chip relationships between the pixels 33 in one matrix 38 and the pixels 33 in another matrix 38. There are four such different relationships; referred to as types 0 through 3. For example, the upper left hand matrix 38 has a pixel 33 identified by an "A" memory chip relationship (Type 0), whereas the adjacent matrix 38' to the right has a pixel 33' in the same location in that matrix 38' as was the prior pixel 33 in the matrix 38, but the memory chip relationship is shown as "F" (Type 1). The same concept applies to the pixel 33" in the matrix 38" (memory chip relationship "K") and to the pixel 33'" in the matrix 38'" (memory chip relationship "P"). To adjust the write enable signals 60 and the mask enable signals 71 according to such storage relationships, the write enable signals 60 and the mask enable signals 71 are input to a matrix adjust circuit 73 (FIGS. 3B and 16). The matrix adjust circuit 73 varies the write enable signals 60 of each current matrix 38C according to the memory chip relationship of that current matrix 38C and generates final write enable signals 74 for each current matrix 38C. The final write enable signals 74 pass through a buffer 75 and are then applied to the bit plane memory 72.

In the method of the present invention for converting the P1P2 line 34 to the final write enable signals 74 for displaying the line P1P2, the x,y coordinates of the first pixel 37 (which defines one end of the P1P2 line 34) are converted into matrix coordinates that define the address location of the first (M1) matrix 39 in which the first pixel 37 is located. The number of matrices 38 in the x and y directions between the first (M1) matrix 39 and the last (M4) matrix 42 in which the end pixel 43 is located are identified. The end pixel 43 defines the end of the P1P2 line 34. The x and y directions of the next matrix 40N through which the P1P2 line 34 extends upon exiting the first (M1) matrix 39 are identified according to the location of the P1P2 line 34 relative to the decision points D1 and D2 (FIG. 2) in the first (M1) matrix 39C. The next matrix 40N is defined in terms of the x, y or both the x and y directions. The identifying step is repeated relative to two decision points in each next current matrix until there are no more matrices 38 through which the P1P2 line 34 extends.

DETAILED DESCRIPTION OF APPARATUS AND METHOD

Control Circuit 76

Figure 5:
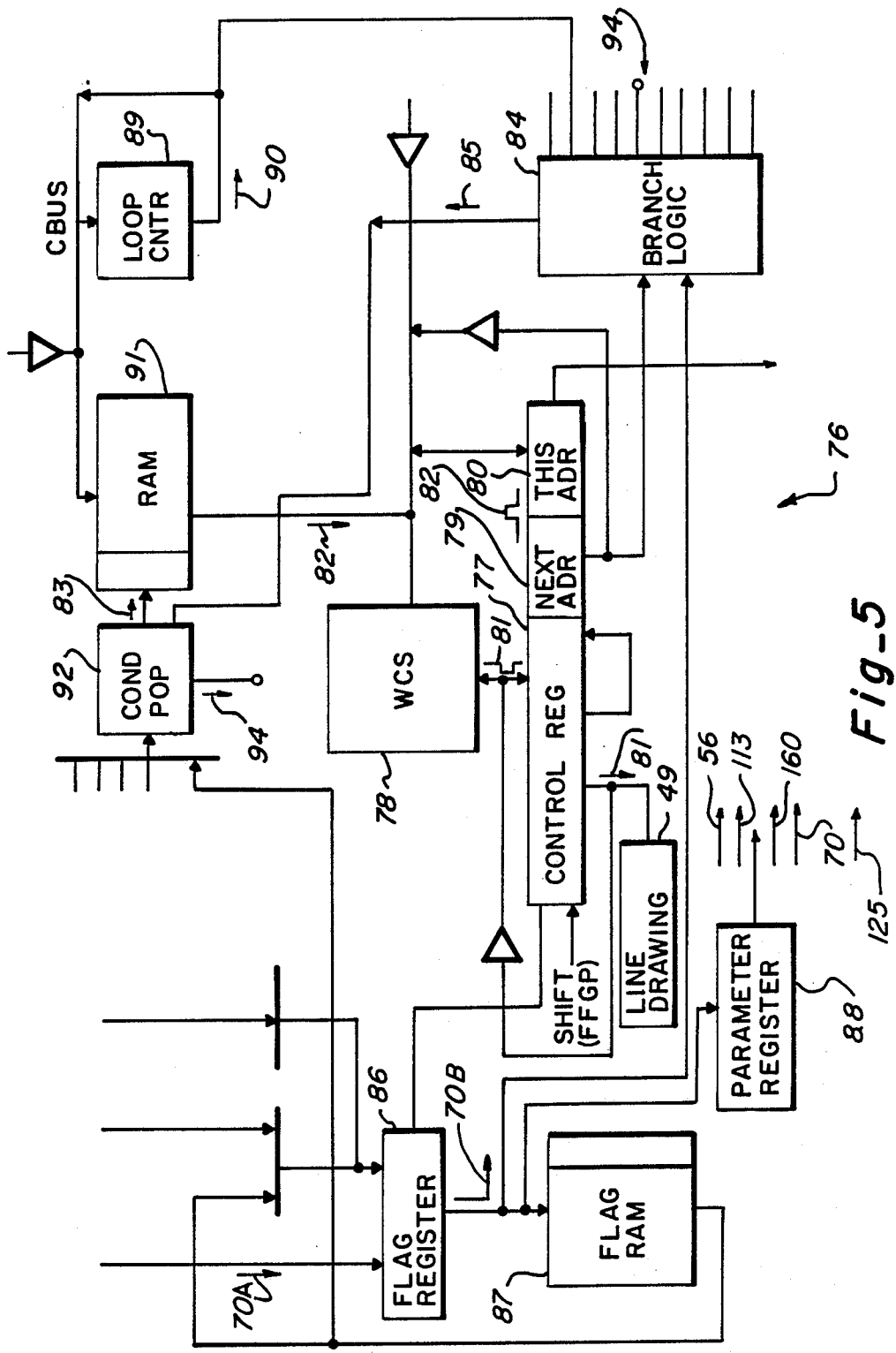
FIG. 5 is a block diagram of a control circuit of the present invention.

Referring now to FIG. 5, the line drawing apparatus 49 of the present invention includes a control circuit 76 that stores computer programs set forth in Appendix A. The circuit 76 outputs instructions for a given current state and a next address. The next address identifies the state to be processed after the current state. The control circuit 76 includes a control register 77 that is connected to a writable control store (WCS) 78 that stores the various programs in the form of microcode. The control register 77 controls the selection of words or commands from the WCS 78 in conjunction with a next address register 79 and a this address register 80.

In response to a reset command, the address in the next address register 79 is reset to 0. This causes the WCS 78 to output a signal 81 representing an instruction ("instruction 0" at address 0) into the control register 77. At the next clock cycle, the instruction 0 is sent to the rest of the line drawing apparatus 49, such as the input processor circuit 52 described in detail below. Also, a signal 82 representing the next address associated with the instruction 0 is loaded into the this address register 80. In the same cycle, a resulting new next address signal 82 also addresses the WCS 78. At the next cycle, the WCS 78 outputs into the control register 77 an instruction signal 81 associated with the next address, such that on the next cycle the instruction signal 81 corresponding to the next address will be output to the line drawing apparatus 49. As the cycling continues, this operation continues by successively outputting the instruction signals 81 from the WCS 78 to the control register 77 to the line drawing apparatus 49.

Also, to take into consideration events that should modify the next address, a branch logic circuit 84 is connected to enable modification of the next address signal 82 of each instruction based upon the occurrence of a condition, such as the MAJOR flag signal 56. The branch logic circuit 84 outputs a modify signal 85 that modifies the next address signal 82 that is transferred to the this address register 80. As a result, the WCS 78 outputs the instruction signal 81 that corresponds to the modified next address. An example of this is discussed later in connection with the masking operation.

In addition, a flag register 86 is provided for setting various flags for various conditions. The flag register 86 is connected to a flag RAM 87 that stores signals, such as the MAJOR flag signal 56, representing such flags. The flag RAM 87 is connected to a parameter register 88 which generates flag signals, such as the MAJOR flag signal 56 for access during processing to control how certain operations are to be performed.

Also provided is a loop counter 89 that can be set to an initial value and then decremented each time an event occurs. The loop counter 89 outputs a signal 90 when it decrements to 0. For example, it will input the signal 90 to the branch logic circuit 84 which, if programmed to perform this function, will modify the next address signal 82 to access an appropriate next instruction.

A push/pop stack RAM 91 is used in conjunction with a subroutine that is called by the control register 77. The push/pop stack RAM 91 stores the particular next address that follows the subroutine. The stack RAM 91 outputs the next address signal 82 to the WCS 78 to cause it to output to the control register 77 the instruction signal 81 that corresponds to that next address. This is done because a particular subroutine may be called at different times during the various operations, such that there is no particular next address associated with a given subroutine.

Also, with respect to the next address following a particular subroutine, a conditional pop-logic circuit 92 is connected to both the push/pop stack RAM 91 and the branch logic circuit 84. In this case, the use of the instruction at the next address in the push/pop stack RAM 91 is conditional upon an event happening, which event controls the conditional pop-logic circuit 92. If the event occurs, the conditional pop-logic circuit 92 outputs a signal 93 to instruct the push/pop stack RAM 91 to output the next address signal 82 to the WCS 78, which then outputs the instruction signal 81 corresponding to that next address. If the event does not occur, then the conditional pop-logic circuit 92 does not permit the next address signal 82 to be read from the push/pop stack RAM 91. Instead, a second signal 94 from the conditional pop-logic circuit 92 is applied to the branch logic circuit 84 to modify the next address signal 82 that is transferred to the this address register 80 of the control register 77. The instruction signal 81 corresponding to that modified next address is then output from the WCS 78 to the control register 77.

Input Processor Circuit 52

Referring to FIG. 6, the input processor circuit 52 includes a general purpose, bit slice processor 95 with additional circuitry $95^1$ to do multiplication. In the preferred embodiment, the processor 95 is an Advanced Micro Devices No. 2901 microprocessor having registers 96 identified in Appendix A as R0 through R17 in octal or base 8 notation. For example, the R16 and R17 registers 96 store the respective x and y coordinates of the beginning (BEG) of the P1P2 line 34. The last 12 bits of each of the x and y input signals 51 represent the respective values of the x and y pixel coordinates on the display screen 30. Thus, the x and y coordinate data stored in the R16 and R17 registers 96 represent the location of the point P1 on the display screen 30 in terms of the x,y pixel coordinate system in which there are 0 to 1279 pixels 32 in the x direction and 0 to 1023 pixels 32 in the y direction.

MOVE ENTRY Processing

Referring to FIGS. 7A and 7B, various branches of the computer program of Appendix A are shown. The instructions for such branches are used to control the initial operation, or set-up, of the line drawing apparatus 49. With the control circuit 76 in its normal idle (or poll loop) mode, the input signal 51 for the MOVE command word causes a branch to MOVE ENTRY 1, which causes the WCS 78 to output instructions for path 97. Data may also be received from the register 96, which causes a branch to path 98. A MOVE command that branches to path 97 may result in state 20 or 24 depending on the activity of the pull loop. For MOVE ENTRY 1, the input signals 51 are received from a first-in-first-out memory (or FIFO) 99 in y and x coordinates across the entire screen. The WCS 78 outputs a MOVE instruction signal 81 for the path 97. In response to the MOVE instruction signal 81, the poll loop calls one of the next addresses 3020, 0020 and 0040 (path 97). For example, in response to the 0020 next address for the 0020 state, the WCS 78 outputs the instructions of the 0020 state. Similarly, the MOVE instruction signal 81 may call states 3020, 0040 or 0020. Each of states 3020, 0020 and 0040 sets up the input processor circuit 52 to cause a multiplier 100 to multiply by 0.25 to yield the y integer-matrix coordinate signal 53 and the y fractional signal 66 for the M1 current matrix 39C. Each of states 3020, 0020 and 0040 has a 5234 or 5235 next address that is used for "absolute" or "relative" cases as described below.

Depending upon whether the "MOVE" instruction signal 81 is an initial set-up or whether a given point has been previously processed, an ABSOLUTE or a RELATIVE flag is set before ENTRY. An absolute point is not related to a previous point. A relative point is defined relative to the x and y coordinates of a previous point. Thus, the input signals 51 are either for an absolute, exact point or for delta amounts relative to the coordinates of a previous point. In particular, each word of a MOVE command signal 51 for either MOVE ENTRY 1 or 2 has an absolute or relative code associated with it. If the input point (such as P1) is an absolute point, an ABSOLUTE flag is set in the flag register 86 and an absolute path 101 (FIG. 7A) of the algorithm is processed. For example, in MOVE ENTRY 1, at the end of the state 3020, the next address 5234 calls a relative path 102, whereas the next address 5235 call the absolute path 101. This is depicted in FIG. 7A, where parallel absolute (ABS) and relative (REL) paths 103 and 104 are also shown for the MOVE ENTRY 2 path 98.

Whichever of the respective absolute or relative paths 101 or 103 and 102 or 104 is taken, the processor 95 generates an output signal 105 (FIG. 6) that is written into the register 96 in terms of the absolute y and x values for the particular point, such as P1 or P2. These paths 97 and 98 converge at state 5210, which is described in the "state map". State 5210 is shown in detail in Appendix A. State 5210 completes the processing of the x and y values of the point P1 by causing the multiplier 100 to multiply by 0.2 and 0.25 respectively to determine the integer-matrix coordinate locations of the M1 matrix 39 in which the point P1 is located and the number of fractional pixels 32 associated with that M1 matrix 39.

In particular, in states 5210 through 5213, the processor 95 is controlled to save the results of multiplying the y input signal 51 for the point P1 by 0.25 by storing the integer-matrix address signal 53 in the current matrix address circuit 61 state 5212, instruction "MBUS-ΔINTEGER RAM") and to store the fractional signal 66 in a y section 106 (FIG. 3A) of a fractional storage circuit 107 (see rest of same instruction). Similar storing is done in an x section 108 (FIG. 3A) with respect to the x input signal 51 (state 5213). The X and Y integer-matrix coordinate signals 53 for the M1 matrix 39 and the M4 matrix 42 are written into the current matrix address circuit 61.

Current Matrix Address Circuit 61

The current matrix address circuit 61 shown in FIG. 3A includes integer RAMs 109 and 110 (shown in detail in FIG. 8) that together have eight storage locations. Referring to FIG. 8, MBUS 3 through 10 input 8 bits of the integer-matrix coordinate signals 53 to the integer RAMs 109 and 110. The integer RAMs 109 and 110 store the X and Y integer-matrix coordinate signals 53 to represent the X and Y matrix addresses of the points P1 and P2 of the P1P2 line 34. To increase processing speed, the RAMs 109 and 110 can receive data representing the P2P3 line 35 while the P1P2 line 34 is being processed.

The X and Y integer-matrix coordinate signals 53 are related to whether the point P1 is the beginning or the end point of the line 34. In particular, memory locations in the RAMs 109 and 110 store the following signals 53 as shown in Chart I.

Chart I

| Location | Data Stored |
| --- | --- |
| 0 | x integer value BEG or END point |
| 1 | y integer value BEG or END point |
| 4 | x integer value END or BEG point |
| 5 | y integer value END or BEG point |

The selection of the beginning (BEG) or end (END) point is under the control of a SELBEGEND signal 111, whereas IRA0 and IRA1 signals 112 control the 0,1 and 4,5 storage location addressing, such that if 0,1 is BEG, then 4,5 is END; and if 0,1 is END, then 4,5 is BEG.

Referring to FIG. 10, the IRA0 and IRA1 signals 112 are shown as outputs from the parameter register 88, which is a programmable array logic circuit having sections shown as 88' and 88''. In response to outputs from the processor 95 on CBUS0 and CBUS1, the parameter register section 88' outputs the IRA0 and IRA1 signals 112 to control the address in the integer RAMs 109 and 110 (FIG. 8) at which the X and Y integer-matrix coordinate signals 53 are stored. The processor 95 output is loaded into the parameter register 88 in response to an *LDIRADR instruction signal 81. In response to a BETOGGLE signal 113 from the processor 95, the parameter register section 88'' outputs the SELBEGEND signal 111 to identify the point P1 or P2 as the beginning or the end of the P1P2 line 34.

Referring again to FIG. 8, the RAMs 109 and 110 also receive a *WEIR signal 114 and an *ENIRAM signal 115 that enable the integer signals 53 to be written into the RAMS 109 and 110. The *ENIRAM signal 115 enables the RAMs 109 and 110 to output the X integer-matrix coordinate signal 53 to an X matrix counter 116 (FIG. 9) of the current matrix address circuit 61 and the Y integer-matrix coordinate signal 53 to a Y matrix counter 117 (FIG. 8) of the circuit 61.

As indicated above, the X and Y integer signals 53 represent the address of the current matrix 38C that is being processed. The X and Y matrix counters 116 and 117 produce the current matrix address signals 62 in terms of rows and columns that address the bit plane memory 72. XMC0 through XMC7 lines 118 in FIG. 9 output the X current address signal 62 and YMC0 through YMC7 lines 119 output the Y current address signal 62 (FIG. 8). The eight lines 118 and 119 carry the eight bits of the signals 62, with the lower two bits indicating the type (0, 1, 2 or 3) of matrix (see discussion of FIG. 4 below). Thus, the current matrix address signals 62 output by the X matrix counter 116 and the Y matrix counter 117 are in terms of storage addresses to the buffer 75 and the bit plane memory 72.

Referring to FIG. 11, the bit plane memory 72 includes twenty storage devices or chips 120, such as the devices 120' and 120'', so that data for each pixel 32 of a given matrix 38 is written into a separate device 120', 120'', etc. Each device 120 has 65536 storage locations, such that data from 65536 matrices 38 can be stored in the twenty devices 120, 120', etc. Each given matrix 38 represents a different storage address in each device 120 in terms of a row and a column address. Such row/column storage address is output by the X and Y matrix counters 116 and 117 based on the first or "TOP" address acquired from the integer RAMs 109 and 110. The M1 row address and a "C1" column address are shown corresponding to the first M1 matrix 39. In particular, one of the devices 120 corresponds to each of the A through T pixel locations shown in FIG. 4. Thus, as shown in FIG. 11, the device 120' stores data for the A pixel 33 and the device 120'' stores data for the B pixel 33 of the M1 matrix 39.

Referring again to FIG. 8, the Y matrix counter 117 is shown as having two sections 121 and 122, one for such row address and one for such column address. Lines 123 receive the 8 bits of the integer-matrix signals 53 from the Y integer RAMs 109 and 110 and input them to the Y matrix counter 117. The counter 117 is loaded from the integer RAMs 109 and 110 in response to a *LDYMC signal 124. The *ENY next matrix signal 63 output by the next matrix circuit 57 (see FIGS. 3A and 15) is applied to an OR circuit 126 to cause each section 121 and 122 of the Y matrix counter 117 to step one matrix address in the Y direction. The Y matrix counter 117 thus outputs the Y matrix address signal 62 on the YMC0 through YMC7 lines 119 to represent the row and column storage address of the next matrix 38N.

Referring to FIG. 9, the X matrix counter 116 is shown having a section 116' and a section 116'' for receiving the eight bit X integer-matrix coordinate signal 53 from IR0 through 7 lines 123. The sections 116′ and 116″ are loaded in response to a *LDXMC signal 127.

Still referring to FIG. 9, the section 116′ is for the row address and the section 116″ is for the column address. The sections 116′ and 116″ respond to an XMCDOWN flag signal 125 from the parameter register 88′ that indicates whether the line 34 goes in the (+) x direction or the (−) x direction according to whether the signal is 0 or 1. The row section 116′ is set for the M1 row address and the column address stored by the column section 116″ is variable until the line 34 extends into a new row address block. With the line 34 in the same matrix 38, the section 116″ shifts in the appropriate +X or −X direction in response to the XMCDOWN next matrix signal 63. In response to the *ENX next matrix signal 63, the sections 116′ and 116″ output the current X matrix signal 62 to the XMC0 through 7 lines 118.

Also shown in FIG. 9 is a paging circuit 128 that includes a register 129 that stores the matrix row address of the prior matrix 38. The current matrix row address signal 62 is applied by XMC4 through 7 and YMC4 through 7 lines 130 to a comparator 131 that is also supplied with the prior matrix row address via lines 132. The comparator 131 generates a change page signal 133 when the current row address is for the next row in the bit plane memory 72.

DRAW ENTRY Processing

Referring to the state map in conjunction with FIGS. 7A and 7B, the DRAW command input signal 51 causes a branch to one of three states 24, 44 and 3024 to DRAW ENTRY 1. These are shown in FIG. 7A as a left path 134.

Referring to state 3024, for example, the corresponding instructions set up the input processor circuit 52 for the next relative (state 5034, path 135) and absolute (state 5035, path 136) computations as described above in respect to the MOVE ENTRY 1 state. Similarly, the DRAW ENTRY 2 state shown in FIG. 7A at a right hand path 137 results in processing state 5000 for set up, and then calls states 5002 (relative, path 138) or 5003 (absolute, path 139).

These states converge at state 5010 in a manner similar to MOVE ENTRY 1, such that the point P2 is processed in a manner similar to how state 5210 processes the MOVE command signal 51.

Similarly, the integer-matrix address signals 53 and the fractional signals 66 for the point P2 are stored in the respective current matrix address circuit 61 and the respective y and x fractional storage sections 106 and 108. In particular, in state 5012, instruction "MBUS-→INTEGER RAM, Y FRACTION REG" causes the Y integer-matrix address signal 53 and the y fractional signal 66 to be stored. Referring to FIG. 7B, in states 5121, 5120, and 5176 (which are processed in respective paths 140, 141 and 142 that are taken separately depending on the value of ΔX) the X integer-matrix address signal 53 and the x fractional signal 66 are stored for the point P2 in the respective current matrix address circuit 61 and fractional storage section 108.

As shown in FIG. 7A and in the state map, the DRAW ENTRY 1 and 2 paths 134 and 137 converge at state 5010 into a path 143. At that time, the values of the x and y coordinates of the points P1 and P2 are known. At state 5010 and in the next state 5011, the processor 95 (FIG. 6) is instructed to subtract the Y address of the last M4 matrix 42 from the Y address of the first M1 matrix 39 to obtain ΔY and the sign of ΔY is noted to produce the ΔY signal 54. The ΔY signal 54 is loaded into the processor register 96.

Referring to FIG. 7B, there are three paths 144, 145 and 146 based on the sign of ΔY. This branching according to the sign of ΔY simplifies the determination of the sign of the slope S of the P1P2 line 34. In particular, state 5020 for ΔY greater than 0 (path 144), can branch to any one of three states 5121 (path 140), 5120 (path 141) and 5122 (path 142). Since the value of ΔY is known for each of these states, the positive or negative sign of the slope S then depends upon the value of ΔX. Since ΔX was calculated in state 5012 (Page A25) the slope S of the P1P2 line 34 is determined according to the sign of ΔX in the various states 5121, 5120 and 5122. Similarly, if ΔY is equal to 0, the path 140 for state 5021 is taken and the sign of the slope S determined according to the states listed. These are shown in FIG. 7B as 5220 (path 147), 5221 (path 148) and 5222 (path 149). Similarly, for ΔY<0, the path 146 for state 5022 branches to state 5320 (path 150), 5321 (path 151) and 5322 (path 152) with similar results as to the sign of the slope S.

Referring to path 144 for state 5020, the determination of ΔX that was started in state 5012 is completed by writing ΔX into RAM location 400 of RAM 153 (FIG. 6). The next addresses called at the end of state 5020 are conditional states 5120, 5121 and 5122 according to the value of ΔX, as noted above. Considering state 5121 for the ΔY>0 and ΔX=0 (path 140), the line 34 represented in this case is a vertical line 154 having a 0 slope as shown in FIG. 12. The SELECT FLAGS2 and LOAD FLAG REG instructions cause a slope flag signal 70 to be saved in the flag register 86 (FIG. 5) as a positive slope flag. The next address signal called by state 5121 is for state 5500, discussed later. The state in which the SELECT FLAGS2 and LOAD FLAG REG instructions are processed depends upon whether the P1P2 line 34 in question is an X MAJOR line 156 or Y MAJOR line 155 (FIG. 12). For example, considering state 5120 (path 141, FIG. 7B), since ΔY>0 and ΔX>0, the slope S is positive (see lines 155 and 156 in FIG. 12). For the X MAJOR line 156, the SELECT FLAGS2 and LOAD FLAG REG instructions are processed in state 5132 (path 157) to which the algorithm has branched. Similarly, for the ΔY>0, ΔX<0 situation, which is indicated in FIG. 1 by the Y MAJOR P3P2 line 34, state 5142 (path 158) is branched to the Y MAJOR P3P2 line 34 and the instructions SELECT FLAGS2 and LOAD FLAG REG are used to cause the negative flag signal 70A that corresponds to the P3P2 line 35 to be stored in the flag register 86 (FIG. 5).

Determination of Slope S Signal 55

The processor 95 also computes the slope S signal 55 during the operations that are initiated under the respective states 5020, 5021 and 5022 (FIG. 7B). In particular, state 5020 includes a sixth instruction that sets up ΔX as the denominator for the slope S. If ΔX>0, then the path 141 is taken and in state 5120 (Page A26) the fourth instruction performs this same function. Similarly, if ΔX<0, state 5122 calls next address 5177 and in state 5177 the second instruction causes this function to be performed.

Considering the branch to state 5120 again, the next address is to state 5170. The eleventh instruction in state 5170 is for a setup for the slope calculation. Branching to path 157 for states 5132 and 5160 following state 5170, there are set-ups for the slope denominator. Further, in state 5700 there are instructions for the normalized ΔY and ΔX signals 54 to be input to the multiplier 100. Between states 5700 and 5751, the multiplier 100 carries out the multiplication of the ΔY times the inverse value of ΔX to obtain the slope. In states 5720 and 5721, the output signal 55 for the slope S is enabled onto the MBUS.

Determining Top of Line 34

Initially, it is understood that the line drawing system 49 does not necessarily receive the input signals 51 for the points P1 and P2 in the order in which they are to be drawn. Rather, referring to FIGS. 1 and 3A, the first of the input signals 51 (for either of the points P1 and P2) received by the input processor circuit 52 is identified as "BEG" and the second as "END". Since the line drawing system 49 draws the P1P2 line 34 in the +y direction, the BEG point (the first one received or the "move to" point) may not be the top point P1 (pixel 37 in FIG. 1) that is drawn from. To identify the BEG or END point as the TOP point P1, the following calculation is performed:

$$y(end) - y(beg)$$

Therefore:
If NEGATIVE, y(end) < y(beg), then TOP = END
If POSITIVE, y(end) ≧ y(beg), then TOP = BEG.

This calculation is performed by the input processor in state 5011 (FIG. 7A). Initially, it is noted that in state 5012, there is a LOAD FLAG REG command. The sign of this calculation is output by the processor 95 as a NEG flag signal 70A that can be negative or positive. The LOAD FLAG REG command causes the NEG flag signal 70A to be stored in the flag register 86 prior to inputting it to the parameter register 88. The writing to the parameter register 88 occurs in state 5020 (instruction LOAD PREG).

The determination of NEG TOP flag signal 70A that is input to the flag register 86 is dependent upon the sign of the ΔY calculation. In state 5011, this is indicated by instruction PROC:RA1.-.RB17→B. This instruction causes the processor 95 (FIG. 6) to read the y coordinate of the END point P2 from the RA1 processor register 96 and to read the y coordinate value of the BEG point P1 from the RB17 processor register 96. The two are subtracted by the processor 95 and then the resulting ΔY is written into the RB17 processor register 96 again. The processor 95 also outputs the sign of the result as the NEG flag signal 70A that can be negative or positive. The flag signal 70A is stored in the flag register 86, which outputs a FREGDAT1 signal 70B that is stored in the parameter register 88. If the NEG flag signal 70A is negative, the YMAJ signal 56 is output by the parameter register 88", whereas if the NEG flag signal 70A is positive, the XMAJ signal 56 is output by the parameter register 88" and a TOP flag signal 70 is output by the parameter register 88'. The identification of the BEG or END point P1 or P2 as the TOP point P1 is done to insure consistent accuracy of the lines drawn by always drawing from top to bottom regardless of the order in which the points P1 and P2 are input to the line drawing system 49.

Another aspect of the identification of the BEG and END points and their relationship to the TOP and BOTTOM points of a line, such as the line 34, relates to the transition from drawing one line to the next line where the lines are continuous and separated by a middle point, such as P2, that is common to both lines. For example, as shown in FIG. 1, P1P2 line 34 is drawn and then P2P3 line 35 is drawn. The point P2 is common to both lines 34 and 35. Therefore, the data for the point P2 is in the integer RAM 109 (FIG. 8) identified as "END" along with the fractional data in the fractional storage circuits 107 and 108. Thus, at the start of processing the second P2P3 line 35, a readdressing is done so that the previous END point P2 becomes the beginning (BEG) point. For this purpose, the BETOGGLE toggle signal 113 (FIGS. 5 and 10) is input to the parameter register 88". Referring to FIG. 10, the BETOGGLE signal 113 causes the parameter register 88" to output the SELBEGEND signal 111 to an inversion gate 159 (FIG. 8) connected to the END section 109 of the current matrix address circuit 61. The inverter 159 also receives a TOPINVERT signal 160.

Referring to FIG. 8, it may be understood that at the end of the processing of the P1P2 line 34, when it is desired to draw to point P3 from point P2, the integer RAMs 109 and 110 will have received the X and Y integer-matrix signals 53 representing the matrix addresses for both the points P2 and P3. Also, as noted above, the SELBEGEND signal 111 is addressed to the point P2 as the last END point. Based on the sign of ΔY that was previously calculated and stored in the parameter register 88 (FIG. 10) as the TOP flag, and ith the SELBEGEND signal 111 pointing to the point P2 as the END, the parameter register 88' generates the TOPINVERT signal 160 in the event that the point P3 is above the point P2, which it is in the example shown in FIG. 1. The TOPINVERT signal 160 coincides with the SELBEGEND signal 111 in this example. However, if the point P2 is above the point P3, no TOPINVERT signal 160 is output. Thus, the TOPINVERT signal 160 either switches that address of the point P2 or not depending upon whether the beginning (BEG) point (P2) is the TOP POINT (switch, since "the draw point" is always the end point) or the BEG point P2 is the BOTTOM point (no switch). Thus, the TOPINVERT signal 160 controls the inversion gate 159 (FIG. 8) to select as the TOP point either the beginning point (BEG) or the ending point (END) depending upon which one has the least y value. The integer X and Y signals 53 that are output as the TOP values are output into the X matrix counter 116 (FIG. 9) and the Y matrix counter 117 (FIG. 8) to provide the address of the specific matrix 38 in which the TOP point P3 is located.

Fractional Storage Circuit 107

The fractional storage circuit 107 is designed to receive the x and y fractional signals 66, if any, for each of the BEG and END points P1 and P2 of the line 34. As described above, the x and y fractional signals 66 represent the pixels 32, if any, that remain after the X and Y integer-matrix addresses are determined. Referring to FIG. 13, the fractional storage circuit 107 is shown including a programmable array logic (PAL) circuit 161 for the x fractional of the BEG point P1 (pixel 37) and a PAL circuit 162 for the y fractional of the BEG point P1 (pixel 37). The PALs 161 and 162 are loaded in response to appropriate *LDXFRAC and *LDYFRAC signals 163. This occurs in response to the MOVE command (input signal 51) described above. In FIG. 7A (path 164), this is shown in states 5212 and 5213 where the "save y/4 result" and "save x/5 result" comments indicate that the y and x fractionals for the BEG point P1 are stored. The SEL-BEGEND signal 111 is applied to the PALs 161 and 162 and to indicate that the signal 66 represents the BEG point P1.

As noted above, after the MOVE command, the input signal 51 provides the DRAW command. In FIG. 7A, the END point P2 is processed in states 5010 through 5012 (path 143) to obtain the x and y fractional signals 66 for the END point P2. The *LDXFRAC and *LDYFRAC signals 163 and the SELBEGEND signal 111 cause the x and y fractional signals 66 to be loaded into the PALs 161 and 162 to represent the END point P2.

Referring again to FIG. 13, two additional PALs 165 and 166 respond respectively to the X PAL 161 and to the Y PAL 162. The PALs 161 and 162 identify the BEG and END points P1 and P2 as the top and bottom points in response to a SELBEGENDTOP signal 167 (FIG. 8) generated by the inverter gate 159 in response to the SELBEGEND signal 111 and the TOPINVERT signal 160.

The PAL 161 outputs three signals 169 and three signals 170 that represent either BEG or END fractional x values. The PAL 162 outputs two signals 171 and 172 that represent either the BEG or END fractionals. Thus, when the signals 169 and 171 represent BEG, the signals 170 and 172 represent END.

The PALs 165 and 166 generate the x and y fractional signals 66, that are shown as *XT0 through *XT2 and *XB0 through *XB2 for the top and bottom x fractional, and as *YT0, *YT1, *YB0 and *YT1 for the top and bottom y fractional values.

The input processor 52 sets up the next line 34 while the current line 34 is being processed through the matrices 38. The fractional signals 66 for the current line 34 are stored in the registers 165 and 166, whereas at that time the PALs 161 and 162 store the BEG and END fractional signals 66 for the next line. Multiplexers 168' and 168" respond to the SELBEGENDTOP signal 167 for reading the TOP fractional signals 66 for the next line 34 from the PALs 161 and 162. Such signals 66 are output onto IBUS to the processor 95 so that $B_{ex0}$ can be calculated for the next line.

Determination of X MAJOR and Y MAJOR Flag Signals 56

As indicated above with respect to FIG. 7B, the branch according to the sign of $\Delta Y$ can be taken into path 144, 145 or 146. Referring to Appendix A, the operations for determining the X MAJOR signal 56 and Y MAJOR signal 56 are summarized under states 5020 (path 144), 5021 (path 145) and 5022 (path 146). In each of paths 144, 145 and 146, a further branch can be taken according to the sign of $\Delta X$. Considering the path 144, the subsequent path 141 corresponds to $\Delta X>0$ and relates to state 5120, which branches to state 5170, which in turn branches to next addresses 5130 and 5132 according to the relative values of $\Delta Y$ and $\Delta X$.

Considering state 5120 (path 141) that corresponds to an X MAJOR line 34, the processor 95 is instructed to perform the $\Delta X - \Delta Y$ operation by instruction "PROC: RA16 .—. RB17→—". According to the results of processing this instruction, either an X MAJOR flag or a Y MAJOR flag is set. If an X MAJOR flag, in state 5170 the "SELECT FLAGS1" instruction saves the X MAJOR flag and in state 5130 an X MAJOR flag signal 56 (FIG. 3A) is output. If Y MAJOR, the "DISP" instruction in state 5170 indicates a dispatch to state 5132 (path 157, FIG. 7B) where the SELECT FLAGS2 instruction indicates that the flag signal 56 is for the Y MAJOR line. The flag register 86 (FIG. 5) is loaded in state 5751, for example.

Thus, it is seen that at the end of state 5170 the relative value of $\Delta X$ and $\Delta Y$ has been determined. The path 141 branch from the path 144 is typical of the other branches to states 5122 (path 142), 5320 (path 150) or 5322 (path 152), for example.

Loading Loop Counter Circuit 64

During the set-up processing, as $\Delta Y$ was obtained, branching occurred according to the sign of $\Delta Y$. This sign of $\Delta Y$ is also used in the calculation of the number of matrices in each of the x and y direction that the P1P2 line 34 passes through in extending from point P1 to point P2. In particular and referring to FIGS. 3A, 6 and 15, the sign of $\Delta Y$ determines which of the Y matrix addresses (for the point P1 or the point P2) is subtracted from the other to develop the number of Y matrices 38 through which the P1P2 line 34 extends so as to obtain the delta signal 54 (FIG. 3A) in the form of a Y delta signal 173 having a negative value. The Y delta signal 173 is input into a Y loop counter 174 of the loop circuit 64. In response to such negative Y delta signal 173, the Y loop counter 174 is set to its minimum value. As discussed below, as the Y loop counter 174 is incremented, it counts up to its maximum value and outputs a YDONE signal 175 to a vector end circuit 176 (FIGS. 3B and S38). The YDONE signal 175 indicates that the processing of the P1P2 line 34 in the y direction has been completed.

The use of the sign of $\Delta Y$ in this manner is indicated in state 5020 where the instruction "PROC: RA3 .—. D−1→RB3" indicates that the Y integer for the M4 matrix 38 has subtracted from it the Y integer for the M1 matrix 38 at the beginning of the P1P2 line 34. This $\Delta Y$ delta signal 173 is written into the RB3 location of the register 96 and in response to the next instruction ("LOAD PREG") is written into a processor register 177. In state 5121, the Y delta signal 173 is output to the OBUS and in the next instruction is written into the Y loop counter 174 (FIGS. 3A and 13).

Referring to FIG. 7B, in a similar manner for the $\Delta X>0$ and $\Delta Y>0$ situation, the fifth instruction of state 5170 results in the subtraction to generate an X delta signal 178 (FIG. 15), which is written into the processor register 177. Then, in state 5130 the X delta signal 178 is written into the OBUS and in the next instruction is written from the OBUS into an X loop counter 179 (FIG. 15). The X loop counter 179, as a result of the X and Y delta signals 178 and 173, each of the X and Y loop counters 179 and 174 is set to a negative counter value according to the number of matrices 38 in each of the respective x and y directions through which the P1P2 line 34 extends. As discussed below, as the X loop counter 179 is incremented, it counts up to its maximum value and outputs an X done signal 180 that is applied to the vector end circuit 176.

As shown in detail in FIG. 15, other inputs to each of the X and Y loop counters 179 and 174 include the respective *LDXLR and *LDYLR signals 182 and 183 for loading the register (not shown) of the respective loop counter 179 and 174. An *LDXYLC signal 184 is input to both of the X and Y loop counters 179 and 174 for loading the counters from the registers. The respective X and Y loop counters 179 and 174 also receive the *ENX next matrix signal 63 that enables the X loop counter 179 to increment (count up) by one. A similar *ENYLP next matrix signal 63 enables the Y loop counter 174 to increment by one. Having been initially loaded with the appropriate ΔX and ΔY values, the X or Y loop counter 179 or 174 that receives the *ENX or *ENYLP next matrix signal 63 from the next matrix circuit 57 increments up one unit. When the particular X or Y loop counter 179 or 174 has reached its or their maximum value(s), it or they output the respective XDONE or YDONE signal 180 or 175 indicating that the maximum value has been achieved and that the last M4 matrix 42 has been reached in the respective x or y direction. In response to the coincidence of the respective XDONE and YDONE signals 180 and 175, an AND gate 186 of the vector end circuit 176 generates the vector end signal 65 and outputs same to the mask enable circuit 67 and to the next matrix circuit 57.

Mask Enable Circuit 67

Referring now to FIG. 3B, the respective X and Y sections 68 and 69 of the mask enable circuit 67, function in respect to both the first (M1) matrix in a line, such as the M1 matrix 39 of the P1P2 line 34, and the last (M4) matrix for the line, such as the M4 matrix 42 of the P1P2 line 34. As noted above with respect to FIGS. 1 and 2, since the P1P2 line 34 starts at the first pixel 37, the pixels 36 beyond the P1P2 line 34 should not be write enabled. However, the write enable signals 60 represent the path of the P1P2 line 34 across the entire first (M1) matrix 39, thus, the write enable signals 60 for the pixels 36 beyond the P1P2 line 34 must be disabled or "masked". The mask enable signals 71 represent the pixels 33 in the first, M1 matrix 39 that are write enabled. Such pixels 33 are not beyond the end pixel 37 of the P1P2 line 34.

Similarly, the vector end signal 65 representing the last (M4) matrix 42 of the P1P2 line 34 initiates a masking operation. The mask enable circuit 67 also generates the mask enable signals 71 for the last or M4 matrix 42.

Referring to FIGS. 14 through 19, the x and y mask enable signals 71 are shown in FIG. 15 as being generated by the mask enable circuit 67 in the form of nine signals 71, such as the *YABCDE signal 187 that corresponds to the A through E row of pixels 32 and such as the *XAFKP signal 188 that corresponds to the A through P column of pixels 32. As illustrated in FIG. 14, the signals 187 and 188 combine to prevent or "mask" the A pixel 33 if either of the signals 187 or 188 is "1", whereas if both are not "1", then the A pixel 33 will be enabled to be written. It may be understood that the signals 187 and 188 are controlled so as to mask the pixels 36 that are beyond each end of the P1P2 line 34.

Considering FIG. 15 in detail, the x mask enable section 68 and the y mask enable section 69 include respective programmable array logic (PAL) circuits 189 and 190, each of which is programmed to generate the appropriate signals 187 and 188 to combine to perform such masking. The PAL circuits 189 and 190 receive the vector end signal 65 from the AND gate 186. The SLOPENEG signal 55 is applied to the PAL circuit 189 and controls whether masking will occur to the left or right of the x address of the BEG point, e.g. for the P1P2 line 34 the masking will be to the left. A MASKBEG signal 191 is applied to the PAL circuits 189 and 190 to initiate masking with respect to the M1 matrix 39. *YT0 through *XT2, *XB0 through *XB2, *YT0 through *YT1, and *YB0 through *YB1 signals 192 representing the top and bottom pixels 32 in a matrix 38 are applied to the corresponding x and y PAL circuits 189 and 190 to identify the pixel 32 from which masking is referenced. The PAL circuits 189 and 190 respond to the vector end signal 65 and, according to the data represented by the signals 55, 191 and 192, generate the mask enable signals 187 and 188. Referring again to FIG. 14, A may be understood that if the "H" pixel 32 is the end of a line that is to be drawn through the "H", "N", "T" pixels 32, then the *XAFKP and *XBGLQ signals 188 are "1" and the *YABCDE signals 187 are "1".

The PAL circuit 190 also responds to *XEN and *YEN signals 193 from the next matrix circuit 57 for generating the *ENX signal 63 and a *ENYLP signal 194 and a *ENY signal 195.

Matrix Adjust Circuit 73

As shown in FIG. 4 and described above, there are four types of matrices 38. The pixel write enable circuit 59 shown in FIG. 3B always outputs the pixel ON or write enable signals 60 for the Type 0 matrix 38 where the pixels 32 are designated A through E in the top row and F through T in the remaining three rows. As noted above with respect to FIG. 11, the bit plane memory 72 has one of the storage devices 120, etc. for each of the pixels A through T.

Referring to FIG. 16, the matrix adjust circuit 73 receives the write enable signals 60 for a given matrix 38 and adjusts them according to the pattern of A through T storage devices 120 that exists for the particular matrix 38. Thus, depending on where the current matrix 38C is on the screen 30, the write enable signal 60 is adjusted for one of the four different matrix Types 0 through 3.

The matrix adjust circuit 73 is shown in FIG. 16, including five programmable array logic circuits 196 through 200 that together receive twenty *WRT A through T write enable signals 60 from the write enable circuit 59 shown in FIGS. 3B and 19. Each of the five programmable array logic circuits 196 through 200 is effective to selectively transpose the write enable signals 60 for the matrix Type 0 into any one of the four matrix Types 0 through 3 that must be output depending upon which matrix Type is being processed as the current matrix 38C. Also, *XMC0 and *XMC1 signals 201 and 202 are input to the matrix adjust circuit 73 to indicate which matrix Type is the type for the current matrix 38C. These *XMC0 and *XMC1 signals 201 and 202 are the least significant bits from the X matrix counter 116 (FIG. 9). There is no output of this type from the Y matrix counter 117 (FIG. 8) because there is no change in the matrix types as one proceeds in the +y direction. The *XMC0 and *XMC1 matrix type signals 201 and 202 from the X matrix counter 116 cause each of the programmable array logic circuits 196 through 200 to convert the *WRT A through T write enable signals 60 as necessary depending on the Type of the current matrix 38C. The programmable array logic circuits 196 through 200 collectively output the final write enable signals 74 for the selected ones of the pixels of a given current matrix 38C that must be ON in order to draw the P1P2 line 34 from point P1 to point P2. These write enable signals 74 are passed through the write enable buffers 75 (FIG. 3B) and represent the final signals that are output by the line drwing system 49 to enable each of the twenty storage devices 120 that are used to store the pixel data for each pixel of the current matrix 38C.

Referring also to FIGS. 2 and 19, the need to perform the masking operation may be appreciated. In particular, the write enable circuit 59 is effective to enable all twenty pixels of each current matrix 38C. Thus, the input that determines which pixel 32 within a given matrix 38 should be ON is determined by the output signal 60 from the write enable circuit 59. However, with respect to the first (M1) matrix 39 and the last (M4) matrix 42, the masking operation must occur if the first pixel 37 is not at an edge of the matrix 39. In particular, referring to FIG. 16, in addition to adjusting the twenty write enable signals 60 (*WRT A through T) according to the matrix Type, the matrix adjust circuit 73 receives the mask enable signals 187 and 188 (FIG. 15) in the form of the separate *XAFKP *XBGLQ, *XCHMR, *XDINS, *XEJOT signals 187 and the separate *YABCDE, *YFGHIJ, *YKLMNO, *YPQRST signals 188 that were generated by the mask enable circuit 67. Each PAL 196 through 200 (FIG. 16) receives one of the X enable signals 188 and all of the above Y enable signals 187. Thus, as shown in FIG. 16, the particular programmable array logic device 196 through 200 responds to one of the five X mask enable signals 188 and all of the Y mask enable signals 187 that indicate which column of pixels 33 within the given current M1 or M4 matrix 39 or 42, respectively, is to be enabled. With respect to a given column, the particular programmable array logic device 196 through 200 will enable a particular pixel 32 according to whether the write enable signal 60 indicates whether that particular pixel 32 (A, F, K, or P for the programmable array logic device 196) is ON or OFF.

Additional DRAW ENTRY Processing

The input processor 52 (FIG. 3A) performs additional processing for set-up. In particular, after the slope signal 55 for the line 34 is enabled to the CBUS and then to the MBUS (see state 5600, Page A53), it is written into a slope register 203 (shown in two sections 203' and 203'') of the next matrix circuit 57 (FIGS. 3A and 17). The slope register 203' is shown in FIG. 17 as receiving the slope signal 55 for the line 34 from the MBUS. The slope register 203 receives a *LDSLOPE signal 205 that controls the writing of the slope signal 55 into the slope register 203. To enable the line drawing system 49 to process two lines, such as the successive lines 34 and 35, a second slope register (not shown) is provided for receiving the slope signal 55 for the line 34. CBUS supplies such slope signal 55.

Referring to FIG. 2, it may be appreciated that the slope S must be a negative value because the slope is only used in a calculation to determine the y value of the P1P2 line 34 at x=4 within the current matrix 38C (see FIG. 2). Such y value is shown in FIG. 2 as "$B_{ex}$-S", which requires adding the negative slope S to the $B_{ex}$ value. On the other hand, the sign of the slope S is needed for an input to the write enable circuit 59 so that it can determine which pixels are to be enabled within a given current matrix. As shown in FIGS. 17 and 21, the slope register 203' outputs a SLOPESIGN signal 206 that is applied to the next matrix circuit 57 to indicate the value of the slope S and the sign (either (−) or 0) of the slope S. The slope register 203'' outputs a SLOPENEG signal 207 that represents the actual sign of the slope S. The SLOPENEG signal 207 is input to the x fractional holding register 165 (FIG. 13) and is used to determine which of the BEG and END points P1 and P2 is the TOP point. For example, considering a point P1 having an x coordinate value of +1 and a point P2 having an x coordinate value of +6, the designation of the line P1P2 as having a (−) slope indicates that P2 is the TOP point. The value of the slope S is output as the slope signal 55 on lines SLOPE 3 through 7 and on lines SLOPE 8 through 14.

Constant Register 208

As is evident from FIGS. 7A and 7B, the line drawing system 49 has a separate path for each of thirteen situations in which there may be various combinations of ΔY values, ΔX values, X MAJOR and Y MAJOR situations, and the slope S (being 0 or not 0). Each of these 13 output paths leads to one of five further states, namely states 5400, 5500, 5600, 5601 and 5700. Referring to Page A4, these five states, and the resulting four paths 209, 210, 211 and 212 are described. These five states enable the processing of a line 34, such as the line P1P2, that is in any one of six directional conditions. Referring to FIG. 12, these six conditions include a line 213 that is X MAJOR with (−) slope S, a line 214 that is Y MAJOR with (−) slope S, the line 154 that is Y MAJOR with slope S=0 (which for purposes of the SLOPENEG signal 207 (FIG. 17) is treated as being (+)), the line 155 that is Y MAJOR with (+) slope S, the line 156 that is X MAJOR with (+) slope S, and a line 215 that is X MAJOR with slope s=0.

The path 209 corresponds to the X MAJOR line 215 having a slope=0, such that the line 215 is horizontal. The path 210 corresponds to the vertical, Y MAJOR line 154 treated as having a positive slope. The path 211 relates to the X MAJOR line, such as the P1P2 line 34 where the slope S is positive. (This is shown in FIG. 12 as the line 156.) The path 211 also relates to the X MAJOR line 213 with a negative slope S. The path 212 corresponds to a Y MAJOR line, such as the P3P2 line 35 (FIG. 1), in which the slope S is not equal to 0 and is positive. (See also line 155 in FIG. 12.) The path 212 also corresponds to the Y MAJOR line 214 with a negative slope S.

It is to be understood that no matter which of the paths 209, 210, 211, and 212 is taken, the input processor circuit 52 is effective to supply the next matrix circuit 57 with the "A", "B", and "AB" constants that are used in the next matrix processing. As discussed previously, these constants were defined in respect to the P1P2 line 34 as shown in FIG. 2, which is an X MAJOR line. For such X MAJOR line, it was noted previously that the "A" constant is −4 for the P1P2 line 34 and that the "A" constant is used when the next matrix 38N is the M2 matrix 40 relative to the M1 matrix 39, for example. Also, the "B" constant is +3.2 for the P1P2 line 34 and is used when the next matrix 38N is the M3 matrix 41 relative to the M2 matrix 40, for example. The "AB" constant is −0.8 for the P1P2 line 34 and is used when the next matrix is the M4 matrix relative to the M3 matrix, for example. From the computational standpoint, the "A" constant is known once the number of pixels 32 in a matrix 38 is known. As to the "B" constant, the slope S must be multiplied by 5, which is also known from the number of pixels 32 in the matrix 38. The "AB" constant results from the addition of the "A" and "B" constants. For a Y MAJOR line, the constants are shown in Chart II when the matrix 38 is 5 by 4 pixels as shown in FIG. 1:

Chart II

| Constant | Value |
| --- | --- |
| A | −5 |
| B | +4S |
| AB | −5 + 4S |

Also, the amount used in the translation to a new reference line R is 4.5 rather than 3.5.

A constant register 208 is shown in FIG. 17 as including two chips 216 and 216'. The chip 216 has three registers (not separately shown but) identified as "AB", "B" and "A". The AB register of the chip 216 stores the lower 8 bits of the AB constant, the B register stores the lower 8 bits of the B constant and the A register stores the lower 8 bits for the A constant. The chip 216' also has three registers (not separately shown but) identified as "AB", "B" and "A". The AB register of the chip 216' stores the upper 8 bits of the AB constant, the B register stores the upper 8 bits of the B constant and the A register stores the upper 8 bits for the A constant.

To enable set up for one line 34 while the current line is being processed, duplicate chips 217 and 217' are provided, each having the same functions as the chips 216 and 216'.

The loading of the chips 216 and 216' is done via MBUS0 through 15 in response to the *LDCONSTANT signal 218. The constants "A" and "B" are supplied to the registers 216, 216', 217 and 217' via respective MBUS0 through 7 and 8 through 15.

Each of the four paths 209 through 212 (FIG. 7B) results in writing the next matrix constants into the constant register 208. For example, when in the two situations in which the slope is 0, the constant register 208 is loaded with a 0 value in both cases. On the other hand, when considering the X MAJOR path 209, values are written to all three of the AB, B and A registers 216 and 216' of the constant register 208. These values that are written into the constant register 208 have been processed by the input processor 52 as indicated on Page A13.

Referring to FIG. 16 and to Page A13, the "AB CONSTANT REG" notation indicates that the "(−5×slope S)+(−4)" computation is the result of combining the A and B constants. Thus, because of the direction in which the M4 matrix 42 appears relative to the M3 matrix 41, translations in both the (+)x and the (+)y direction are required.

Processing Constants "A", "B", and "AB"

Referring to Appendix A, an example of the processing of the "A", "B", and "AB" constants is shown starting in state 5652 which results in loading a product register 220 (FIG. 6) of the multiplier 100 as a setup for the "(−5) * slope S" operation for the "AB" and "B" constants. The output from the product register 220 (the B constant) is enabled to the MBUS in state 5653. The constant register 208 is loaded from the MBUS (state 5653). Also, in state 5653 the B constant is loaded into the processor register 96 where it is added to the A constant in state 5654. In state 5654 the sum (the AB constant) is loaded in PREG 177. In state 5637 the AB constant is loaded into the constant register 208.

Processing Intercept $B_{ex0}$

Referring to FIG. 2, the P1P2 line 34 is shown as an X MAJOR line. As discussed previously under the heading "Line 34/Matrix 38 Relationship", because the line 34 does not intersect the left hand side of the M1 matrix 39, the intercept $b_{ex0}$ of the previous line 34 with the left side of the M1 matrix 39 must be calculated. As noted previously, the intercept $b_{in1}$ is derived directly from the $b_{ex0}$ intercept. The $b_{ex0}$ calculation (Equation (2)) is done in response to an intercept instruction by adding to the y fractional value of pixel P1 in the matrix 39 the product of the slope S and the x fractional value. This in effect is a calculation of where the extended P1P2 line 34 intersects the left hand side of the M1 matrix 39. The x and y fractionals that were used to obtain such intercept are inherently in the matrix coordinate system of the M1 matrix 39 since they were fractionals obtained in the integer calculation. In order to convert them to the decision point coordinate system (in which the decision points D1 and D2 of the M1 matrix 39 are at a 0 y coordinate value), the $b_{ex0}$ intercept value is adjusted by −3.5 (Equation (3)) because the decision points are at a +3.5 y direction location relative to the 0,0 coordinate location of the M1 matrix 39 (upper left hand corner of matrix 39). Referring to FIG. 7B, in state 5600 the IBUS receives signal 219' (FIG. 6) representing a −3.5 value, that is used for adjusting the coordinate system of the M1 matrix 39. The last instruction in the 5600 state is "PROC: D .OR. O→RB17" which calls for reading the −3.5 value signal 219' and writing it into the register 96 (FIG. 6). The next address called at the end of state 5600 is state 5652. Next, the top y fractional register 166 (FIG. 13) is read to apply the y fractional signal 66 to the processor 95 for calculating the initial intercept $b_{ex0}$ (FIG. 2) of the M1 matrix 39. If the line 34 were a Y MAJOR line, then the x fractional signal 66 would be used instead of the y fractional signal 66. The fifth instruction in state 5652 initiates the calculation of the initial intercept $b_{ex0}$ (FIG. 2) of the M1 matrix 39 by adding −3.5 to the y fractional value. The sum is written into the RB17 processor register 96. State 5652 calls state 5653 which results in calls to states 5654, 5626, and 5637. The processing of $B_{ex0}$ concludes in state 5676 with the output of the intercept signal 58 (FIG. 6) in the form of an intercept $B_{ex0}$ signal 219 (FIGS. 18, 19 and 21) to OBUS and then to a $B_{ex}$ register 226 (FIGS. 3A, 18 and 21).

Next Matrix Circuit 57—Intercept Registers 226 and 231

The next matrix circuit 57 includes the intercept $B_{ex}$ register 226. In FIG. 18, the $B_{ex}$ register 226 is shown as four chips 226A, 226B, 226C and 226D, each storing 4 bits of the signal 58 representing intercept $B_{ex}$. A *LDINT signal 229 enables the $B_{ex}$ register 226 to receive the $B_{ex}$ signal 219 from OBUS. As shown in FIG. 18, there is also another $B_{ex}$ intercept input to the $B_{ex}$ register 226. This is in the form of NEXTINTB0 through 15 signals 227 that are calculated in the next matrix ciricuit 57 (FIG. 21) for the $B_{ex}$ intercept of one of the matrices 39 through 42. An ENPG signal 230 enables the $B_{ex}$ register 226 to register the NEXTINTB0 through 15 signals 227.

Referring to FIG. 2, it may be understood that the $B_{ex}$ intercept is related to the $B_{in}$ intercept of the next matrix 38N in different ways according to where the next matrix 38N is located relative to the current matrix 38C. For $B_{ex0}$, as noted above, $B_{in1} = B_{ex0}$ (Equation (5)). This equality is achieved by applying the $B_{ex0}$ signal 219 from the $B_{ex}$ register 226 to a $B_{in}$ register 213 (FIGS. 19 and 21) to provide the intercept signal 58 in the form of a $B_{in}$ signal 232. The same equality can be achieved for $B_{ex2}$ and $B_{in3}$ (Equation (8)) since there is no y direction translation going from the M2 matrix 40 to the M3 matrix 41.

As to the translation from the M1 to the M2 matrices 38 and from M3 to the M4 matrices 38, there is a translation of y= −4 in each case since a new reference line, respectively R2 and R4, is used. In the preferred embodiment, the $B_{in}$ register 231 responds to a decision B signal 233 from the next matrix circuit 57 by adding −4 to the $B_{ex}$ signal 227 to output the $B_{in}$ signal 232 of the proper value. The decision B signal 233 represents the "y" coordinate translation between the M1 and M2 matrices 38 and the M3 and M4 matrices 38.

Write Enable Circuit 59

The intercept signal 58 (FIG. 3B) in the form of the $B_{in}$ intercept signal 232 is thus generated by the intercept $B_{in}$ register 231 and is input to a PROM 234 of the write enable circuit 59 shown generally in FIG. 3B and in FIG. 19. The PROM 234 is programmed to generate the *WRTA, *WRTF, *WRTK, and *WRTP write enable signals 60 in response to the SLOPENEG signal 207, the XMAJ signal 56, the $B_{ex}$ intercept signal 219 and the $B_{in}$ intercept signal 232. Similar PROMS 235, 236, 237, and 238 respond to the same signals for generating different ones of the write enable signals 60, such that the five PROMS 234, 235, 236, 237, and 238 as a group generate all of the *WRTA through T write enable signals 60. As indicated above, the *WRTA through F write enable signals 60 are applied to the matrix adjust circuit 73 shown in FIG. 16.

The PROMs 234 through 238 are programmed with data for each possible combination of input, including MAJOR flag signal 56, slope signal 55, intercept $B_{in}$ and $B_{ex}$ signals 58 for a given matrix 38. A standard PROM programmer (not shown) receives such data in the form of the results of processing a "pixel_prom" program discussed below.

Next Matrix Circuit 57—Adders, Registers and DDL Circuit

Referring now to FIG. 21, the next matrix circuit 57 is shown generally including the intercept $B_{ex}$ register 226, the $B_{in}$ intercept register 231, adders 239 and 240, the slope register 203, the constant register 208, a decision register 241, and a direction decision logic ("DDL") circuit 242.

Figure 20:
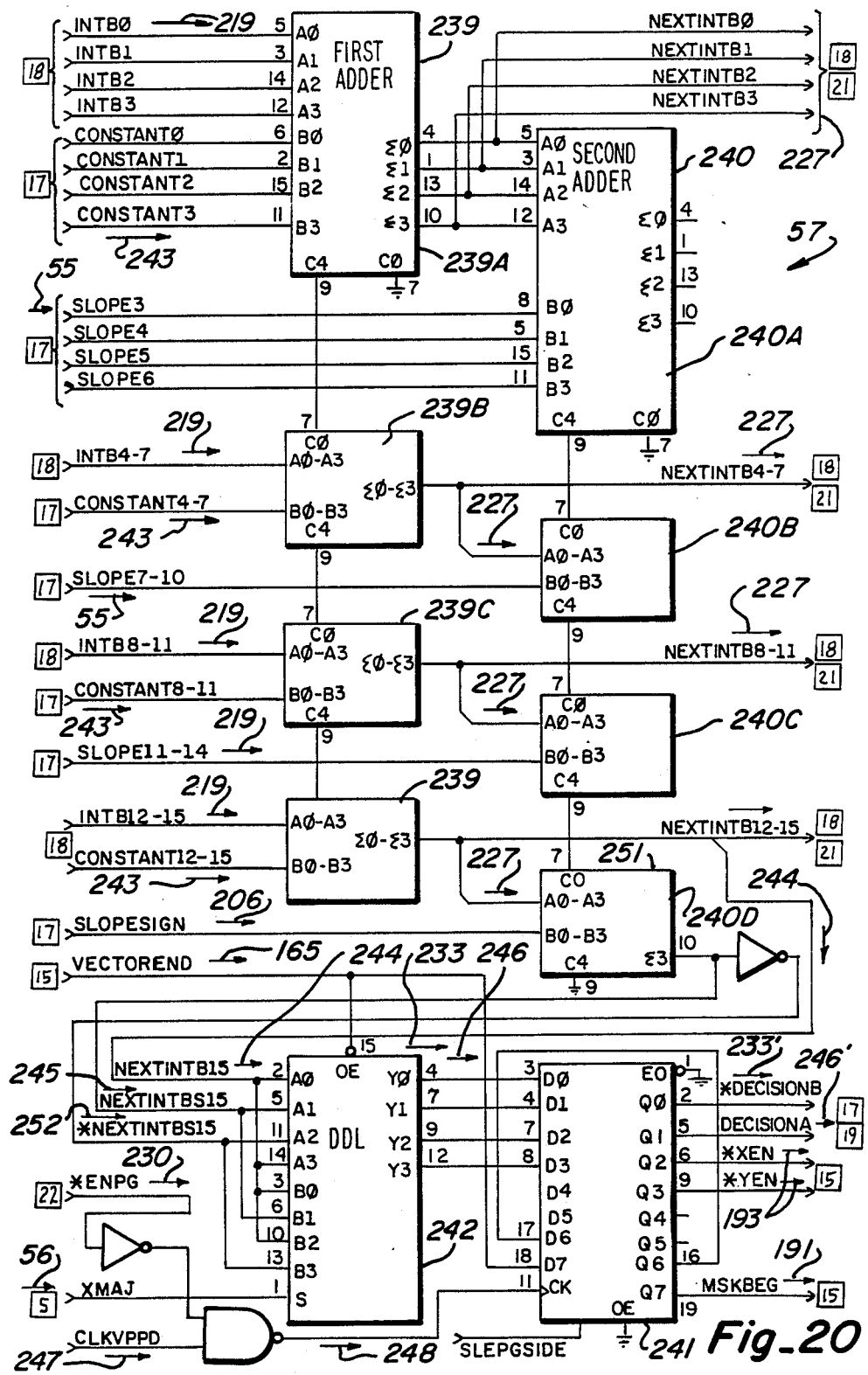
FIG. 20 is a schematic diagram of a portion of a next matrix circuit showing two adders for providing signals representing where the line exits a matrix and where it enters a decision pixel in such matrix, and showing decision direction logic that identifies the next matrices through which the line extends.

The adder 239 is shown in detail in FIG. 20 as having four sections 239A, 239B, 239C, and 239D that receive different bits of different signals input thereto. The adder 239 initially receives the $B_{ex}$ signal 219 (shown on lines INTB0 through 15 in FIGS. 18 and 20) from the $B_{ex}$ register 226. The other input to the adder 239 is from the constant register 208 that outputs a constant signal 243 representing the AB, B or C constant depending on the location of the next matrix 38N. The adder 239 initially receives the B constant signal 243 and the $B_{ex0}$ intercept signal 219, such that the sum is expressed as:

$$B_{ex1} = B_{ex0} + 5S = +1.06 \quad (4)$$

for the matrix 39 as shown in FIG. 2. The other functioning of the first adder 239 (FIG. 20) is described below with respect to the operation of the next matrix circuit 57 in respect to the P1P2 line 34. There are two outputs from the adder 239, one being the NEXTINTB0 through 15 signal 227 that, as described above, represents the next $B_{ex}$ intercept after the first input to the adder 239 from the $B_{ex}$ register 226. Thus, with the $B_{ex0}$ intercept signal 219 input, the $B_{ex1}$ NEXTINTB0 through 15 signal 227 is output and is input to both the adder 240 and the $B_{ex}$ register 226. The second output from the adder 239 is from the section 239D and is the form of a sign bit signal 244 that represents the sign of the NEXTINTB0 through 15 signal 227. This sign bit signal 244 is applied to the DDL circuit 242. For the M1 matrix 38, $B_{ex1} = +1.06$ such that the sign of the signal 244 is (+).

Still referring to FIGS. 20 and 21, the NEXTINTB0 through 15 signal 227 is applied to the second adder 240, that is shown in FIG. 20 having sections 240A, 240B, 240C and 240D. The slope sign signal 206 from the slope register 203 (FIGS. 16 and 21) is also applied to the section 240D of the adder 240. The slope register 203 also outputs the slope signal 55 to the adder 240. Referring to FIG. 2, with these inputs the section 240D of the adder 240 is effective to determine the position of the intersection $b_{48}$ with the left side 48 of the corner pixel 47, which is shown as $B_{ex} - S$ in FIG. 2. With respect to the M1 matrix 39:

$$B_{ex1} - S = 1.06 - 0.64 = +0.42$$

Such position, or $B_{ex} - S$, is indicated as a signal 245 indicating the sign of $B_{ex} - S$.

The sign bit signal 244 from the first adder 239 indicated the position of the $B_{ex}$ intercept relative to the decision point D1, whereas the sign signal 245 indicated the position of the $B_{ex} - S$ intercept relative to the D2 decision point. Thus, the (+) signs of the signals 244 and 245 for the M1 matrix 39 are consistent with the P1P2 line 34 extending in the (+) y direction relative to both the decision points D1 and D2.

Still referring to FIG. 20, the next matrix circuit 57 is shown in detail including the DDL circuit 242 that receives the vector end signal 65 and the X MAJOR signal 56. The sign bit signal 244 and the sign signal 245 are input to the DDL circuit 242 from the respctive first adder 239 and the section 240D of the second adder 240. In response to the sign bit signal 244 and the sign signal 245, the DDL circuit 242 outputs a decision signal according to the following sign inputs:

Chart III

| Sign of Signal 244 | Sign of Signal 245 | DDL Circuit 57 Decision Signal |
|---|---|---|
| (−) | (−) | A (signal 246) |
| (+) | (−) | A/B (signals 233 & 246) |
| (+) | (+) | B (signal 233) |

As described in Chart IV below, the decision may also be expressed in terms of the position of the P1P2 line 34 relative to the points D1 and D2 and the direction of the next matrix 38N.

The decision signals 233 and 246 are input to the decision register 241 and to the $B_{in}$ register 231. Additionally, the *ENPG enable pixel generation signal 230 is anded with a *CLKVPPD signal 247 to generate a signal 248 that is applied to the register 241 of the next matrix circuit 47. The signal 248 cycles the register 241 such that the next matrix 38N is identified and output as the *XEN and/or *YEN signals 193, and the DECISION A signal 246, and/or the DECISION B signal 233, all as appropriate. The *XEN and *YEN signals 193 are input to the Y mask enable PAL 190 (FIG. 15), which outputs them as the *ENX and *ENY next matrix signals 63 that are applied to the respective X and Y matrix counters 61 and the loop counter 64 (FIGS. 8 and 9), as appropriate.

The DECISION A and B signals 246 and 233 output by the decision register 241 as the respective DECISION A and B signals 246' and 233' and are applied to the constant registers 216, 216', 217 and 217' (FIG. 17) to cause the appropriate "A", "B" or "AB" constant signals 243 to be the output to the first adder 239 (FIG. 21).

Operation: Drawing the P1P2 Line 34

The input processor circuit 52 receives the input signals 51 representing "MOVE" to point P1 and "DRAW" to point P2. The input processor circuit 52 sets-up the line drawing apparatus 49 so that the next matrix circuit 57 can determine the next matrices 38N through which P1P2 line 34 extends and can generate the respective $B_{in}$ and $B_{ex}$ intercept signals 232 and 219, respectively, to provide data to the write enable circuit 59 (FIG. 19) for identifying the pixels 33 that should be ON so as to draw the P1P2 line 34.

The "MOVE" input signal 51 causes the multiplier 100 to multiply the y coordinate value of the P1 point 37 by 0.25 to generate the y integer matrix coordinate signal 53 and the y fractional signal 66 (see MOVE ENTRY 1 and FIG. 7A, state 5253). The y integer-matrix coordinate signal 53 is written into the integer RAMs 109 and 110 (FIG. 8) via MBUS3 through 10.

The "MOVE" input signal 51 causes the input processor 52 to multiply the x coordinate of the point P1 by 0.20 to generate the x integer-matrix coordinate signal 53 and the x fractional signal 66 (see MOVE ENTRY 1, path 164 and FIG. 7A, state 5212). The x integer-matrix coordinate signal 53 is also written into the integer RAMs 109 and 110 (FIG. 8) via MBUS3 through 10.

The IRA0 and IRA1 signals 112 and the SELBEGEND signal 111 from the parameter registers 88' and 88" (FIG. 10) are applied to the current matrix address circuit (FIG. 8) to identify the P1 point 37 as the BEG point of the P1P2 line 34.

The *WEIR signal 114 and the *ENIRAM signal 115 (FIG. 8) are applied to the integer RAMs 109 and 110 to enable the X and Y integer-matrix signals 53 to be written into the respective X and Y matrix counters 116 (FIG. 9) and 117 (FIG. 8). The *LDYMC signal 124 causes the Y integer-matrix signal 53 to be written into the Y matrix counter 117. The corresponding *LDXMC signal 127 causes the X integer-matrix signal 53 to be written into the X matrix counter 116 so that the counters 116 and 117 combine to represent the matrix address of the P1 point 37.

The input processor circuit 52 then responds to the "DRAW" input signal 51 and similar processing occurs and the results in loading the X and Y integer-matrix coordinate signals 53 into the integer RAMs 109 and 110. However, the IRA0 and IRA1 signals 112 and the SELBEGEND signal 111 now identify the signals 53 as being for the END point P2. The *WEIR signal 114, the *ENIRAM signal 115, the respective *LDYMC and *LDXMC signals 124 and 127 also control the writing of the signal 53 for the P2 point 37 to the X and Y matrix counters 116 and 117.

The x and y fractional signals 66 are loaded into respective PALs 161 and 162 in response to *LDXFRAC and *LDYFRAC signals 163 (FIG. 13). This occurs for each of the P1 and P2 points 37, with the SELBEGEND signal 111 indicating which point is the BEG point.

The y (end)-y (beg) calculation (the delta Y calculation) is performed by the input processor circuit 52 (state 5011, FIG. 7A, path 143). Based on the sign of the delta Y calculation, the top flag signal 70 is generated (to indicate that the point P1 is the top point) by the parameter register 88' (FIG. 10).

The delta Y signal 54 also provides the basis for selecting one of paths 144, 145 and 146 in FIG. 7B. Since delta Y>0 for the P1P2 line 34, the path 144 is selected. Delta X is also processed in path 143 by the input processor circuit 52.

The Y delta signal 173 and the X delta signal 178 are processed (see state 5020 and state 5130, for example) and input via the OBUS0 through 7 to the respective Y and X loop counters 174 and 179 (FIG. 15).

When the line drawing system 49 is first operated, an initial MASKBEG mask begin signal 191 is output by loading the X and Y loop counters 179 and 174 with their maximum values. This causes the vector end signal 65 to be output from the AND circuit 186 (FIG. 15) so that the register 241 (FIG. 20) outputs the MASKBEG signal 191 when the BEG point 32 is processed by the X and Y mask enable PALs 189 and 190 (FIG. 15).

Once a line 34 has been processed, the vector end signal 65 (FIG. 15) for that line 34 is stored in the register 241 (FIG. 20) and output as the MASKBEG signal 191 for the next BEG point P1.

Referring to FIG. 15, in the processing of the P1P2 line 34, the loop counters 174 and 179 are loaded in response to the *LDXYLC signal 184, which results in setting each counter to a negative value equal to the number of matrices in the y and x directions, respectively, through which the P1P2 line 34 extends.

The processor 95 of the input processor circuit 52 computes the slope S signal 55 starting at state 5020 (FIG. 7B, path 144). As described above, the sloppe for the P1P2 line 34 is:

$$\frac{\Delta y}{\Delta x} = \frac{13-6}{12-1} = +0.64.$$

The slope S signal 55 is enabled to the CBUS (FIG. 17) ad the MBUS. In response to the *LDSLOPE signal 205, the slope S signal 55 is then written into the slope registers 203' and 203". At the same time, the CBUS loads the SLOPESIGN signal 206 into the slope register 203' and the SLOPENEG signal 207 into the slope register 203". The slope registers 203' and 203" are thus conditioned to generate the SLOPENEG signal 207, the SLOPESIGN signal 206, and the slope signal 55 (output on the SLOPE 3 through 7 and SLOPE 8 through 14 lines).

The processing starting at (path 141, FIG. 7B) also results in the positive slope signal 55 being stored in the flag register 86 (FIG. 5).

The processor 95 branches from path 141, FIG. 7B according to whether the line 34 is XMAJOR or YMAJOR, such that the XMAJOR flag 56 is generated and loaded into the flag register 86 (FIG. 5, state 5751).

The constants "A", "B" and "AB" are processed (see for example, FIG. 6). Since the matrices 38 are 4 by 5 pixels 32, the "A" constant is determined to be (−)4, the "B" constant is (+) 5*+0.64=+3.2 and the "AB" constant is −0.8. Via MBUS0 through 15, the "A", "B"

and "AB" constants are loaded into the respective A, B and AB registers of the constant register 208.

To complete the set-up operation, the intercept $B_{ex0}$ is determined by computing Equation (2) and then converting it into the decision point coordinate system. This is done by the input processor 52 starting in state 5600 (FIG. 7B). The resulting $B_{ex0}$ signal 219 having a −2.14 value is enabled to the OBUS0 through 15 and written into the $B_{ex}$ register 226 of the next matrix circuit 57 (FIGS. 18 and 21).

Upon outputting of the vector end signal 65 for the last line drawn, the address to the constant register 208 was forced by the vector end signal 65 to point to the "B" constant register of the constant register 218. Accordingly, at the beginning of the next line, which is described here as the P1P2 line 34, the constant register 208 will be addressed to the "B" constant register 217 (FIG. 17), which stores the signal 243 representing 5 times the slope S. In the example shown in FIG. 2, the P1P2 line 34 is an X MAJOR line. Therefore, as noted above, the value of the "B" constant is −5 times the slope or:

$$(-5 * -0.64) = +3.2.$$

To assist in the understanding of the operation of the next matrix circuit 57, reference is made to Chart IV in conjunction with the Next Matrix Algorithm set forth following Chart IV.

cept $b_{in}$ into next matrix 38N is the same as $B_{ex}$ of the exit point from the current matrix 38C, and c. the distance $B_{ex}$ of the new exit intercept $b_{ex}$ from the next matrix 38N is $(L * S) = +B_{ex}$.

Comment: See Set Up Cycle 1. Since $B_{ex1}$ is "+", Step 2 is not satisfied for the M1 matrix 39C relative to the M2 next matrix 40N.

3. If $(B_{ex} - S) \geq 0$, then the sign "$s_2$" is "+", and:
   a. the next matrix 38N is in the MINOR direction,
   b. the distance $B_{in}$ of the new entry intercept $b_{in}$ of the next matrix 38N = $B_{in}$ − H, where H = 4 for the 5 by 4 matrix 38, and
   c. the distance $B_{ex}$ of the new exit intercept $b_{ex}$ of the next matrix: 38N = $B_{ex}$ − H, where H = 4 for the 5 by 4 pixel matrix Comment: See Chart IV "Input From SETUP Algorithm", for example. It was determined that the $b_{48}$ intercept $(B_{ex} - S)$ was +0.42. Thus, $(B_{ex} - S)$ is >0 so that the next matrix 38N is the M2 matrix 40, which is in the MINOR direction relative to the current M1 matrix 39C.

4. If not 2. nor 3., then:
   a. the next matrix 38N is in both the MAJOR and MINOR directions,
   b. the distance $B_{ex}$ of the new exit intercept $b_{ex}$ from the next matrix: 38N = $(L * S) - H + (B_{exM3})$, and
   c. the distance $B_{in}$ of the new entry intercept $b_{in}$ to the next matrix:

CHART IV

| Cycle | $B_{ex}$ 219/227 | $B_{in}$ 232 | Decision Out | Constant REG 208 | First Adder Next $B_{ex}$ 227 | Second Adder 248 (Sing) | X, Y Matrix (Integer) | X, Y Loop Counter | Decision From DDL 242 | Lookup |
|---|---|---|---|---|---|---|---|---|---|---|
| Input From SETUP Algorithm | −2.14 $B_{ex0}$ | Not Used | B 5 × S | +3.2 | +1.06 $B_{ex1}$ Step 3 | +0.42 | 0,1 | FD,FD | A add −4.0 | |
| Cycle 1 | +1.06 $B_{ex1}$ | −2.14 $B_{in1} = B_{ex0}$ | A +4.0 | −4.0 | −2.94 $B_{ex2}$ Step 2 | −3.58 | 0,1 | FD,FD | B add 5S | $B_{in1}$ M1 $B_{ex1}$ MASKBEG |
| Cycle 2 | −2.94 $B_{ex2}$ | $B_{in2} =$ $B_{in1}$ − 4 −6.14 | B 5 × S | +3.2 | +0.26 $B_{ex3}$ Step 4 | −0.38 | 0.2 | FD,FE | Not A or B 5S − 4 | $B_{in2}$ M2 $B_{ex2}$ |
| Cycle 3 | +0.26 $B_{ex3}$ | −2.94 $B_{in3} = B_{ex2}$ | AB 5S − 4 | −0.8 | −0.54 $B_{ex4}$ | NR | 1,2 | FE,FE | NR | $B_{in3}$ M3 $B_{ex3}$ |
| Cycle 4 | −0.54 $B_{ex4}$ | −3.74 $B_{in4} =$ $B_{ex3}$ − 4 | NR | NR | NR | NR | 2,3 | FF,FF | NR | MASKENL M4 $B_{in4}$ $B_{ex4}$ VECTOR END |
| Cycle 5 | NR | | B 5 × S For Next Line | NR | NR | NR | | | | |

Next Matrix Algorithm

| Step | Compute |
|---|---|
| 1. | $B_{exn} = B_{ex(n-1)} + (L * S)$<br>Comment: this locates point $B_{ex1}$, for example, using point $B_{ex0}$ as the start of the line 34 within the M1 matrix 39. S = slope S and L = 5 pixels for the 5 by 4 matrices 38. |
| 2 | If point $B_{ex}$ is "above" the reference line R (i.e. if $B_{ex} < 0$), then the sign "$S_1$" = "31" and:<br>  a. the next matrix 38N is in the MAJOR direction,<br>  b the distance $B_{in}$ of the new entry inter- |

38N = $(B_{ex38C})$ − H.
Comment: This situation is when the line 34 extends between the D1 and D2 decision points (See FIG. 2).
5. If end of line L not reached, go to Step 2.

Chart IV has a first column entitled "Cycle" that indicates the cycle number in which the data shown in the rest of the Chart is output. The next column is identified as "$B_{ex}$" and indicates the exit intercept $B_{ex}$ from a given matrix 38. The value is that of the $B_{ex}$ signal 219 or 227 stored in the $B_{ex}$ register 226. The next column is "$B_{in}$ 232", which indicates the value of the $B_{in}$ intercept signal 232 output from the $B_{in}$ register 231. The next column, "Decision Out", expresses the current input to the first adder 239 in terms of the constants AB, B or A. The next column is "Constant REG 208", which lists the current output signal 243 representing whichever of the constants AB, B or A that is input to the first adder 239 in a given cycle. The "First Adder Next $B_{ex}$ 227" column indicates the output of the first adder 239, which is the next $B_{ex}$ intercept signal 227, having a sign that is significant. The next column is "Second Adder 248 (Sign)", which indicates that the sign of the signal 245 output from the second adder 240 is significant. The "X,Y Matrix (integer)" column lists the matrix integer address of the current matrix 38C in the x,y screen coordinate system. The "X,Y Loop Counter" column lists the code for the count at which the respective X and Y loop counters 179 and 174 are set for processing a given current matrix 38C. The "Decision From DDL" column identifies the decision output from the DDL circuit 242 as to which matrix 38 is the next matrix 38N. The "Lookup" column identifies the inputs to the write enable circuit 59, the next matrix 38C and masking.

Referring in detail to Chart IV and FIGS. 2 and 21, the set up operation has input the $-2.14$ $B_{ex0}$ signal 219 to the $B_{ex}$ register 226, the slope S signal 55 (value $+0.64$) to the slope register and the A, B and AB constants to the constant register 208 having values noted above. The $-2.14$ value is relative to the reference line R1.

The X,Y integer matrix is originally 0,1 to reflect the location of the matrix 39 and the X,Y loop counters 178 and 174 are set to the FD,FD code. The $B_{ex}$ register 226 outputs the $-2.14$ value signal 219 to the first adder 239. The first adder 239 also receives the initial $+3.2$ value of the B constant signal 243 from the constant register 208. The first adder 239 outputs a (+) sign signal 244 and a $+1.06$ value next $B_{ex}$ signal 227, which represents $B_{ex1}$ and corresponds to Step 1 in the Next Matrix Algorithm.

Since $B_{ex1}$ is (+), Step 2 is not satisfied, such that Step 3 is necessary. Thus, the $+1.06$ value signal 227 is input to the second adder 240 with the slope sign signal 206 and the slope signal 55 to compute $B_{ex1}$-S, which results in a $+0.42$ value, which is output as a (+) sign bit signal 245. This represents the data needed for Step 3. Since the sign of the signal 245 is (+), Step 3.a. indicates that the next matrix 38N is the matrix 40, such that the "Decision Out" from the DDL circuit 242 is "A", or add $-4$ (See Cycle "Input From SETUP Algorithm").

The $B_{ex1}$ signal 227 from the first adder 239 is output to the $B_{ex}$ register 226. In Cycle 1, this is applied to the write enable circuit 59 (FIG. 19), as indicated in the Lookup column. The $B_{ex}$ signal 219 was input to the $B_{in}$ register 231 in the prior cycle. Since $B_{in1}=B_{ex0}$ for the M1 matrix 39, the $B_{in}$ register 231 outputs the $-2.14$ value $B_{in1}$ signal 232 to the write enable circuit 59. Also, the mask from the decision register 241 enable circuit 67 (FIG. 15) receives the MASKBEG signal 191 from the decision register 241 (FIG. 20). In Cycle 2, the X,Y matrix counters 61 step to 0,2 and the X,Y loop counters 174 and 179 are set to the FD, FE code to represent the address of and to account for the M2 matrix 39C.

The decision A is used in Cycle 1, where the $B_{ex1}$ value of $+1.06$ is input to the first adder 239 with the $-4.0$ value of the A constant signal 243. This results in a (−) signal 244 and a $-2.94$ value next $B_{ex2}$ signal 227. Step 2 of the Next Matrix Algorithm is satisfied by the (−) sign signal 244 of $B_{ex2}$ and indicates that the conclusions of Steps 2.a., 2.b. and 2.c. apply. Thus, without further computation, the next matrix 38N is identified as the M3 matrix 41 and the decision from the DDL circuit 242 is "B", which is shown in Cycle 1, for the translation to the M3 matrix 41.

In Cycle 2, the $B_{ex2}$ signal 227 (value $-2.94$) is applied to the $B_{ex}$ register 226 which outputs it as the $B_{ex2}$ signal 219 of value $-2.94$ to the write enable circuit 59. Based on the A decision for the translation from the M1 matrix 39 to the M2 matrix 40, the $B_{in}$ register 231 outputs the $B_{in2}$ signal 232 of $B_{in2}=B_{in1}-4$, or $-6.14$. The $B_{in2}$ signal 232 is output to the write enable circuit 59 in Cycle 2.

In Cycle 2, the $B_{ex2}$ signal 227 of value $-2.94$ is input to the first adder 239 with the B constant signal 243 (value $+3.2$). The first adder 239 outputs the next exit intercept signal 227 for $B_{ex3}$ having a value of $+0.26$.

Referring to Step 2 of the Next Matrix Algorithm, since $B_{ex3}>0$, Step 2 is not satisfied, and Step 3 is processed. The $B_{ex3}$−S signal 245 is output by the second adder 240 as the (−) sign representing the $-0.38$ value. Step 3 is processed by the DDL circuit 242 using the (+) sign for $B_{ex3}$−S, and Step 3 is not satisfied. Thus, according to Step 4 ("not Step 2 nor Step 3"), the next matrix 38N is the matrix 42. This is reflected by the "Not A or B" decision in Cycle 2.

In Cycle 3, in response to the B decision in Cycle 2, the $B_{in}$ register 231 outputs the $B_{in3}=B_{ex2}=-2.94$ signal 232 to the write enable circuit 59. Also, the next $B_{ex3}$ signal 227 (value $+0.26$) was input to the $B_{ex}$ register 226 and is now output as the signal 219 to the write enable circuit 59 (FIG. 19) and is applied to the first adder 239. This conditions the first adder 239 to add the AB constant ($-0.8$) and output the next $B_{ex4}$ signal 227 having a $-0.54$ value, which is applied to the $B_{ex}$ register 226. In Cycle 4, the $B_{ex}$ register 226 outputs the $B_{ex4}$ value of $-0.54$ to the write enable circuit 59.

In Cycle 3, the $B_{ex}$ register 226 also applies the $B_{ex3}$ signal 227 (value $+0.26$) as the signal 219 to the $B_{in}$ register 231. The $B_{in}$ register 231 receives the decision A and B signals 233' and 246', indicating that $B_{in4}=B_{ex3}-4$. In Cycle 4, the $B_{in}$ register 231 responds to the decision and A and B signals 246' and 233' by outputting the value $-3.74$ $B_{in4}$ signal 232 to the write enable circuit 59. Also, in Cycle 3 the X,Y loop counters 179 and 174 have counted in Cycle 3 to code FE, FE to indicate the transition to the M3 matrix 41. Then, in Cycle 4, with the x direction and y direction transition to the M4 matrix 42, the X,Y loop counters 179 and 174 code change to code FF, FF and the vector end signal 65 is output to interrupt operation of the next matrix circuit 57. In Cycle 3 the M2 to M3 matrix translation is noted by the new 1,2 matrix integer address, and in Cycle 4 the M3 to M4 matrix translation is noted by the 2,3 address. The columns in Cycles 3 through 5 marked "NR" are not relevant to the processing. The Decision Out column in Cycle 5 notes that the register 241 is left addressed to the B constant at the end of the P1P2 line 34, so that the B constant signal 243 will be input first when the P2P3 line 35 is processed.

The vector end signal 65 initiates a masking operation in the mask enable circuit 67 for the M4 matrix 42. The mask enable signal 71 and the write enable signal 60 for each of the matrices 39 through 42 are combined in the matrix adjust circuit 73 and the final write enable signals 74 are input to the buffer 75.

In Step 5, since the end of the P1P2 line 34 is reached, the processing stops.

In summary, when the line 34 extends relative to the decision points D1 and D2 in any of the three ways listed in Chart V, the next matrix 38N is identified as stated in Chart V.

CHART V

| LINE RELATIVE TO DECISION POINTS | THEN NM IS THIS WAY IN MATRIX COORDINATES | DDL Circuit 57 |
|---|---|---|
| Below both points D1 & D2 | Move +y = MINOR Direction | DECISION A and *YEN |
| Between Points D1 & D2 | Move +x and +y = MAJOR and MINOR | DECISION A/B & *XEN & *YEN |
| Above both points D1 & D2 | Move =x = MAJOR Direction | DECISION B and *XEN |

Referring again to Appendix A, it may be understood that each of the paths 209 through 212 ends with a last instruction shown as "Go to [done]". The "Go to [done]" instruction is in effect the next address for the final operation that is performed in each path 209 through 212. When the last matrix of the P1P2 line 34 has been completely processed, i.e. "DONE", the next address register 79 (FIG. 5) outputs the "IF DONE THEN" instructions. Initially and referring to FIGS. 8 and 9, this involves shifting from the integer RAMs 109 and 110 (FIG. 8) the X value for the top point (P3) of the next P2P3 line 35 which is written into the X matrix counter 116" (FIG. 9). Further, the Y coordinate value for the top point (P3) of the next (or P2P3) line 35 is read from the integer RAMs 109 and 110 and written into the Y matrix counter sections 121 and 122. At this juncture, the X matrix counter sections 109 and 110 (FIG. 8) and the Y matrix counter sessions 121 and 122 respectively hold the matrix coordinate locations of a first or top matrix 224 (FIG. 1) of the next P2P3 line 35 to be drawn.

Pixel—Prom Program

With the above-description in mind, the pixel—prom computer program referred to above will be described. As noted, the data output from this program is used to operate a PROM generator (not shown) that enters the data into the PROMS 234 through 238 (FIG. 19) for various combinations of input, including MAJOR flag signal 56, slope signal 55, intercept $B_{in}$ and $B_{ex}$ signals 58 for a given matrix 38.

Referring to FIG. 22, to illustrate how the data for the PROMS 234 through 238 is generated, a line 249 to be drawn is shown intersecting the left side 250 of a matrix 252 that is located between adjacent matrices 251 and 253. Part of another matrix 254 is also shown. The line 249 also intersects the right side 255 of the matrix 253 after exiting the matrix 252.

Four columns of data are shown, three to the left of the matrices 251 through 254 and one to the right. Also, two rows of data are shown beneath the matrices 251 through 254. Column 1 entitled "Pixel Y" identifies the "Y" address of pixels 32 in the matrix 252. The rows identify the "X" address of the pixels 32 in the matrix 252, for both positive and negative slope S. Column 2 indicates that the left side 250 is divided into sixteen $B_{in}$ intercepts at one-half pixel unit intervals. To illustrate, $B_{in}$ of the line 249 has a 6.0 value on the Column 2 scale. Column 3 shows the Column 2 intercept data adjusted so that the "0" y axis value corresponds to the location of the decision points D1 and D2 in the matrix 252, such that there is a −8.0 adjustment between Columns 1 and 2. As adjusted, the y axis values 0 through 8.0 are always considered as minus values to reduce the number of bits needed to represent $B_{in}$. This adjustment is achieved by processing the pixel—prom program instruction "intercept 1—pp:=i1—ppi—8;". Column 4 lists $B_{ex}$ values at similar one-half pixel increments, with 0 at the same position as the decision points D1 and D2. The range of $B_{ex}$ values is +7.5 to −8.0.

The pixel—prom program uses the inputs noted below, including the $B_{in}$ and $B_{ex}$ values, and for each possible combination of input data, generates the addresses of the ON pixels 32 in the matrix being considered, e.g., the matrix 252. These ON pixels 32 are shown darkened and having 0,2; 1,2; 2,3; and 3,3 addresses to represent the line 249 between $B_{in}$=6.0 (or −2.0) and $B_{ex}$=1.0.

With these selections of input values for $B_{in}$ and $B_{ex}$, in the preferred embodiment a 5 bit accuracy for $B_{in}$ and $B_{ex}$ is used, and is achieved by not applying the lower bits of the original 16 bit number to the PROMS 234 through 238. Thus, the usable $B_{in}$ values are 0, 0.5 and 1.0, for example, instead of 0, 0.125, 0.250, 0.375, 0.5, 0.625, 0.750, 0.875 and 1.0.

Referring to FIG. 22, five bit accuracy allows 32 numbers from 7.5 to −8.0. (See Column 4.) 0 is at the decision points D1 and D2 within the matrix 252 to be generated. Two boundary lines 256 and 257 are drawn to show the minimum and maximum values of the $B_{in}$ and $B_{ex}$ intercepts. The boundary lines 256 and 257 are obtained by drawing a 45° line and using the decision points D1 and D2 to determine if the line 249 would appear in the matrix 252 to be generated. The bottom line 257 is equal to or greater than the decision point D1 of the matrix 251 below and the top line 256 is less than the decision point D2 of the matrix (not shown) to the left of the matrix 252.

Now considering the pixel—prom program listed in Attachment B, a storage array referred to as "i1—array" stores all possible $B_{in}$ values and another referred to as "i2—array" stores all possible $B_{ex}$ values. This data is listed under respective headings "Intercept 1 Array" and "Intercept 2 Array" in Attachment B.

The inputs to the pixel—prom program are as follows; where:

"ppi" means pixel prom input;
"pr" means parameter register 88;
"pp" means pixel PROM (one of proms 234–238):

| Input | Comment |
|---|---|
| i2—ppi | Intercept out ($B_{ex}$) having value in range 7.5 through −8.0. |
| i1—ppi | Intercept in ($B_{in}$) having Column 2 value in range 7.5 through 0 or Column 3 value from −0.5 through −8.0. |
| up | Indicates that the coordinate system has been adjusted in the minor direction. When this happens the value for intercept $B_{in}$ does not change. Therefore the pixel—prom program must adjust for this by adding −4 or −5. (X or Y MAJOR). |
| slope—pr | Referring to FIG. 12, this indicates whether the slope of the .22) is positive (lines 155 and 156) or negative (lines 213 and 214). The pixel—prom algorithm is mostly the same for both positive and negative slope. |
| major—pr | Indicates an x or y major line 249. |

The following are the variables used in the pixel_prom program. These are under the "VAR" heading.

| Variable | Comment |
| --- | --- |
| maj_matrix_max_pp | Maximum value of the major axis minus 1. 4 for X major and 3 for Y major. |
| min_matrix_max_pp | Maximum value of the minor axis minus 1. 3 for X major and 4 for Y major. |
| maj_point_pp | The coordinate of the matrix major axis starting ∅ and going to maj_matrix_max_pp. This is used to keep track of what pixel 32 is being processed in the matrix 252 with respect to the major axis. |
| min_point_pp | The coordinate of the matrix minor axis starting at ∅ and going to min_matrix_max_pp. This is used to keep track of what pixel 32 is being processed in the matrix 252 with respect to the minor axis |
| major_cnt | Same as maj_point_pp. |
| i,j | Miscellaneous variables. |
| slope_pp | Same as slope_pr. |
| slope_pp | Same as slope_pr. |
| intercept2_pp | Same as i2_ppi. |
| intercept1_pp | i1_ppi minus 8 (to compensate for the missing sign bit). |
| e_pp | This corresponds to the error term used in Bresenham's algorithm. This keeps track of the distance gone in a minor direction. For every step in the major direction the change in the minor direction is the value of the slope (which is less than 1.) When e_pp goes above ∅.5 a step is taken in the minor direction (min_point_pp is incremented) and 1 is substracted from e_pp to keep it less than 1. |
| p[i,j] | This is a 2∅ pixel (5 by 4) array that holds the pixel data for the matrix 252. The i index corresponds to the x coordinate of the pixel 32 and the j index corresponds to y coordinate of the pixel 32. Initially this array is set to have all OFF pixels. |

Using the line 249 and the intercept data shown in FIG. 22 as an example, the input to the pixel_prom program is as follows:
i1_ppi=6.0
i2_ppi=1.0
major_pr=X
slope_pr=POS
up=1 (previous matrix was not in the minor direction)

This would also correspond to the input to the PROMS 234 through 238 for drawing the line 249 using the data calculated by the pixel_prom program.

The pixel_prom program processes such input data starting with the instructions under the "BEGIN" heading.

1. intercept 1_pp: = i1_ppi − 8 = 6 − 8 = −2
2. intercept2_pp: = i2_ppi; = 1

Instruction 1 adjusts the non-signed input to be signed. Instruction 2 is just an assignment of 1 variable to another.

3.  for i: = 1 to 5 do
    for j: - 1 to 4 do
    p[i,j]= 1

Instruction 3 initializes the 20 pixel array to no pixels "ON". This instruction can be related to the x,y coordinates of the matrix 252 by considering the i as an x and the j as a y. This would then correspond to the 5 "x" pixel by 4 "y" pixel matrix 252.

4.  if major = X then
    begin
5.  maj_matrix_max_pp: = 4;
6.  min_matrix_max_pp: = 3;
7.  maj_point_pp: = ∅;
8.  intercept 1_pp: = intercept1_pp - 3.5 = −2 + 3.5 = 1.5
9.  intercept2_pp: = intercept2_pp - 3.5 = 1 + 3.5 = 4.5
    end;

Since major=X, instruction 4 is used and not the instruction that reads:

IF (major_pr=Y) then ...

Instructions 5 and 6 set up the maximum values (minus 1) of the matrix 252 in the major and minor directions. The minus 1 is used because the pixel address numbers in FIG. 22 range from 0 to 4 and from 0 to 3 instead of 1 to 5 and 1 to 4. The matrix 252 has five pixels 32 in the x direction and four in the y direction. Instruction 7 assigns the first major (or X point in this example). Instructions 8 and 9 re-adjust the coordinate system to the lower left corner of the matrix 252 instead of at the decision points D1 and D2.

10. if (up=0) then intercept1_pp:= ...

Instruction 10 is only used if the previous matrix computed prior to the matrix 252 was in the minor direction for which the coordinate system was adjusted by −4 or −5 to get the new intercepts. If that happended, the B$_{in}$ 231 register 231 that contains intercept1 would not have done this adjustment (added −4 or −5) but instead would have generated the "up" flag and let the pixel_prom do this adjustment.

11. slope_pp:=intercept2_pp-intercept1_pp-/maj_matrix_pp+1=(4.5_1.5)/(4+1)=3/5=0.6

Instruction 11 calculates the slope of the line 249 between the two intercepts B$_{in}$ and B$_{ex}$ in FIG. 22.

12. if intercept1_pp>=0 then min_point:=trunc (intercept1_pp);
13. if intercept1_pp<0 then min_point:=trunc (intercept1_pp)−1;

One of the above instructions is used depending on whether intercept1_pp is positive or negative. This determines the minor (or Y) coordinate in the matrix 252 (which may change depending on the value of e_pp). This truncates or rounds the number off to an integer. The reason for the two instructions 12 and 13 is that truncating a negative number is different from truncating a positive number. For the FIG. 22 example of intercept1_pp=1.5, the min_point=1 (1.5 truncated to an integer) at maj_point of 0. However e_pp is taken into account from the beginning of loop 88 to determine if the first min_point is at 1 or 2.

14. e_pp: -intercept1$_{pp\text{-}min}$-point_pp;=1.5-1=0.5.

Bresenham's algorithm always increments the major (maj_point) and the minor (min_point) is incremented only whenever an error term (e_pp), which keeps track of the less than 1 movement in the minor direction, becomes greater than or equal to 0.5. Instruction 14 calculates this initial error term. In FIG. 22 the initial error is 0.5 since the pixel 32 is at 1 and the actual intercept is at 1.5. This means that the next min_point will be incremented because the error term (e_pp) is equal to 0.5. 88 begins a loop of incrementing the maj_point and the min_point if the e_pp is greater or equal to 0.5.

```
15.    if e_pp >= .5 then
       begin
16.    min_point_pp: = min_point_pp + 1;
17.    e_pp: = e_pp - 1;
18.    end;
```

The start of the loop begins with a check of the error term. If the error term is greater than or equal to 0.5 (instruction 15) then the min_point is incremented and the error term is reduced by 1. This is basically adjusting the pixel coordinate system. When another pixel is calculated, the last coordinate system must be adjusted to that next pixel, similar to adjusting the coordinate systems when in moving from matrix to matrix. In the FIG. 22 example, e_pp=0.5, so min_point=2 and e_pp=-0.5 at maj_point of 0. This is the address of the first pixel 32 in the matrix 252.

19. if min_point_pp<0 then goto 34;
20. if min_point_pp>min_matrix_max_pp then goto 99;
21. if maj_point_pp>maj_matrix_max_pp then goto 99;

Instruction 19 determines whether the minor coordinate is within the matrix 252. If not, there is a branch around plotting of the points. In the FIG. 22 example, it is within the matrix 252 and this branch is not taken. Instructions 20 and 21 determine if the address is outside the maximum boundaries of the matrix 252. If so, then the computation is done (see 99). The "plot points" section next assigns the ON value to the x,y pixel coordinate. If the slope is negative then the x coordinate is mirrored around the y axis. After plotting, the major point is incremented, the slope is added to the error term and there is a loop back and the next pixel location is determined. This is summarized in Chart VI using the data shown in FIG. 22, using a simplified version of the pixel_prom algorithm and the numbers calculated based on FIG. 22.

CHART VI
Basic Computation Using Pixel Prom Algorithms

Step 1: if e_pp > = .5 then incr min_point and subtr 1 from e_pp
plot points

Step 2: incr maj_point, add slope to e_pp and loop to step 1

Continue this until last pixel 32 is out of matrix 252.

CHART VI
Basic Computation Using Pixel Prom Algorithms

```
+ - - - - - - - - - - - - - - - step
  + - - - - - - - - - - - - maj_point
    + - - - - - - - - - - min_point    results of
      + - - - - - - - e_pp              above step
```

| V | V | V | V | Notes |
|---|---|---|---|-------|
| * | 0 | 1 | .5 | initialization |
| 1 | 0 | 2 | -.5 | e_pp was >= .5, e_pp + .5 - 1, incr min_point PLOT! |
| 2 | 1 | 2 | .1 | e_pp = -.5 + .6, incr maj_point |
| 1 | 1 | 2 | .1 | e_pp was not >= .5, e_pp, min_point = no change PLOT! |
| 2 | 2 | 2 | .7 | e_pp = .1 + .6, incr maj_point PLOT! |
| 1 | 2 | 3 | -.3 | e_pp was > - .5, e_pp = .7 - 1, incr min_point PLOT! |
| 2 | 3 | 3 | .3 | e_pp = -.3 + 6, incr maj_point |
| 1 | 3 | 3 | .3 | e_pp was not >= .4, e_pp, min_point = no change PLOT! |
| 2 | 4 | 3 | .9 | e_pp = .3 + .6, incr maj_point |
| 1 | 4 | 4 | -.1 | e_pp was >= .5, e_pp = .9 - 1, incr min_point DO NOT PLOT because the min_point is outside the matrix |

Resulting addresses of the pixels 32 that define the line 249 are: 0,2 1,2 2,3 3,3. The last address (4,4) is not plotted becasue the y coordinate is outside the matrix 252.

With this description of the pixel_prom program in mind in respect to FIG. 22, it should be understood that the pixel_prom program can be used to calculate the addresses of all pixels 32 in a given matrix 39 for all possible inputs to the matrices 39.

As an example of a list of data that is to be input to the PROM generator after conversion to hexascii form, reference is made to the last listing in Attachment B, entitled "Example of Inputs To and Outputs From Pixel_Prom Program". There, the columns are identified as Addr, Major, Slope and Over/Up, all of which relate to the lines 232 into the PROMS 234 through 238 (FIG. 19).

Int. 1 is 4 bits, which ranges from 0 to 7.5. Int. 2 is 5 bits (a sign and 4 bits) and it ranges from -8 to 7.5. All possible cominations of the twelve inputs to the PROMS 234 through 236 are then determined. For each address then the pixel_prom program is used to calculate the 4 bits that will be the output of the PROM. With regard to such outputs, the "0" "1" "2" and "3" headings and groups of five addresses, e.g., five "O" addresses, represent twenty pixels 32 in a given matrix 39. The output data is either a "0" or a "1", where the data is normally "1" representing an "OFF" pixel 32 unless the pixel_prom program outputs a "0" for an ON pixel 32. The output data in the form of "0s" and "1s" is converted into hexascii code to drive the PROM generator.

While the preferred embodiment has been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the claims.

APPENDIX A

```
;****************************************************************
;
;    Title         : VPDRAW
;                    Opcode 4XXX
;                    VPMOVE
;                    Opcode XXXX
;
;    Initial states : DRAW - state 24 or 44 from poll loop
;                              (uses fifo as input)
;                            state 3024 from poll loop refresh routin
;                            state 5000 if called from other routines
;                              (uses R0, R1 as input)
;                    MOVE - state 20 or 42 from poll loop
;                              (uses fifo as input)
;                            state 3020 from poll loop refresh routin
;                            state 5050 if called from other routines
;                              (uses R0, R1 as input)
;
;    Called from   : VPPOLL, VPFILL, VPPZ
;
;    Purpose       : DRAW - To setup the hardware to draw a line
;                            and, if desired, to command the hardware
;                            sequencer to draw that line.
;                    MOVE - To load the hardware with the required
;                            data to initialize it to a coordinate on
;                            the screen.
;
;    Entry         : R0 (or FIFO) = X position to move/draw to
;                    R1 (or FIFO) = Y position to move/draw to
;                    R14 = X offset
;                    R15 = y offset
;                    R16 = current X position (unnecessary for move)
;                    R17 = current Y position (unnecessary for move)
;
;                    Flag register bit 0 = 0 -- relative move/draw
;                    Flag register bit 0 = 1 -- absolute move/draw
;
;                    INTEGER RAM ADDRESS = 1 (y,end - which is now beg)
;
;                    *ENFILL = 1 - line is setup and drawn
;                    *ENFILL = 0 - line is setup and NOT drawn
;
;                    MDSEL = 1 (from POLL loop only)
;
;    Exit          : R16 = current X position updated
;                    R17 = current Y position updated
;                    MDSEL = 1
;                    INTEGER RAM ADDRESS = 1 (y,end)
;                    ENABLE TOP = 1 (active)
;
```

```
;    Calls            : Refresh at state 74
;
;    Registers used   : Processor
;
;                      reg       contents
;                      -------   ----------------------------------------
;
;                      R0        x(end)
;                      R1        y(end)
;                      R2        X_int(beg), x_loop,
;                                B000 (-5) * slope or C000 (-4) * slope
;                      R3        y_int(beg), y_loop, XFRAC or 4 - XFRAC,
;                                YFRAC * slope or XFRAC * slope,
;                      R4
;                      R5
;                      R6
;                      R7
;                      R10
;                      R11
;                      R12
;                      R13
;                      R14
;                      R15
;                      R16       x(beg), delta_X, C000 (-4) or B000 (-5),
;                      R17       y(beg), delta_y, C800 (-3.5) or B800 (-4.5),
;
;                      External ram
;
;                      addr      contents
;                      -------   ----------------------------------------
;                      0400      delta_x
;                      0401      delta_y
;
;
;    State map        :
;
; Main States within the draw code
;
; States          Description
; -----------     ----------------------------------------
;                 Entry
;
; 24,44,3024      Entry points into draw from poll loop
; 5034            Relative draw code if entering from poll loop
; 5035            Absolute draw code if entering from poll loop
;
; 5000            Entry points into draw from other routines
; 5002            Relative draw code if entering from other routines
; 5003            Absolute draw code if entering from other routines
;
; 5010            Poll loop and other routine code converges
```

```
;               First main calculation is delta_y. This splits draw into
;               three sections. These three sections are separated in the
;               code by a header of asterisks (****) across the screen.
;
; 5020          delta_y > 0, top = beg
; 5021          delta_y = 0
; 5022          delta_y < 0, top = end
;
;               The next main calculation is delta_x. This splits each of
;               the above sections into 3 more sections These three sections
;               are separated in the code by a header of pluses (++++)
;               across the screen.
;
; 5020          delta_y > 0, top = beg
;   5121                                    delta_x = 0, POS slope
;   5120                                    delta_x > 0, POS slope
;   5122                                    delta_x < 0, NEG slope
;
; 5021          delta_y = 0
;   5221                                    delta_x = 0, POS slope
;   5220                                    delta_x > 0, POS slope
;   5222                                    delta_x < 0, NEG slope
;
;
;
; 5022          delta_y < 0, top = end
;   5321                                    delta_x = 0, NEG slope
;   5320                                    delta_x > 0, NEG slope
;   5322                                    delta_x < 0, POS slope
;
;               The next main calculation is xmaj. This splits each of
;               the above sections into 2 more sections (unless delta_x
;               or delta_y is 0, then this calculation is not necessary
;               and no split occurs). These three sections are separated
;               in the code by a header of dots (....) across the screen.
;
; 5020          delta_y > 0, top = beg
;   5121                                    delta_x = 0, POS slope
;   5120                                    delta_x > 0, POS slope
;     5130                                                          xmaj
;     5132                                                          ymaj
;   5122                                    delta_x < 0, NEG slope
;     5140                                                          xmaj
;     5142                                                          ymaj
;
; 5021          delta_y = 0
;   5221                                    delta_x = 0, POS slope
;   5220                                    delta_x > 0, POS slope
;   5222                                    delta_x < 0, NEG slope
;
```

```
;
;
; 5022           delta_y < 0, top = end
;   5321                                    delta_x = 0, NEG slope
;   5320                                    delta_x > 0, NEG slope
;      5330                                                          xmaj
;      5332                                                          ymaj
;   5322                                    delta_x < 0, POS slope
;      5140                                                          xmaj
;      5142                                                        . ymaj
;
;               There are four sections at the end of draw and the last
;               state of draw for each path is indicated. NOT Fill and
;               Fill mode indicates the path taken when *ENFILL flag
;               is set or reset. The difference is that the NOT Fill
;               mode path causes the sequencer to GO DRAW where as the
;               the Fill mode does not cause drawing to start, enabling
;               Fill to single step the hardware.
;
; 5400          xmaj, slope = 0
;   5477                                    NOT fill mode  (last state)
;   5467                                    Fill mode      (last state)
;
; 5467          ymaj, slope = 0
;   5577                                    NOT fill mode  (last state)
;   5567                                    Fill mode      (last state)
;
; 5600          xmaj, Slope is positive
; 5601          xmaj, Slope is negative
;   5677                                    NOT fill mode  (last state)
;   5657                                    Fill mode      (last state)
;
; 5700          ymaj, Slope is positive or negative
;   5777                                    NOT fill mode (last state)
;   5757                                    Fill mode     (last state)
;
;               Paths                                   states
;               -----------------------------------     ------
;               delta_y > 0, delta_x = 0, ymaj            14
;
;               delta_y > 0, delta_x > 0, xmaj            22
;               delta_y > 0, delta_x > 0, ymaj            23
;
;               delta_y > 0, delta_x < 0, xmaj            24
;               delta_y > 0, delta_x < 0, ymaj            25
;
;               delta_y = 0, delta_x = 0, xmaj            14
;               delta_y = 0, delta_x > 0, xmaj            15
;               delta_y = 0, delta_x < 0, xmaj            15
;
```

```
;               delta_y < 0, delta_x = 0, ymaj       14
;
;               delta_y < 0, delta_x > 0, xmaj       22
;               delta_y < 0, delta_x > 0, ymaj       25
;
;               delta_y < 0, delta_x < 0, xmaj       23
;               delta_y < 0, delta_x < 0, ymaj       26
;
;               Total of paths                      262
;               Average                             .20.15
;
;               Move total states                    25
;               Draw total states                   136
;               Total states used                   161
;
;
; Description   :
;
;   Coordinates are received as the BEGinning (1st) point and the ENDing
;   (2nd) point. This algorithmn always draws the line in the increasing
;   Y direction, from the TOP point to the BOTTOM point. This means that
;   the BEG point is not always the TOP point. There is a flag in the
;   PARAMETER REGISTER called TOP that indicates whether the TOP point
;   is the BEG or END point. The TOP flag is the processor SIGN flag saved
;   when the following calculation is performed.
;
;                   PARAMETER REGISTER FUNCTION
;                   FREGDAT1 --> TOP
;                   y(end) - y(beg) --> delta_y
;
;                   Therefore:
;                   If F3 = 1  y(end) <  y(beg) then TOP = END
;                      F3 = 0  y(end) >= y(beg) then TOP = BEG
;
;
;   Addressing is done on matrix boundries so the received points are divided
;   by 5 for X and 4 for Y. The integer portion of this calculation is stored
;   in the INTEGER RAM, and the fractional portion is stored in the XFRAC and
;   YFRAC PALS.
;
;   The INTEGER RAM contains 8 locations for 2 different lines. The following
;   shows what the locations are for 1 line. The other line is exactly the
;   same.
;
;                   0 - X integer value beg or end point
;                   1 - Y
;                   2 - spare
;                   3 - spare
;
```

```
;                   4 - X integer value end or beg point
;                   5 - Y
;                   6 - spare
;                   7 - spare
;
;        The 2 different lines are selected with the signal SELFILLSIDE. This
;        signal can only be toggled or reset.
;
;        SELBEGEND is a signal that indicates to the INTEGER RAM and the XFRAC
;        and YFRAC PALS whether the beg or end point is the one being stored.
;        Upon entry SELBEGEND is pointing to the END point of the last line,
;        which is the BEG point of the next line to be drawn.
;
;        Addresses are loaded into the X MATRIX COUNTER and the Y MATRIX COUNTER
;        from the INTEGER RAM. The address must be the TOP point. The TOP XFRAC
;        and YFRAC are used in the initial calculation for INTERCEPT. In order
;        to insure that the TOP point is used since BEG and END is what is stored,
;        is to use the TOP flag. SELBEGEND must be set to the END point and when
;        reading the the INTEGER RAM, XFRAC, or YFRAC PALS and ENABLE TOP must
;        be asserted. This will cause SELBEGEND to point to the TOP point
;        depending on the TOP flag.
;
;        Multiplier operation
;
-----------------------------------------------------------------------------
;
;        1. Slope calculation      Numerator/denominator
;
;           The denominator must be normalized. This is done by sending it through
;           the priority encoder to get a shift count for the barrel shifter. The
;           result of the barrel shifter is always a number within the following
;           ranges:
;                         1 =< d < 2              -1 >= d > -2
;
;           An imaginary exponent can be used to keep track of the real number.
;
;                   1   0  -1  -2  -3  -4  -5  -6  -7  -8  -9 -10 -11 -12 -13 -14
;                 +---+---+---+---+---+---+---+---+---+---+---+---+---+---+---+---+
; denominator :  s: 1: X: X: X: X: X: X: X: X: X: X: X: X: X: X: X:
;                 +---+---.---+---+---+---+---+---+---+---+---+---+---+---+---+---+
;
;                                                                 +-------+
;                                                       exponent :    E:
;                                                                 +-------+
;
;           The reciprocal prom takes the inverse of this number times 2 and
;           produces an INTEGER number between the same ranges as above. However
;           our imaginary exponent has changed.
;
```

```
             0  -1  -2  -3  -4  -5  -6  -7  -8  -9 -10 -11 -12 -13 -14 -15
            +---+---+---+---+---+---+---+---+---+---+---+---+---+---+---+---+
denominator: 1: X: X: X: X: X: X: X: X: X: X: X: X: X: X: X:
            +---.---+---+---+---+---+---+---+---+---+---+---+---+---+---+---+

+------+
                                                      exponent: -E-1:
                                                                +------+
```

The numerator will always be equal or less than the denominator. It must always be normalized with the same shift count as the numerator.

```
             1   0  -1  -2  -3  -4  -5  -6  -7  -8  -9 -10 -11 -12 -13 -14
            +---+---+---+---+---+---+---+---+---+---+---+---+---+---+---+---+
numerator  : s: 1: X: X: X: X: X: X: X: X: X: X: X: X: X: X:
            +---+---.---+---+---+---+---+---+---+---+---+---+---+---+---+---+

+------+
                                                      exponent:    E:
                                                                +------+
```

When these 2 numbers are multiplied together, the range now becomes $$1 =< d < 4 \qquad -1 >= d > -4$$

and the upper 16 bits look as follows.

```
             2   1   0  -1  -2  -3  -4  -5  -6  -7  -8  -9 -10 -11 -12 -13
            +---+---+---+---+---+---+---+---+---+---+---+---+---+---+---+---+
quotient   : s: s: X: X: X: X: X: X: X: X: X: X: X: X: X: X:
            +---+---+---.---+---+---+---+---+---+---+---+---+---+---+---+---+

+------+
                                                      exponent:   -1:
                                                                +------+
```

The final number needs to be format adjusted which moves the binary point to the left one. Adjusting the exponent to zero also moves the binary point to the left one.

```
             0  -1  -2  -3  -4  -5  -6  -7  -8  -9 -10 -11 -12 -13 -14 -15
            +---+---+---+---+---+---+---+---+---+---+---+---+---+---+---+---+
quotient   : s: X: X: X: X: X: X: X: X: X: X: X: X: X: X: X:
            +---.---+---+---+---+---+---+---+---+---+---+---+---+---+---+---+

+------+
                                                      exponent:    0:
                                                                +------+
```

```
;
;
;           -5 * slope         (for constant)
;           -4 * slope         (for constant)
;           slope * x_frac     (for intercept)
;           slope * y_frac     (for intercept)     calculation
;
_____
;
;
;                 0  -1 -2 -3 -4 -5 -6 -7 -8 -9 -10 -11 -12 -13 -14 -15
;               +---+---+---+---+---+---+---+---+---+---+---+---+---+---+---+---+
;     slope :   s: X: X: X: X: X: X: X: X: X: X: X: X: X: X: X:
;               +---.---+---+---+---+---+---+---+---+---+---+---+---+---+---+---+
;
;
;                                           times
;
;                 3   2  1  0 -1 -2 -3 -4 -5 -6 -7 -8 -9 -10 -11 -12
;               +---+---+---+---+---+---+---+---+---+---+---+---+---+---+---+---+
; -5 (B000) :    1:  0: 1: 1: 0: 0: 0: 0: 0: 0: 0: 0: 0: 0: 0: 0:
;               +---+---+---+---.---+---+---+---+---+---+---+---+---+---+---+---+
;
;                 3   2  1  0 -1 -2 -3 -4 -5 -6 -7 -8 -9 -10 -11 -12
;               +---+---+---+---+---+---+---+---+---+---+---+---+---+---+---+---+
; -4 (C000) :    1:  1: 0: 0: 0: 0: 0: 0: 0: 0: 0: 0: 0: 0: 0: 0:
;               +---+---+---+---.---+---+---+---+---+---+---+---+---+---+---+---+
;
;
;                                          equals
;
;                 3   2  1  0 -1 -2 -3 -4 -5 -6 -7 -8 -9 -10 -11 -12
;               +---+---+---+---+---+---+---+---+---+---+---+---+---+---+---+---+
;    result :   s:  X: X: X: X: X: X: X: X: X: X: X: X: X: X: X:
;    (MSP)      +---+---+---+---.---+---+---+---+---+---+---+---+---+---+---+---+
; Format adjusted
;
;
;   X/5 - Point is shifted left before multiply
;
_____
;
;
;                14  13 12 11 10  9  8  7  6  5  4  3  2  1  0  -1
;               +---+---+---+---+---+---+---+---+---+---+---+---+---+---+---+---+
;    point :    X:  X: X: X: X: X: X: X: X: X: X: X: X: X: X: 0:
;               +---+---+---+---+---+---+---+---+---+---+---+---+---+---+---.---+
;
;
;
```

```
;                                        times
;
;              -3  -4  -5  -6  -7  -8  -9 -10 -11 -12 -13 -14 -15 -16 -17 -18
;             +---+---+---+---+---+---+---+---+---+---+---+---+---+---+---+---+
;        .2 : 1:  1:  0:  0:  1:  1:  0:  0:  1:  1:  0:  0:  1:  1:  0:  0:
;     (CCCC) +---+---+---+---+---+---+---+---+---+---+---+---+---+---+---+---+
;
;
;                                        equals
;
;              12  11  10   9   8   7   6   5   4   3   2   1   0  -1  -2  -3
;             +---+---+---+---+---+---+---+---+---+---+---+---+---+---+---+---+
;    result : s:  X:  X:  X:  X:  X:  X:  X:  X:  X:  X:  X:  X:  X:  X:  X:
;     (MSP)  +---+---+---+---+---+---+---+---+---+---+---+---.---+---+---+---+
;    rounded
;
;
;      Y/4 - Result is point shifted left by 1
;
;------------------------------------------------------------------------------
;
;
;             15  14  13  12  11  10   9   8   7   6   5   4   3   2   1   0
;            +---+---+---+---+---+---+---+---+---+---+---+---+---+---+---+---+
;    point : X:  X:  X:  X:  X:  X:  X:  X:  X:  X:  X:  X:  X:  X:  X:  X:
;            +---+---+---+---+---+---+---+---+---+---+---+---+---+---+---+---.
;
;
;                                        times
;
;              12  11  10   9   8   7   6   5   4   3   2   1   0  -1  -2  -3
;             +---+---+---+---+---+---+---+---+---+---+---+---+---+---+---+---+
;       .25 : 0:  0:  0:  0:  0:  0:  0:  0:  0:  0:  0:  0:  0:  0:  1:  0:
;     (0002) +---+---+---+---+---+---+---+---+---+---+---+---.---+---+---+---+
;
;
;                                        equals
;
;              12  11  10   9   8   7   6   5   4   3   2   1   0  -1  -2  -3
;             +---+---+---+---+---+---+---+---+---+---+---+---+---+---+---+---+
;    result : s:  X:  X:  X:  X:  X:  X:  X:  X:  X:  X:  X:  X:  X:  X:  0:
;     (LSP)  +---+---+---+---+---+---+---+---+---+---+---+---.---+---+---+---+
;
;
;      Other constants
;
;------------------------------------------------------------------------------
```

```
;                  3   2   1   0  -1  -2  -3  -4  -5  -6  -7  -8  -9 -10 -11 -12
;                +---+---+---+---+---+---+---+---+---+---+---+---+---+---+---+---+
;        -3.5 :  1:  1:  0:  0:  1:  0:  0:  0:  0:  0:  0:  0:  0:  0:  0:  0:
;       (C800) +---+---+---+---.---+---+---+---+---+---+---+---+---+---+---+---+
;
;                  3   2   1   0  -1  -2  -3  -4  -5  -6  -7  -8  -9 -10 -11 -12
;                +---+---+---+---+---+---+---+---+---+---+---+---+---+---+---+---+
;        -4.5 :  1:  0:  1:  1:  1:  0:  0:  0:  0:  0:  0:  0:  0:  0:  0:  0:
;       (B800) +---+---+---+---.---+---+---+---+---+---+---+---+---+---+---+---+
;
;                  3   2   1   0  -1  -2  -3  -4  -5  -6  -7  -8  -9 -10 -11 -12
;                +---+---+---+---+---+---+---+---+---+---+---+---+---+---+---+---+
;           4 :  0:  1:  0:  0:  0:  0:  0:  0:  0:  0:  0:  0:  0:  0:  0:  0:
;       (4000) +---+---+---+---.---+---+---+---+---+---+---+---+---+---+---+---+
;
;
; DATA = 11X XXX XXX XX0         Constant = B800 (-4.5)       Addr = 306
; DATA = 11X XXX XXX XX0         Constant = C800 (-3.5)       Addr = 310
; DATA = XXX XXX 000 011         Constant = C000 (-4)         Addr = 303
; DATA = XXX XXX X00 010         Constant = C000 (-4)         Addr = 302
; DATA = XXX XXX X00 100         Constant = CCCC              Addr = 314
; DATA = XXX XXX XXX X00         Constant = 2 (.25)           Addr = 300
; DATA = XXX XXX XXX XXX         Constant = B000 (-5)         Addr = 305
; DATA = XXX XXX XXX XXX         Constant = 4000 (4)          Addr =  57
;
;   Code summary   :
;
; ASSUMPTIONS
; -----------
; MDSEL = 1
; 1st data is in FIFO
; SELBEGEND = end for last line which is beg for this line
;
; NOTES:
; Hardware registers are capitalized.
; Slope calculation will always end up negative to allow 4*slope to
;    be calculated from 5*slope (INTERCEPTB) by adding the slope.
; The sign of delta_y determines which point (beg or end) the line will be
;    drawn from. This is the top point.
; For delta_y < 0 , the line is actually drawn in the opposite direction
;    that the points were received. For the case of (delta_y < 0 ; delta_x = 0)
;    which is a NEG slope, switching the direction makes it
;    (delta_y > 0 ; delta_x = 0) which is now a POS slope.
;
```

```
; SETUP
;
;   INTEGER_RAM(y,end)  =  y(end) / 4  (integer part)
;   Y_FRAC(end)         =  y(end) / 4  (fractional part)
;   INTEGER_RAM(x,end)  =  x(end) / 5  (integer part)
;   X_FRAC(end)         =  x(end) / 5  (fractional part)
;
;   delta_y =  y(end) - y(beg)                        ; store TOP flag
;   y_frac  =  Y_FRAC(TOP)
;   x_frac  =  X_FRAC(TOP)
;
;-------------------------------------------------------------------------
;
;
;   IF delta_y > 0 THEN                               ; TOP = BEG
;     Y_LOOP_CNTR =  y_int(y,end)
;                 -  y_int(y,beg)
;     delta_x = x(end) - x(beg)                       ; store XMCDOWN flag
;
;
;     IF delta_x = 0 THEN                             ; POS slope
;       X_LOOP_CNTR = 0
;       goto [ymaj, slope = 0]
;
;
;     IF delta_x > 0 THEN                             ; POS slope
;       X_LOOP_CNTR =  x_int(x,end)
;                   -  x_int(x,beg)
;       IF delta_x - delta_y >= 0 THEN                ; store XMAJ flag
;         delta_y    = -delta_y
;         goto [xmaj]
;       IF delta_x - delta_y <  0 THEN                ; store XMAJ flag
;         delta_x    = -delta_x
;         goto [ymaj]
;
;
;     IF delta_x < 0 THEN                             ; NEG slope
;       delta_x    = -delta_x
;       X_LOOP_CNTR =  x_int(x,beg)
;                   -  x_int(x,end)
;       x_frac     =  4 - x_frac                      ; mirror
;       IF delta_x - delta_y >= 0 THEN                ; store XMAJ flag
;         delta_y    = -delta_y
;         goto [xmaj]
;       IF delta_x - delta_y <  0 THEN                ; store XMAJ flag
;         delta_x    = -delta_x
;         goto [ymaj]
;
;-------------------------------------------------------------------------
```

```
;
;
;       IF delta_y = 0 THEN                        ; TOP = BEG
;         Y_LOOP_CNTR =  0
;         delta_x =  x(end) - x(beg)               ; store XMCDOWN flag
;
;
;         IF delta_x = 0 THEN                      ; POS slope
;           X_LOOP_CNTR =  0
;           goto [xmaj, slope = 0]
;
;
;         IF delta_x > 0 THEN                      ; POS slope
;           X_LOOP_CNTR =  x_int(x,end)
;                       - x_int(x,beg)
;           goto [xmaj, slope = 0]
;
;
;         IF delta_x < 0 THEN                      ; NEG slope
;           X_LOOP_CNTR =  x_int(x,beg)
;                       - x_int(x,end)
;           goto [xmaj, slope = 0]
;
;
;------------------------------------------------------------------------
;
;
;       IF delta_y < 0 THEN                        ; TOP = END
;         Y_LOOP_CNTR =  y_int(y,beg)
;                     - y_int(y,end)
;         delta_x =  x(beg) - x(end)               ; store XMCDOWN flag
;
;
;         IF delta_x = 0 THEN                      ; POS slope (see NOTES)
;           X_LOOP_CNTR =  0
;           goto [ymaj, slope = 0]
;
;
;         IF delta_x > 0 THEN                      ; NEG slope
;           X_LOOP_CNTR =  x_int(x,beg)
;                       - x_int(x,end)
;           IF delta_x + delta_y >= 0 THEN         ; store XMAJ flag
;             goto [xmaj]
;           IF delta_x + delta_y <  0 THEN         ; store XMAJ flag
;             delta_y    = -delta_y
;             delta_x    = -delta_x
;             goto [ymaj]
;
;
;
```

```
;       IF delta_x < 0 THEN                     ; POS slope
;          delta_x    = -delta_x
;          X_LOOP_CNTR = x_int(x,end)
;                     - x_int(x,beg)
;          x_frac     = 4 - x_frac              ; mirror
;       IF delta_x - delta_y >= 0 THEN          ; store XMAJ flag
;          goto [xmaj]
;       IF delta_x - delta_y < 0 THEN           ; store XMAJ flag
;          delta_y    = -delta_y
;          delta_x    = -delta_x
;          goto [ymaj]
;
;----------------------------------------------------------------------
;
;
; [xmaj, slope = 0]
;     SLOPE = 0                                 ; store SLOPE flag
;     B_CONSTANT_REG    = 0
;     INTERCEPT         = y_frac - 3.5
;     goto [done]
;
; [ymaj, slope = 0]
;     SLOPE = 0                                 ; store SLOPE flag
;     B_CONSTANT_REG    = 0
;     INTERCEPT         = x_frac - 4.5
;     goto [done]
;
;
; [xmaj]
;     SLOPE = delta_y/delta_x                   ; store SLOPE flag
;     A_CONSTANT_REG    := -4
;     B_CONSTANT_REG    := -5 * slope
;     AB_CONSTANT_REG   := (-5 * slope) - 4
;     INTERCEPT         := y_frac + (slope * x_frac) - 3.5
;     goto [done]
;
; [ymaj]
;     SLOPE = delta_x/delta_y                   ; store SLOPE flag
;     A_CONSTANT_REG    := -5
;     B_CONSTANT_REG    := -4 * slope
;     AB_CONSTANT_REG   := (-4 * slope) - 5
;     INTERCEPT         := x_frac + (slope * y_frac) - 4.5
;     goto [done]
;
;
;
```

```
;  [done]
;      IF DONE THEN
;          pg toggle
;          X_MATRIX_CNTR = INTEGER_RAM (x,TOP)
;          Y_MATRIX_CNTR = INTEGER_RAM (y,TOP)
;          X_FRAC holding register = X_FRAC(TOP)
;          Y_FRAC holding register = Y_FRAC(TOP)
;          GO DRAW
;
;  T = OFFSET
;  N = NEW
;  O = OLD
;  D = DELTA
;
;  ABSOLUTE                           RELATIVE
;
;  NX = TX + X                        NX = OX + X
;  DX = NX      - OX                  DX = NX      - OX
;     = TX + X - OX                      = X + OX - OX
;                                        = X
;
;  NY = TY - Y                        NY = OY - Y
;  DY = NY      - OY                  DY = NY      - OY
;     = TY - Y - OY                      = OY - Y - OY
;                                      =      - Y
;
;
;  AM  - 0 = arithmetic shift  1 = logic shift
;  FT  - 0 = no feedthrough    1 = feedthrough
;  RND - 0 = no rounding       1 = round                MUST BE VALID WHEN
;  FA  - 0 = format adjust     1 = no format adjust     LOAD MULT X or Y
;  YM  - 0 = integer           1 = 2's complement       LOAD MULT P
;  XM  - 0 = integer           1 = 2's complement       LOAD MULT Y
;                                                       LOAD MULT X
;  AM FT RND FA YM XM
;  0  0   0   1  0  0       for y/4
;  0  0   1   1  0  0       for x/5
;  0  0   0   0  1  0       for slope
;  0  0   0   0  1  1       for remaining
;
;
;
;  ASSUME INTEGER RAM address = 1 (y,beg)
;  START
;  DRAW ENTRY 1 (states 24,44,3024) from poll loop ********************
;  FIFO = (y,end)
;  FIFO = (x,end)
```

; Entry from refresh

.- 3024
```
|-------------------------------
| DATA = 401                        ; DATA = XXX X00 000 001
| DATA --> CBUS
| LOAD ENABLE TOP                   ; 0 (bit 1) --> ENABLE TOP (not active)
| CBUS --> IBUS
| LOAD MS & LS RAM ADDR             ; delta_y location (401)
| IBUS --> RBUS
| RBUS --> OBUS
| OBUS --> BRLSHFTR CNT REG         ; Shift count = 1
| XBUS --> DSS STATUS REG           ; Set RDSS BUSY Flag
| INCR STACK PNTR                   ; Push return to poll loop (60)
| PROC: D .AND. 0 --> -             ; 0 --> PREG
| LOAD PREG
| DISP [ FREGDAT(0) ]               ; Dispatch if absolute
|-------------------------------
```
.+ 5034 ; 5035                      ; Relative , Absolute .- 0024
```
|-------------------------------
| DATA = 401                        ; DATA = XXX X00 000 001
| DATA --> CBUS
| LOAD ENABLE TOP                   ; 0 (bit 1) --> ENABLE TOP (not active)
| CBUS --> IBUS
| LOAD MS & LS RAM ADDR             ; delta_y location (401)
| IBUS --> RBUS
| RBUS --> OBUS
| OBUS --> BRLSHFTR CNT REG         ; Shift count = 1
| XBUS --> DSS STATUS REG           ; Set RDSS BUSY Flag
| INCR STACK PNTR                   ; Push return to poll loop (60)
| PROC: D .AND. 0 --> -             ; 0 --> PREG
| LOAD PREG
| DISP [ FREGDAT(0) ]               ; Dispatch if absolute
|-------------------------------
```
.+ 5034 ; 5035                      ; Relative , Absolute .- 0044
|----------------------------------
| DATA = 401                                  ; DATA = XXX X00 000 001
| DATA --> CBUS
| LOAD ENABLE TOP                             ; 0 (bit 1) --> ENABLE TOP (not active)
| CBUS --> IBUS
| LOAD MS & LS RAM ADDR                       ; delta_y location (401)
| IBUS --> RBUS
| RBUS --> OBUS
| OBUS --> BRLSHFTR CNT REG                   ; Shift count = 1
| XBUS --> DSS STATUS REG                     ; Set RDSS BUSY Flag
| INCR STACK PNTR                             ; Push return to poll loop (60)
| PROC: D .AND. 0 --> -                       ; 0 --> PREG
| LOAD PREG
| DISP [ FREGDAT(0) ]                         ; Dispatch if absolute
|----------------------------------
.+ 5034 ; 5035                                ; Relative , Absolute ; NOTE: Only states 5034,5035 and 5036,5046 are different from each other.
;       The remaining states in both the RELATIVE and ABSOLUTE paths are
;       the same.
;
; RELATIVE
;           *    *
; AM FT RND FA YM XM
;  ?  ?  ?  ?  ?  ?     In for 0

.- 5034
|----------------------------------
| PREG --> OBUS
| OBUS --> MULT Y REG                         ; 0 x ? = 0
| SIGN EXTENDED DBUS --> IBUS                 ; FIFO --> IBUS
| PROC: RA17 .-. D --> RB1                    ; old_y - y(end) from FIFO --> R1
| LOAD PREG                                   ;                          --> PREG
| DATA = 300                                  ; DATA = XXX XXX XXX X00
| DATA --> CBUS
| CBUS --> CONST PROM ADDR REG                ; Constant = 2 (.25) for y/4
| CBUS(1-0) --> MDSEL                         ; MBUS SOURCE/DESTINATION (0)
|----------------------------------
.+ 5033

; Multiplier MULTIPLYing!       0
;              *    *
; AM FT RND FA YM XM
;  ?  ?  ?  ?  ?  ?     In for y/4   Out for 0

.- 5033
```
|----------------------------------
| LOAD MULT P REG                      ; 0 in product register
| CONSTANT PROM --> RBUS               ; even if we go through this state
| RBUS --> OBUS                        ; more than once because of dispatch
| OBUS --> MULT X REG                  ; CONSTANT PROM (2) --> MULT X REG
| INTEGER RAM --> IRBUS
| IRBUS --> IBUS
| PROC: D .OR. 0 --> RB3               ; y_int(beg) --> R3
|                                      ; The positive sign is used for XMAJ.
| DATA = 4                             ; DATA = XXX XXX 000 100
| DATA --> CBUS
| MBUS --> CONSTANT REG                ; ? (A) --> CONSTANT REGISTER (A1)
|                                      ; For delta_x, delta_y = 0 paths only.
| LOAD MULT CNTRL REG                  ; AM FT RND FA YM XM     for y/4
|                                      ;  0  0   0  1  0  0
| DISP [ *FIFO(0) ]                    ; waiting (hopefully not) for x(end)
|----------------------------------
.+ 5037 ; 5036

.- 5037
|----------------------------------
| DISP [ *DORFSH(1) ]                  ; should I do a refresh?
|----------------------------------
.+ 5033 ; 5031

.- 5031
|----------------------------------
| INCR STACK PNTR                      ; (Yes) go do refresh
|----------------------------------
.+ 5032

.- 5032
|----------------------------------
| DATA = 5033
| DATA --> CBUS
| PUSH CBUS ON STACK
|----------------------------------
.+ 0074

;           *      *
; AM FT RND FA YM XM
;  0  0   0  1  0  0    In for y/4
```

```
.- 5036
|----------------------------------
| SELECT FLAGS1
| LOAD FLAG REG                         ; Save XMAJ flag = xmaj.
| MULT MS PROD --> MBUS                 ; For delta_x, delta_y = 0 paths only.
| MBUS --> CONSTANT REG                 ; 0 (B) --> CONSTANT REGISTER (A2)
|                                       ; For delta_x, delta_y = 0 paths only.
| PREG --> OBUS
| OBUS --> MULT Y REG                   ; y(end) x 2 (shift left)
| SIGN EXTENDED DBUS --> IBUS           ; FIFO --> IBUS
| PROC: D .+. RA16 --> RB0              ; x(end) from FIFO + old_x --> R0
| LOAD PREG                             ;                          --> PREG
| DATA = 4                              ; DATA = XXX XXX XXX 100
| DATA --> CBUS
| CBUS(2-0) --> INTEGER RAM ADDR REG    ; INTEGER RAM address = 0 (x,beg)
|----------------------------------
.+ 5010

;
; ABSOLUTE
;              *       *
; AM FT RND FA YM XM
;  ?  ?  ?   ?  ?  ?      In for 0

.- 5035
|----------------------------------
| PREG --> OBUS
| OBUS --> MULT Y REG                   ; 0 x ? = 0
| SIGN EXTENDED DBUS --> IBUS           ; FIFO --> IBUS
| PROC: RA15 .-. D --> RB1              ; y(end) from FIFO, offset --> R1
| LOAD PREG                             ;                          --> PREG
| DATA = 300                            ; DATA = XXX XXX XXX X00
| DATA --> CBUS
| CBUS --> CONST PROM ADDR REG          ; Constant = 2 (.25)  for y/4
| CBUS(1-0) --> MDSEL                   ; MBUS SOURCE/DESTINATION (0)
|----------------------------------
.+ 5043

; Multiplier MULTIPLYing!         0
;              *       *
; AM FT RND FA YM XM
;  ?  ?  ?   ?  ?  ?      In for y/4   Out for 0
```

```
.- 5043
|----------------------------------
| LOAD MULT P REG                        ; 0 in product register
| CONSTANT PROM --> RBUS                 ; even if we go through this state
| RBUS --> OBUS                          ; more than once because of dispatch
| OBUS --> MULT X REG                    ; CONSTANT PROM (2) --> MULT X REG
| INTEGER RAM --> IRBUS
| IRBUS --> IBUS
| PROC: D .OR. 0 --> RB3                 ; y_int(beg) --> R3
|                                        ; The positive sign is used for XMAJ.
| DATA = 4                               ; DATA = XXX XXX 000 100
| DATA --> CBUS
| MBUS --> CONSTANT REG                  ; ? (A) --> CONSTANT REGISTER (A1)
|                                        ; For delta_x, delta_y = 0 paths only.
| LOAD MULT CNTRL REG                    ; AM FT RND FA YM XM    for y/4
|                                        ;  0  0   0  1  0  0
| DISP [ *FIFO(0) ]                      ; waiting (hopefully not) for x(end)
|----------------------------------
.+ 5047 ; 5046

.- 5047
|----------------------------------
| DISP [ *DORFSH(1) ]                    ; should I do a refresh?
|----------------------------------
.+ 5043 ; 5041

.- 5041
|----------------------------------
| INCR STACK PNTR                        ; (Yes) go do refresh
|----------------------------------
.+ 5042

.- 5042
|----------------------------------
| DATA = 5043
| DATA --> CBUS
| PUSH CBUS ON STACK
|----------------------------------
.+ 0074

;            *       *
; AM FT RND FA YM XM
;  0  0   0  1  0  0    In for y/4
```

.- 5046
```
|------------------------------
| SELECT FLAGS1
| LOAD FLAG REG                        ; Save XMAJ flag = xmaj.
| MULT MS PROD --> MBUS                ; For delta_x, delta_y = 0 paths only.
| MBUS --> CONSTANT REG                ; 0 (B) --> CONSTANT REGISTER (A2)
|                                      ; For delta_x, delta_y = 0 paths only.
| PREG --> OBUS
| OBUS --> MULT Y REG                  ; y(end) x 2 (shift left)
| SIGN EXTENDED DBUS --> IBUS          ; FIFO --> IBUS
| PROC: D .+. RA14 --> RB0             ; x(end) from FIFO, offset --> R0
| LOAD PREG                            ;                         --> PREG
| DATA = 4                             ; DATA = XXX XXX XXX 100
| DATA --> CBUS
| CBUS(2-0) --> INTEGER RAM ADDR REG   ; INTEGER RAM address = 0 (x,beg)
|------------------------------
```
.+ 5010

; DRAW ENTRY 2   ******************************************************
; R0 = (x,end)
; R1 = (y,end)

.- 5000
```
|------------------------------
| DATA = 401                           ; DATA = XXX X00 000 001
| DATA --> CBUS
| LOAD ENABLE TOP                      ; 0 (bit 1) --> ENABLE TOP (not active)
| CBUS --> IBUS
| LOAD MS & LS RAM ADDR                ; delta_y location (401)
| IBUS --> RBUS
| RBUS --> OBUS
| OBUS --> BRLSHFTR CNT REG            ; Shift count = 1
| PROC: D .AND. 0 --> -                ; 0 --> PREG
| LOAD PREG
| DISP [ FREGDAT(0) ]                  ; Dispatch if absolute
|------------------------------
```
.+ 5002 ; 5003                          ; Relative , Absolute ; NOTE: Only states 5002,5003 and 5005,5007 are different from each other.
;       The remaining states in both the RELATIVE and ABSOLUTE paths are
;       the same.
;
; RELATIVE
;            *      *
; AM FT RND FA YM XM
;  ?  ?  ?  ?  ?  ?    In for 0

.- 5002
|------------------------------------
| PREG --> OBUS
| OBUS --> MULT Y REG                    ; 0 x ? = 0
| PROC: RA17 .-. RB1 --> B                ; old_y - y(end) from R1 --> R1
| LOAD PREG                              ;                         --> PREG
| DATA = 300                             ; DATA = XXX XXX XXX X00
| DATA --> CBUS
| CBUS --> CONST PROM ADDR REG           ; Constant = 2 (.25)  for y/4
| CBUS(1-0) --> MDSEL                    ; MBUS SOURCE/DESTINATION (0)
|------------------------------------
.+ 5004

; Multiplier MULTIPLYing!        0
;                *       *
; AM FT RND FA YM XM
;  ?  ?  ?   ?  ?  ?       In for y/4   Out for 0

.- 5004
|------------------------------------
| LOAD MULT P REG                        ; 0 in product register
| CONSTANT PROM --> RBUS
| RBUS --> OBUS
| OBUS --> MULT X REG                    ; CONSTANT PROM (2) --> MULT X REG
| INTEGER RAM --> IRBUS
| IRBUS --> IBUS
| PROC: D .OR. 0 --> RB3                 ; y_int(beg) --> R3
|                                        ; The positive sign is used for XMAJ.
| DATA = 4                               ; DATA = XXX XXX 000 100
| DATA --> CBUS
| MBUS --> CONSTANT REG                  ; ? (A) --> CONSTANT REGISTER (A1)
|                                        ; For delta_x, delta_y = 0 paths only.
| LOAD MULT CNTRL REG                    ; AM FT RND FA YM XM      for y/4
|                                        ;  0  0   0  1  0  0
|------------------------------------
.+ 5005

;              *       *
; AM FT RND FA YM XM
;  0  0   0  1  0  0    In for y/4

.- 5005
```
|----------------------------------
| SELECT FLAGS1
| LOAD FLAG REG                              ; Save XMAJ flag = xmaj.
| MULT MS PROD --> MBUS                      ; For delta_x, delta_y = 0 paths only.
| MBUS --> CONSTANT REG                      ; 0 (B) --> CONSTANT REGISTER (A2)
|                                            ; For delta_x, delta_y = 0 paths only.
| PREG --> OBUS
| OBUS --> MULT Y REG                        ; y(end) x 2 (shift left)
| PROC: RA16 .+. RB0 --> B                   ; x(end) from R0 + old_x --> R0
| LOAD PREG                                  ;                         --> PREG
| DATA = 4                                   ; DATA = XXX XXX XXX 100
| DATA --> CBUS
| CBUS(2-0) --> INTEGER RAM ADDR REG         ; INTEGER RAM address = 0 (x,beg)
|----------------------------------
```
.+ 5010

; ABSOLUTE
;              *      *
; AM FT RND FA YM XM
;  ?  ?  ?   ?  ?  ?     In for 0

.- 5003
```
|----------------------------------
| PREG --> OBUS
| OBUS --> MULT Y REG                        ; 0 x ? = 0
| PROC: RA15 .-. RB1 --> B                   ; y(end) from R1, offset --> R1
| LOAD PREG                                  ;                         --> PREG
| DATA = 300                                 ; DATA = XXX XXX XXX X00
| DATA --> CBUS
| CBUS --> CONST PROM ADDR REG               ; Constant = 2 (.25) for y/4
| CBUS(1-0) --> MDSEL                        ; MBUS SOURCE/DESTINATION (0)
|----------------------------------
```
.+ 5006

; Multiplier MULTIPLYing!        0
;              *      *
; AM FT RND FA YM XM
;  ?  ?  ?   ?  ?  ?     In for y/4    Out for 0

.- 5006
```
|------------------------------------
| LOAD MULT P REG                              ; 0 in product register
| CONSTANT PROM --> RBUS
| RBUS --> OBUS
| OBUS --> MULT X REG                          ; CONSTANT PROM (2) --> MULT X REG
| INTEGER RAM --> IRBUS
| IRBUS --> IBUS
| PROC: D .OR. 0 --> RB3                       ; y_int(beg) --> R3
|                                              ; The positive sign is used for XMAJ.
| DATA = 4                                     ; DATA = XXX XXX 000 100
| DATA --> CBUS
| MBUS --> CONSTANT REG                        ; ? (A) --> CONSTANT REGISTER (A1)
|                                              ; For delta_x, delta_y = 0 paths only.
| LOAD MULT CNTRL REG                          ; AM FT RND FA YM XM     for y/4
|                                              ;  0  0   0  1  0  0
|------------------------------------
```
.+ 5007

;           *     *
; AM FT RND FA YM XM
;  0  0   0  1  0  0   In for y/4

.- 5007
```
|------------------------------------
| SELECT FLAGS1
| LOAD FLAG REG                                ; Save XMAJ flag = xmaj.
| MULT MS PROD --> MBUS                        ; For delta_x, delta_y = 0 paths only.
| MBUS --> CONSTANT REG                        ; 0 (B) --> CONSTANT REGISTER (A2)
|                                              ; For delta_x, delta_y = 0 paths only.
| PREG --> OBUS
| OBUS --> MULT Y REG                          ; y(end) x 2 (shift left)
| PROC: RA14 .+. RB0 --> B                     ; x(end) from R0, offset --> R0
| LOAD PREG                                    ;                         --> PREG
| DATA = 4                                     ; DATA = XXX XXX XXX 100
| DATA --> CBUS
| CBUS(2-0) --> INTEGER RAM ADDR REG           ; INTEGER RAM address = 0 (x,beg)
|------------------------------------
```
.+ 5010

; DRAW ENTRY CONVERGE  ********************************************************

; Multiplier MULTIPLYing!      y/4
;              *
; AM FT RND FA YM XM
;  0  0   0  1  0  0   Out for y/4

.- 5010
```
|-----------------------------------
| MBUS --> CONSTANT REG                          ; ? (AB) --> CONSTANT REGISTER (B1)
|                                                ; For delta_x, delta_y = 0 paths only.
| PREG --> OBUS
| OBUS --> BRLSHFTR REG                          ; Shift x(end) left by 1.
| INTEGER RAM --> IRBUS
| IRBUS --> IBUS
| PROC: D .OR. 0 --> RB2                         ; x_int(beg) --> R2
| LOAD MULT P REG                                ; Save result of multiplication y/4
| DATA = 314                                     ; DATA = XXX XXX 001 100
| DATA --> CBUS
| CBUS --> CONST PROM ADDR REG                   ; Constant = CCCC for x/5
| LOAD MULT CNTRL REG                            ; AM FT RND FA YM XM   for x/5
|                                                ;  0  0  1  1  0  0
|-----------------------------------
```
.+ 5011

```
;          *    *    *
; AM FT RND FA YM XM
;  0  0  1  1  0  0    In for x/5
```

.- 5011
```
|-----------------------------------
| FREGDAT1 --> XMAJ                              ; Cause XMAJ flag to be xmaj
| BRLSHFTR OUT REG --> IBUS
| IBUS --> MBUS
| MBUS --> MULT Y REG                            ; Numerator for x/5
| CONSTANT PROM --> RBUS
| RBUS --> OBUS
| OBUS --> MULT X REG                            ; CONSTANT PROM = CCCC for x/5
| DATA = 1                                       ; DATA = XXX XXX XXX 001
| DATA --> CBUS                                  ; BEGEND toggles
| CBUS(2-0) --> INTEGER RAM ADDR REG             ; INTEGER RAM address = 1 (y,end)
| PROC: RA1 .-. RB17 --> B                       ; y(end) - y(beg) --> R17 (delta_y)
| LOAD PREG                                      ;              --> PREG
|-----------------------------------
```
.+ 5012

```
; Multiplier MULTIPLYing!      x/5
;               *
; AM FT RND FA YM XM
;  0  0  1  1  0  0    Out for x/5
```

.- 5012
```
|------------------------------------------
| MULT LS PROD --> MBUS
| MBUS --> INTEGER RAM, Y FRACTION REG  ; Save y/4 result
| LOAD MULT P REG                       ; Save result of multiplication
|                                       ; INTEGER RAM --> IRBUS
| IRBUS --> IBUS
| PREG --> OBUS
| OBUS --> RBUS
| LOAD EXT RAM                          ; delta_y --> EXT RAM location 401
| PROC: RA0 .-. RB16 --> B              ; x(end) - x(beg) --> R16 (delta_x)
| LOAD PREG                             ;                --> PREG
| DATA = 400                            ; DATA = XXX XXX XXX XXX
| DATA --> CBUS
| LOAD MS & LS RAM ADDR                 ; delta_x location (400)
| SELECT FLAGS1
| LOAD FLAG REG                         ; Save TOP flag.
| DISP [ F=NEG(1), F=0(0) ]             ; Dispatch if delta_y < 0 or delta_y = 0
|------------------------------------------
```
.+ 5020 ; 5021 ; 5022

; delta_y > 0, top = beg   ********************************************

.- 5020
```
|------------------------------------------
| FREGDAT1 --> TOP
| INTEGER RAM --> IRBUS
| IRBUS --> IBUS
| PREG --> OBUS
| OBUS --> RBUS
| OBUS --> PRIORITY ENC --> BRLSHFTR CNT REG ; Setting up delta_x as denominator
|                                            ; for slope
| LOAD EXT RAM                          ; delta_x --> EXT RAM location 400
| PROC: RA3 .-. D -1 --> RB3            ; *(y_int(y,end) - y_int(y,beg))
| LOAD PREG                             ;                --> PREG
| DATA = 4
| DATA --> CBUS                         ; DATA = XXX XXX XXX 100
| CBUS(2-0) --> INTEGER RAM ADDR REG    ; INTEGER RAM address = 0 (x,end)
| SELECT FLAGS1
| LOAD FLAG REG                         ; Save XMCDOWN flag.
| DISP [ F=NEG(1), F=0(0) ]             ; Dispatch if delta_x < 0 or delta_x = 0
|------------------------------------------
```
.+ 5120 ; 5121 ; 5122

; delta_y > 0, delta_x = 0, POS slope, top = beg   +++++++++++++++++++++++++++

```
.- 5121
|----------------------------------
| FREGDAT1 --> XMCDOWN
| PREG --> OBUS
| OBUS --> Y LOOP REG
| MULT MS PROD --> MBUS
| MBUS --> INTEGER RAM, X FRACTION REG   ; Save x/5 result
| PROC: RA2 .-. RB2 -1 --> B             ; FFFF --> PREG for X LOOP REGISTER
| LOAD PREG                              ;
| DATA = 306                             ; DATA = 00X XXX XXX XX0
| SELECT FLAGS2                          ; Save slope is POS flag
| LOAD FLAG REG
| DATA --> CBUS
| CBUS --> CONST PROM ADDR REG           ; Constant = B800 (-4.5)
|----------------------------------
.+ 5500

; delta_y > 0, delta_x > 0, POS slope, top = beg   +++++++++++++++++++++++++++++

.- 5120
|----------------------------------
| FREGDAT1 --> XMCDOWN
| EXTERNAL RAM --> RBUS
| RBUS --> OBUS
| OBUS --> BRLSHFTR REG                  ; Setting up delta_x as denominator for
|                                        ; slope
| MULT MS PROD --> MBUS
| MBUS --> INTEGER RAM, X FRACTION REG   ; Save x/5 result
|                                        ; INTEGER RAM --> IRBUS
| IRBUS --> IBUS
| PROC: RA16 .-. RB17 --> -              ; |delta_x| - |delta_y|
| INCR RAM ADDR                          ; delta_y location = 401
|----------------------------------
.+ 5170
```

.- 5170
```
|------------------------------------
| PREG --> OBUS
| OBUS --> Y LOOP REG
| INTEGER RAM --> IRBUS
| IRBUS --> IBUS
| PROC: RA2 .-. D -1 --> RB2        ; *(x_int(x,end) - x_int(x,beg))
| LOAD PREG                         ;                         --> PREG
| DATA = 302                        ; DATA = XXX XXX 000 010
| DATA --> CBUS
| CBUS --> CONST PROM ADDR REG      ; Constant = (C000) -4
| EXTERNAL RAM --> RBUS
| LOAD MULT CNTRL REG               ; AM FT RND FA YM XM    for slope
|                                   ;  0  0   0  0  1  0
| SELECT FLAGS1
| LOAD FLAG REG                     ; Save XMAJ flag.
| LOAD ENABLE TOP                   ; 1 (bit 1) --> ENABLE TOP (active)
| DISP [ F=NEG(1) ]                 ; Dispatch if ymaj
|------------------------------------
.+ 5130 ; 5132
```

; delta_y > 0, delta_x > 0, POS slope, top = beg, xmaj ........................

.- 5130
```
|------------------------------------
| FREGDAT1 --> XMAJ
| PREG --> OBUS
| OBUS --> X LOOP REG
| PROC: 0 .-. RA17 --> -            ; -delta_y --> PREG
| LOAD PREG
|------------------------------------
.+ 5150
```

;                *
; AM FT RND FA YM XM
;  0  0   0  0  1  0    In for slope denominator .- 5150
```
|----------------------------------
| PREG --> OBUS
| OBUS --> BRLSHFTR REG              ; delta_y (normalized)
| LOAD MULT X REG                    ; delta_x (normalized) --> MULTX
| CONSTANT PROM --> RBUS
| RBUS --> IBUS
| PROC: D .OR. 0 --> RB16            ; C000 (-4) --> RB16
| IBUS --> MBUS
| MBUS --> CONSTANT REG              ; CONSTANT REG = C000 (-4)
| DATA = 305                         ; DATA = XXX XXX XXX XXX
| DATA --> CBUS
| CBUS --> CONST PROM ADDR REG       ; Constant = (B000) -5
|----------------------------------
```
.+ 5151

```
;            *     *
; AM FT RND FA YM XM
;  0  0  0  0  1  0    In for slope numerator
```

.- 5151
```
|----------------------------------
| BRLSHFTR OUT REG --> IBUS
| IBUS --> RBUS
| RBUS --> OBUS
| OBUS --> MULT Y REG                ; delta_y (normalized) --> MULTY
| DATA = 3                           ; DATA = XXX XXX 000 011
| DATA --> CBUS
| LOAD MULT CNTRL REG                ; AM FT RND FA YM XM    for remaining
|                                    ;  0  0  0  0  1  1
|----------------------------------
```
.+ 5152

```
; Multiplier MULTIPLYing!     slope
;            *     *
; AM FT RND FA YM XM
;  0  0  0  0  1  1    In for 5*slope   Out for slope
```

.- 5152
```
|----------------------------------------
| LOAD MULT P REG                            ; Slope --> MULTP
| CONSTANT PROM --> RBUS
| RBUS --> OBUS
| OBUS --> MULT X REG                        ; CONSTANT PROM = B000 (-5)
| X FRACTION REG --> IBUS                    ; ENABLE TOP active
| PROC: D .OR. 0 --> RB3                     ; XFRAC --> RB3
| LOAD PREG
| DATA = 310                                 ; DATA = 00X XXX XXX XXX
| SELECT FLAGS3                              ; Load *ENFILL into flag register
| LOAD FLAG REG
| DATA --> CBUS
| CBUS --> CONST PROM ADDR REG               ; Constant = (C800) -3.5
|----------------------------------------
```
.+ 5600

; delta_y > 0, delta_x > 0, POS slope, top = beg, ymaj .....................

.- 5132
```
|----------------------------------------
| FREGDAT1 --> XMAJ
| EXTERNAL RAM --> RBUS
| RBUS --> OBUS
| OBUS --> PRIORITY ENC --> BRLSHFTR CNT REG ; Setting up denominator for slope
| X FRACTION REG --> IBUS                    ; ENABLE TOP active
| PROC: D .OR. 0 --> RB3                     ; XFRAC --> RB3
| DATA = 0                                   ; DATA = 00X XXX XXX XX0
| SELECT FLAGS2                              ; Save slope is POS flag
| LOAD FLAG REG
|----------------------------------------
```
.+ 5160

.- 5160
```
|----------------------------------------
| EXTERNAL RAM --> RBUS
| RBUS --> OBUS
| OBUS --> BRLSHFTR REG                      ; Setting up denominator for slope
| PROC: 0 .-. RB16 --> -                     ; -delta_x --> PREG
| LOAD PREG
| DATA = 305                                 ; DATA = XXX XXX XXX XXX
| DATA --> CBUS
| CBUS --> CONST PROM ADDR REG               ; Constant = (B000) -5
|----------------------------------------
```
.+ 5700

; delta_y > 0, delta_x < 0, NEG slope, top = beg  +++++++++++++++++++++++++++++

.- 5122
```
|----------------------------------
| FREGDAT1 --> XMCDOWN
| PREG --> OBUS
| OBUS --> Y LOOP REG
| PROC: 0 .-. RB16 --> B              ; -delta_x --> R16
| LOAD PREG
| DATA = 57                           ; DATA = XXX XXX XXX XXX
| DATA --> CBUS
| CBUS --> CONST PROM ADDR REG        ; Constant = 4000 (4)
|----------------------------------
```
.+ 5177

.- 5177
```
|----------------------------------
| PREG --> OBUS
| OBUS --> PRIORITY ENC --> BRLSHFTR CNT REG ; Setting up delta_x as denominator
|                                            ; for slope
| CONSTANT PROM --> RBUS
| RBUS --> IBUS
| PROC: D .OR. 0 --> RB3              ; Constant = 4000 (4) --> RB3
|----------------------------------
```
.+ 5176

.- 5176
```
|----------------------------------
| PREG --> OBUS
| OBUS --> BRLSHFTR REG               ; Setting up delta_x as denominator for
|                                     ; slope
| MULT MS PROD --> MBUS
| MBUS --> INTEGER RAM, X FRACTION REG ; Save x/5 result
|                                      ; INTEGER RAM --> IRBUS
| IRBUS --> IBUS
| PROC: RA16 .-. RB17 --> -           ; |delta_x| - |delta_y|
| INCR RAM ADDR                       ; delta_y location = 401
|----------------------------------
```
.+ 5175

.- 5175
```
|----------------------------------
| INTEGER RAM --> IRBUS
| IRBUS --> IBUS
| PROC: D .-. RA2 -1 --> RB2          ; *(x_int(x,beg) - x_int(x,end))
| LOAD PREG                           ;                         --> PREG
| DATA = 302                          ; DATA = XXX XXX 000 010
| DATA --> CBUS
| CBUS --> CONST PROM ADDR REG        ; Constant = (C000) -4
| EXTERNAL RAM --> RBUS
| LOAD MULT CNTRL REG                 ; AM FT RND FA YM XM    for slope
|                                     ;  0  0   0  0  1  0
| SELECT FLAGS1
| LOAD FLAG REG                       ; Save XMAJ flag.
| LOAD ENABLE TOP                     ; 1 (bit 1) --> ENABLE TOP (active)
| DISP [ F=NEG(1) ]                   ; Dispatch if ymaj
|----------------------------------
.+ 5140 ; 5142
```

; delta_y > 0, delta_x < 0, NEG slope, top = beg, xmaj ........................

.- 5140
```
|----------------------------------
| FREGDAT1 --> XMAJ
| PREG --> OBUS
| OBUS --> X LOOP REG
| PROC: 0 .-. RA17 --> -              ; -delta_y --> PREG
| LOAD PREG
|----------------------------------
.+ 5100
```

;                    *
; AM FT RND FA YM XM
;  0  0   0  0  1  0   In for slope denominator .- 5100
```
|----------------------------------
| PREG --> OBUS
| OBUS --> BRLSHFTR REG               ; delta_y (normalized)
| LOAD MULT X REG                     ; delta_x (normalized) --> MULTX
| CONSTANT PROM --> RBUS
| RBUS --> IBUS
| PROC: D .OR. 0 --> RB16             ; C000 (-4) --> RB16
| IBUS --> MBUS
| MBUS --> CONSTANT REG               ; CONSTANT REG = C000 (-4)
| DATA = 305                          ; DATA = XXX XXX XXX XXX
| DATA --> CBUS
| CBUS --> CONST PROM ADDR REG        ; Constant = (B000) -5
|----------------------------------
.+ 5101
```

```
;            *     *
; AM FT RND FA YM XM
;  0  0   0  0  1  0    In for slope numerator .- 5101
|---------------------------------
| BRLSHFTR OUT REG --> IBUS
| IBUS --> RBUS
| RBUS --> OBUS
| OBUS --> MULT Y REG              ; delta_y (normalized) --> MULTY
| DATA = 3                         ; DATA = XXX XXX 000 111
| DATA --> CBUS
| LOAD MULT CNTRL REG              ; AM FT RND FA YM XM    for remaining
|                                  ;  0  0   0  0  1  1
|---------------------------------
.+ 5102

; Multiplier MULTIPLYing!      slope
;            *     *
; AM FT RND FA YM XM
;  0  0   0  0  1  1    In for 5*slope   Out for slope .- 5102
|---------------------------------
| LOAD MULT P REG                  ; Slope --> MULTP
| CONSTANT PROM --> RBUS
| RBUS --> OBUS
| OBUS --> MULT X REG              ; CONSTANT PROM = B000 (-5)
| X FRACTION REG --> IBUS          ; ENABLE TOP active
| PROC: RA3 .-. D --> RB3          ; 4 - XFRAC --> RB3
| LOAD PREG
| DATA = 310                       ; DATA = 00X XXX XXX XXX
| SELECT FLAGS3                    ; Load *ENFILL into flag register
| LOAD FLAG REG
| DATA --> CBUS
| CBUS --> CONST PROM ADDR REG     ; Constant = (C800) -3.5
|---------------------------------
.+ 5601

; delta_y > 0, delta_x < 0, NEG slope, top = beg, ymaj .......................
```

.- 5142
```
|------------------------------------
| FREGDAT1 --> XMAJ
| EXTERNAL RAM --> RBUS
| RBUS --> OBUS
| OBUS --> PRIORITY ENC --> BRLSHFTR CNT REG  ; Setting up denominator for slope
| X FRACTION REG --> IBUS                      ; ENABLE TOP active
| PROC: RA3 .-. D --> RB3                      ; 4 - XFRAC --> RB3
| DATA = 1                                     ; DATA = 00X XXX XXX XX1
| SELECT FLAGS2                                ; Save slope is NEG flag
| LOAD FLAG REG
|------------------------------------
.+ 5110

.- 5110
|------------------------------------
| EXTERNAL RAM --> RBUS
| RBUS --> OBUS
| OBUS --> BRLSHFTR REG                        ; Setting up denominator for slope
| PROC: 0 .-. RB16 --> -                       ; -delta_x --> PREG
| LOAD PREG
| DATA = 305                                   ; DATA = XXX XXX XXX XXX
| DATA --> CBUS
| CBUS --> CONST PROM ADDR REG                 ; Constant = (B000) -5
|------------------------------------
.+ 5700
```

; delta_y = 0, ☆☆☆☆☆☆☆☆☆☆☆☆☆☆☆☆☆☆☆☆☆☆☆☆☆☆☆☆☆☆☆☆☆☆☆☆☆☆☆☆☆☆☆☆☆

.- 5021
```
|------------------------------------
| FREGDAT1 --> TOP
| PROC: RA3 .-. RB3 -1 --> B                   ; FFFF --> PREG for Y LOOP REGISTER
| LOAD PREG                                    ;
| DATA = 4                                     ; DATA = XXX XXX XXX 100
| DATA --> CBUS
| CBUS(2-0) --> INTEGER RAM ADDR REG           ; INTEGER RAM address = 0 (x,end)
| SELECT FLAGS1
| LOAD FLAG REG                                ; Save XMCDOWN flag.
| DISP [ F=NEG(1), F=0(0) ]                    ; Dispatch if delta_x < 0 or delta_x = 0
|------------------------------------
.+ 5220 ; 5221 ; 5222
```

; delta_y = 0, delta_x = 0, POS slope, top = beg  ++++++++++++++++++++++++++++

.- 5221
```
|---------------------------------------
| PREG --> OBUS
| OBUS --> Y LOOP REG
| MULT MS PROD --> MBUS
| MBUS --> INTEGER RAM, X FRACTION REG ; Save x/5 result
| DATA = 310                            ; DATA = 00X XXX XXX XX0
| SELECT FLAGS2                         ; Save slope is POS flag
| LOAD FLAG REG
| DATA --> CBUS
| CBUS --> CONST PROM ADDR REG          ; Constant = C800 (-3.5)
|---------------------------------------
```
.+ 5400

; delta_y = 0, delta_x > 0, POS slope, top = beg  +++++++++++++++++++++++++++++

.- 5220
```
|---------------------------------------
| FREGDAT1 --> XMCDOWN
| PREG --> OBUS
| OBUS --> Y LOOP REG
| MULT MS PROD --> MBUS
| MBUS --> INTEGER RAM, X FRACTION REG ; Save x/5 result
|                                       ; INTEGER RAM --> IRBUS
| IRBUS --> IBUS
| DATA = 310                            ; DATA = 00X XXX XXX XX0
| SELECT FLAGS2                         ; Save slope is POS flag
| LOAD FLAG REG
| DATA --> CBUS
| CBUS --> CONST PROM ADDR REG          ; Constant = C800 (-3.5)
|---------------------------------------
```
.+ 5250

.- 5250
```
|---------------------------------------
| INTEGER RAM --> IRBUS
| IRBUS --> IBUS
| PROC: RA2 .-. D -1 --> RB2            ; *(x_int(x,end) - x_int(x,beg))
| LOAD PREG                             ;                       --> PREG
|---------------------------------------
```
.+ 5400

; delta_y = 0, delta_x < 0, NEG slope, top = beg  +++++++++++++++++++++++++++++

.- 5222
```
|---------------------------------
| FREGDAT1 --> XMCDOWN
| PREG --> OBUS
| OBUS --> Y LOOP REG
| MULT MS PROD --> MBUS
| MBUS --> INTEGER RAM, X FRACTION REG  ; Save x/5 result
|                                       ; INTEGER RAM --> IRBUS
| IRBUS --> IBUS
| DATA = 1                              ; DATA = 00X XXX XXX XX1
| SELECT FLAGS2                         ; Save slope is NEG flag
| LOAD FLAG REG
|---------------------------------
```
.+ 5260

.- 5260
```
|---------------------------------
| INTEGER RAM --> IRBUS
| IRBUS --> IBUS
| PROC: D .-. RA2 -1 --> RB2            ; *(x_int(x,beg) - x_int(x,end))
| LOAD PREG                             ;                        --> PREG
| DATA = 310                            ; DATA = XXX XXX XXX XXX
| DATA --> CBUS
| CBUS --> CONST PROM ADDR REG          ; Constant = C800 (-3.5)
|---------------------------------
```
.+ 5400

; delta_y < 0, top = end  ************************************************

.- 5022
```
|---------------------------------
| FREGDAT1 --> TOP
| INTEGER RAM --> IRBUS
| IRBUS --> IBUS
| PREG --> OBUS
| OBUS --> RBUS
| OBUS --> PRIORITY ENC --> BRLSHFTR CNT REG ; Setting up delta_x as denominator
|                                            ; for slope
| LOAD EXT RAM                          ; delta_x --> EXT RAM location 400
| PROC: D .-. RA3 -1 --> RB3            ; *(y_int(y,beg) - y_int(y,end))
| LOAD PREG                             ;                        --> PREG
| DATA = 4                              ; DATA = XXX XXX XXX 100
| DATA --> CBUS
| CBUS(2-0) --> INTEGER RAM ADDR REG    ; INTEGER RAM address = 0 (x,end)
| SELECT FLAGS1
| LOAD FLAG REG                         ; Save XMCDOWN flag.
| DISP [ F=NEG(1), F=0(0) ]             ; Dispatch if delta_x < 0 or delta_x = 0
|---------------------------------
```
.+ 5320 ; 5321 ; 5322

; delta_y < 0, delta_x = 0, NEG slope, top = end    ++++++++++++++++++++++++++++

.- 5321
|---------------------------------
| FREGDAT1 --> XMCDOWN
| PREG --> OBUS
| OBUS --> Y LOOP REG
| MULT MS PROD --> MBUS
| MBUS --> INTEGER RAM, X FRACTION REG  ; Save x/5 result
| PROC: RA2 .-. RB2 -1 --> B             ; FFFF --> PREG for X LOOP REGISTER
| LOAD PREG                              ;
| DATA = 306                             ; DATA = 00X XXX XXX XX0
| SELECT FLAGS2                          ; Save slope is POS flag
| LOAD FLAG REG
| DATA --> CBUS
| CBUS --> CONST PROM ADDR REG           ; Constant = B800 (-4.5)
|---------------------------------
.+ 5500

; delta_y < 0, delta_x > 0, NEG slope, top = end    ++++++++++++++++++++++++++++

.- 5320
|---------------------------------
| FREGDAT1 --> XMCDOWN
| EXTERNAL RAM --> RBUS
| RBUS --> OBUS
| OBUS --> BRLSHFTR REG                  ; Setting up delta_x as denominator for
|                                        ; slope
| MULT MS PROD --> MBUS
| MBUS --> INTEGER RAM, X FRACTION REG   ; Save x/5 result
|                                        ; INTEGER RAM --> IRBUS
| IRBUS --> IBUS
| PROC: RA16 .+. RB17 --> -              ; |delta_x| - |delta_y|
| DATA = 57                              ; DATA = XXX XXX XXX XXX
| DATA --> CBUS
| CBUS --> CONST PROM ADDR REG           ; Constant = 4000 (4)
|---------------------------------
.+ 5371

```
.- 5371
|---------------------------------
| SELECT FLAGS1
| LOAD FLAG REG                         ; Save XMAJ flag.
| INCR RAM ADDR                         ; delta_y location = 401
| CONSTANT PROM --> RBUS
| RBUS --> IBUS
| PROC: D .OR. 0 --> RB3                ; Constant = 4000 (4) --> R3
|---------------------------------
.+ 5370

;               *
; AM FT RND FA YM XM
;  0  0   1  1  0  0    In for slope denominator .- 5370
|---------------------------------
| EXTERNAL RAM --> RBUS
| RBUS --> OBUS
| OBUS --> BRLSHFTR REG                 ; delta_y (normalized)
| LOAD MULT X REG                       ; delta_x (normalized) --> MULTX
| INTEGER RAM --> IRBUS
| IRBUS --> IBUS
| PROC: RA2 .-. D -1 --> RB2            ; *(x_int(x,end) - x_int(x,beg))
| DATA = 303                            ; DATA = XXX XXX 000 011
| DATA --> CBUS
| CBUS --> CONST PROM ADDR REG          ; Constant = (C000) -4
| LOAD MULT CNTRL REG                   ; AM FT RND FA YM XM    for slope
|                                       ;  0  0   0  0  1  1    and remaining
| LOAD ENABLE TOP                       ; 1 (bit 1) --> ENABLE TOP (active)
| DISP [ FREGDAT(1) ]                   ; Dispatch if ymaj
|---------------------------------
.+ 5330 ; 5332                                                              -

; delta_y < 0, delta_x > 0, NEG slope, top = beg, xmaj ......................

;           *    *
; AM FT RND FA YM XM
;  0  0   0  0  1  1    In for slope numerator
```

.- 5330
```
|----------------------------------
| FREGDAT1 --> XMAJ
| PREG --> OBUS
| OBUS --> Y LOOP REG
| PROC: 0 .OR. RB2 --> -
| LOAD PREG
| BRLSHFTR OUT REG --> IBUS
| IBUS --> MBUS
| MBUS --> MULT Y REG
|----------------------------------
```
.+ 5350

; *(x_int(x,end) - x_int(x,beg)) --> PREG
                                    ;   (for X LOOP REGISTER)

; delta_y (normalized) --> MULTY

.- 5350
```
|----------------------------------
| PREG --> OBUS
| OBUS --> X LOOP REG
| CONSTANT PROM --> RBUS
| RBUS --> IBUS
| PROC: D .OR. 0 --> RB16
| IBUS --> MBUS
| MBUS --> CONSTANT REG
| DATA = 305
| DATA --> CBUS
| CBUS --> CONST PROM ADDR REG
|----------------------------------
```
.+ 5351

; C000 (-4) --> RB16

; CONSTANT REG = C000 (-4)
                                    ; DATA = XXX XXX XXX XXX

; Constant = (B000) -5

; Multiplier MULTIPLYing!         slope
;                  *       *
; AM FT RND FA YM XM
;  0  0  0   0  1  1    In for 5*slope numerator   Out for slope .- 5351
```
|----------------------------------
| LOAD MULT P REG
| CONSTANT PROM --> RBUS
| RBUS --> OBUS
| OBUS --> MULT X REG
| X FRACTION REG --> IBUS
| PROC: RA3 .-. D --> RB3
| LOAD PREG
| DATA = 310
| SELECT FLAGS3
| LOAD FLAG REG
| DATA --> CBUS
| CBUS --> CONST PROM ADDR REG
|----------------------------------
```
.+ 5601

; Slope --> MULTP

; CONSTANT PROM = B000 (-5)
                                    ; ENABLE TOP active
                                    ; 4 - XFRAC --> RB3

; DATA = 00X XXX XXX XXX
                                    ; Load *ENFILL into flag register ; Constant = (C800) -3.5

; delta_y < 0, delta_x > 0, NEG slope, top = beg, ymaj ........................

.- 5332
|------------------------------
| FREGDAT1 --> XMAJ
| PREG --> OBUS
| OBUS --> Y LOOP REG
| PROC: 0 .-. RB17 --> -            ; -delta_y --> PREG
| LOAD PREG                         ; (denominator for slope)
| DATA = 1                          ; DATA = 00X XXX XXX XX1
| SELECT FLAGS2                     ; Save slope is NEG flag
| LOAD FLAG REG
|------------------------------
.+ 5360

.- 5360
|------------------------------
| PREG --> OBUS
| OBUS --> PRIORITY ENC --> BRLSHFTR CNT REG ; Setting up denominator for slope
| X FRACTION REG --> IBUS           ; ENABLE TOP active
| PROC: RA3 .-. D --> RB3           ; 4 - XFRAC --> RB3
| DATA = 2                          ; DATA = XXX XXX 000 010
| DATA --> CBUS
| LOAD MULT CNTRL REG               ; AM FT RND FA YM XM    for slope
|                                   ;  0  0   0  0  1  0
|------------------------------
.+ 5361

.- 5361
|------------------------------
| PREG --> OBUS
| OBUS --> BRLSHFTR REG             ; Setting up denominator for slope
| PROC: 0 .-. RB16 --> -            ; -delta_x --> PREG
| LOAD PREG
| DATA = 305                        ; DATA = XXX XXX XXX XXX
| DATA --> CBUS
| CBUS --> CONST PROM ADDR REG      ; Constant = (B000) -5
|------------------------------
.+ 5700

; delta_y < 0, delta_x < 0, POS slope, top = end  +++++++++++++++++++++++++++++

.- 5322

```
|-----------------------------------
| FREGDAT1 --> XMCDOWN
| PREG --> OBUS
| OBUS --> Y LOOP REG
| PROC: 0 .-. RB16 --> B              ; -delta_x --> R16
| LOAD PREG
|-----------------------------------
```
.+ 5377

.- 5377

```
|-----------------------------------
| PREG --> OBUS
| OBUS --> PRIORITY ENC --> BRLSHFTR CNT REG ; Setting up delta_x as denominator
|                                            ; for slope
|-----------------------------------
```
.+ 5376

.- 5376

```
|-----------------------------------
| PREG --> OBUS
| OBUS --> BRLSHFTR REG               ; Setting up delta_x as denominator for
|                                     ; slope
| MULT MS PROD --> MBUS
| MBUS --> INTEGER RAM, X FRACTION REG ; Save x/5 result
|                                      ; INTEGER RAM --> IRBUS
| IRBUS --> IBUS
| EXTERNAL RAM --> RBUS
| PROC: RA16 .+. RB17 --> -            ; |delta_x| - |delta_y|
| INCR RAM ADDR                        ; delta_y location = 401
|-----------------------------------
```
.+ 5375

```
;                    *
; AM FT RND FA YM XM
;  0  0  1   1  0  0    In for slope denominator
```

.- 5375
```
|-----------------------------------
| EXTERNAL RAM --> RBUS
| RBUS --> OBUS
| OBUS --> BRLSHFTR REG              ; delta_y (normalized)
| LOAD MULT X REG                    ; delta_x (normalized) --> MULTX
| INTEGER RAM --> IRBUS
| IRBUS --> IBUS
| PROC: D .-. RA2 -1 --> RB2         ; *(x_int(x,beg) - x_int(x,end))
| LOAD PREG                          ;                         --> PREG
| DATA = 303                         ; DATA = XXX XXX 000 011
| DATA --> CBUS
| CBUS --> CONST PROM ADDR REG       ; Constant = (C000) -4
| LOAD MULT CNTRL REG                ; AM FT RND FA YM XM     for slope
|                                    ;  0  0   0  0  1  1     and remaining
|                                    ;                        xmaj path only
| SELECT FLAGS1
| LOAD FLAG REG                      ; Save XMAJ flag.
| LOAD ENABLE TOP                    ; 1 (bit 1) --> ENABLE TOP (active)
| DISP [ F=NEG(1) ]                  ; Dispatch if ymaj
|-----------------------------------
.+ 5340 ; 5342
```

; delta_y < 0, delta_x < 0, POS slope, top = end, xmaj ........................

.- 5340
```
|-----------------------------------
| FREGDAT1 --> XMAJ
| CONSTANT PROM --> RBUS
| RBUS --> IBUS
| PROC: D .OR. 0 --> RB16            ; C000 (-4) --> RB16
| IBUS --> MBUS
| MBUS --> CONSTANT REG              ; CONSTANT REG = C000 (-4)
| DATA = 305                         ; DATA = XXX XXX XXX XXX
| DATA --> CBUS
| CBUS --> CONST PROM ADDR REG       ; Constant = (B000) -5
|-----------------------------------
.+ 5300
```

```
;          *    *
; AM FT RND FA YM XM
;  0  0   0  0  1  1     In for slope numerator
```

.- 5300
|--------------------------------
| PREG --> OBUS
| OBUS --> X LOOP REG
| BRLSHFTR OUT REG --> IBUS
| IBUS --> MBUS
| MBUS --> MULT Y REG          ; delta_y (normalized) --> MULTY
|--------------------------------
.+ 5301

; Multiplier MULTIPLYing!        slope
;                *      *
; AM FT RND FA YM XM
;  0  0  0   0  1  1    In for 5*slope numerator   Out for slope .- 5301
|--------------------------------
| LOAD MULT P REG               ; Slope --> MULTP
| CONSTANT PROM --> RBUS
| RBUS --> OBUS
| OBUS --> MULT X REG           ; CONSTANT PROM = B000 (-5)
| X FRACTION REG --> IBUS       ; ENABLE TOP active
| PROC: D .OR. 0 --> RB3        ; XFRAC --> RB3
| LOAD PREG
| DATA = 310                    ; DATA = 00X XXX XXX XXX
| SELECT FLAGS3                 ; Load *ENFILL into flag register
| LOAD FLAG REG
| DATA --> CBUS
| CBUS --> CONST PROM ADDR REG  ; Constant = (C800) -3.5
|--------------------------------
.+ 5600

; delta_y < 0, delta_x < 0, POS slope, top = end, ymaj ......................:..

.- 5342
|--------------------------------
| FREGDAT1 --> XMAJ
| PROC: 0 .-. RB17 --> -        ; -delta_y --> PREG
| LOAD PREG                     ; (denominator for slope)
| DATA = 0                      ; DATA = 00X XXX XXX XX0
| SELECT FLAGS2                 ; Save slope is POS flag
| LOAD FLAG REG
|--------------------------------
.+ 5310

.- 5310
```
|------------------------------------
| PREG --> OBUS
| OBUS --> PRIORITY ENC --> BRLSHFTR CNT REG ; Setting up denominator for slope
| X FRACTION REG --> IBUS              ; ENABLE TOP active
| PROC: D .OR. 0 --> RB3               ; XFRAC --> RB3
| DATA = 2                             ; DATA = XXX XXX 000 010
| DATA --> CBUS
| LOAD MULT CNTRL REG                  ; AM FT RND FA YM XM    for slope
|                                      ;  0  0   0  0  1  0
|------------------------------------
```
.+ 5311

.- 5311
```
|------------------------------------
| PREG --> OBUS
| OBUS --> BRLSHFTR REG                ; Setting up denominator for slope
| PROC: 0 .-. RB16 --> -               ; -delta_x --> PREG
| LOAD PREG
| DATA = 305                           ; DATA = XXX XXX XXX XXX
| DATA --> CBUS
| CBUS --> CONST PROM ADDR REG         ; Constant = (B000) -5
|------------------------------------
```
.+ 5700

; xmaj, slope = 0  ************************************************

CONSTANT REGISTER must be loaded in the following order
        B1    A_CONSTANT_REG    := don't care
        A2    B_CONSTANT_REG    := 0
        A1    AB_CONSTANT_REG   := don't care INTERCEPT             := y_frac - 3.5

.- 5400
```
|------------------------------------
| PREG --> OBUS
| OBUS --> X LOOP REG
| CONSTANT PROM --> RBUS
| RBUS --> IBUS                        ; CONSTANT PROM = C800 (-3.5)
| PROC: D .OR. 0 --> RB17              ; C800 (-3.5) --> RB17
| DATA = 2                             ; DATA = XXX XXX XXX X1X
| LOAD ENABLE TOP                      ; 1 (bit 1) --> ENABLE TOP (active)
|------------------------------------
```
.+ 5450

.- 5450
```
|----------------------------------
| DATA = 5                           ; DATA = 00X XXX XXX 101
| SELECT FLAGS3                      ; Load *ENFILL into flag register
| LOAD FLAG REG
| DATA --> CBUS
| CBUS(2-0) --> INTEGER RAM ADDR REG ; INTEGER RAM address = 1 (y,end)
| Y FRACTION REG --> IBUS            ; ENABLE TOP active
| PROC: D .+. RA17 --> RB17          ; C800 (-3.5) + YFRAC --> RB17
| LOAD PREG                          ;       RA17    + D
| DISP [ FREGDAT(0) ]                ; Dispatch if slope is negative
|----------------------------------
.+ 5420 ; 5421
```

; Slope is positive

.- 5420
```
|----------------------------------
| DATA = 0                           ; DATA = XXX XXX XXX X00
| DATA --> CBUS                      ; Slope is positive
| CBUS --> IBUS
| IBUS --> MBUS
| MBUS --> SLOPE REG                 ; 0 --> SLOPE REGISTER
| PREG --> OBUS
| OBUS --> INTERCEPT B REG
| DISP [ *DORFSH(1), DONE(0) ]       ; Last vector done drawing?
|----------------------------------
.+ 5446 ; 5444 ; 5445 ; 5447
```

.- 5446
```
|----------------------------------
| DATA = 0                           ; DATA = XXX XXX XXX X00
| DATA --> CBUS                      ; Slope is positive
| CBUS --> IBUS
| IBUS --> MBUS
| MBUS --> SLOPE REG                 ; 0 --> SLOPE REGISTER
| PREG --> OBUS
| OBUS --> INTERCEPT B REG
| DISP [ *DORFSH(1), DONE(0) ]       ; Last vector done drawing?
|----------------------------------
.+ 5446 ; 5444 ; 5445 ; 5447
```

; Not Done, Do refresh.

```
.- 5444
|----------------------------------
| INCR STACK PNTR                       ; (Yes) go do refresh
| DISP [ FREGDAT(3) ]                   ; Dispatch if in fill mode
|----------------------------------
.+ 5441 ; 5451

; Done, Do refresh.

.- 5445
|----------------------------------
| INCR STACK PNTR                       ; (Yes) go do refresh
| DISP [ FREGDAT(3) ]                   ; Dispatch if in fill mode
|----------------------------------
.+ 5441 ; 5451

; Done, No refresh.

.- 5447
|----------------------------------
| INTEGER RAM --> IRBUS                 ; ENABLE TOP active
| IRBUS --> Y MATRIX CNTR
| X & Y LOOP REGS --> CNTRS
| DATA = 4                              ; DATA = XXX XXX XXX 101
| DATA --> CBUS
| CBUS(2-0) --> INTEGER RAM ADDR REG    ; INTEGER RAM address = 0 (x,end)
| PG TOGGLE
| PROC: 0 .OR. RA0 --> RB16             ; Update present position for X
| DISP [ FREGDAT(3) ]                   ; Dispatch if in fill mode
|----------------------------------
.+ 5477 ; 5467

; Slope is negative

.- 5421
|----------------------------------
| DATA = 2                              ; DATA = XXX XXX XXX X10
| DATA --> CBUS                         ; Slope is negative
| CBUS --> IBUS
| IBUS --> MBUS
| MBUS --> SLOPE REG                    ; 0 --> SLOPE REGISTER
| PREG --> OBUS
| OBUS --> INTERCEPT B REG
| DISP [ *DORFSH(1), DONE(0) ]          ; Last vector done drawing?
|----------------------------------
.+ 5436 ; 5434 ; 5435 ; 5437
```

.- 5436
|--------------------------------
| DATA = 2                               ; DATA = XXX XXX XXX X10
| DATA --> CBUS                          ; Slope is negative
| CBUS --> IBUS
| IBUS --> MBUS
| MBUS --> SLOPE REG                     ; 0 --> SLOPE REGISTER
| PREG --> OBUS
| OBUS --> INTERCEPT B REG
| DISP [ *DORFSH(1), DONE(0) ]           ; Last vector done drawing?
|--------------------------------
.+ 5436 ; 5434 ; 5435 ; 5437

; Not Done, Do refresh.

.- 5434
|--------------------------------
| INCR STACK PNTR                        ; (Yes) go do refresh
| DISP [ FREGDAT(3) ]                    ; Dispatch if in fill mode
|--------------------------------
.+ 5441 ; 5451

; Done, Do refresh.

.- 5435
|--------------------------------
| INCR STACK PNTR                        ; (Yes) go do refresh
| DISP [ FREGDAT(3) ]                    ; Dispatch if in fill mode
|--------------------------------
.+ 5441 ; 5451

; Done or Not done, Do refresh, Not fill mode.

.- 5451
|--------------------------------
| DATA = 5437
| DATA --> CBUS
| PUSH CBUS ON STACK
|--------------------------------
.+ 0074

; Done or Not done, Do refresh, Fill mode.

.- 5441
```
|------------------------------------
| DCR STACK PNTR
| INTEGER RAM --> IRBUS              ; ENABLE TOP active
| IRBUS --> Y MATRIX CNTR
| X & Y LOOP REGS --> CNTRS
| DATA = 4                           ; DATA = XXX XXX XXX 100
| DATA --> CBUS
| CBUS(2-0) --> INTEGER RAM ADDR REG ; INTEGER RAM address = 0 (x,end)
| PG TOGGLE
| PROC: 0 .OR. RA0 --> RB16          ; Update present position for X
|------------------------------------
```
.+ 5467

; Done, No refresh.

.- 5437
```
|------------------------------------
| INTEGER RAM --> IRBUS              ; ENABLE TOP active
| IRBUS --> Y MATRIX CNTR
| X & Y LOOP REGS --> CNTRS
| DATA = 4                           ; DATA = XXX XXX XXX 100
| DATA --> CBUS
| CBUS(2-0) --> INTEGER RAM ADDR REG ; INTEGER RAM address = 0 (x,end)
| PG TOGGLE
| PROC: 0 .OR. RA0 --> RB16          ; Update present position for X
| DISP [ FREGDAT(3) ]                ; Dispatch if in fill mode
|------------------------------------
```
.+ 5477 ; 5467

; NOT fill mode

.- 5477
```
|------------------------------------
| INTEGER RAM --> IRBUS              ; ENABLE TOP active
| IRBUS --> X MATRIX CNTR, TRANS X & Y FRAC REGS
| DATA = 5                           ; DATA = XXX XXX XXX 101
| DATA --> CBUS
| CBUS(2-0) --> INTEGER RAM ADDR REG ; INTEGER RAM address = 1 (y,end)
| PROC: 0 .OR. RA1 --> RB17          ; Update present position Y
| GO DRAW
| SINGLE STEP PIXEL GENERATOR LOGIC
| POP UNCOND
|------------------------------------
```
.+ 5477

; Fill mode

.- 5467
```
|------------------------------------
| INTEGER RAM --> IRBUS                    ; ENABLE TOP active
| IRBUS --> X MATRIX CNTR, TRANS X & Y FRAC REGS
|
| DATA = 2005                              ; DATA = XX1 XXX XXX 111
| DATA --> CBUS
| CBUS(2-0) --> INTEGER RAM ADDR REG       ; INTEGER RAM address = 1 (y,end)
| PROC: 0 .OR. RA1 --> RB17                ; Update present position Y
| SINGLE STEP PIXEL GENERATOR LOGIC
|
| SELECT FLAGS2                            ; load xmcdown.
| LOAD FLAG REG
|
| POP UNCOND
|------------------------------------
```
.+ 5467

; ymaj, slope = 0   *******************************************************

CONSTANT REGISTER must be loaded in the following order
      B1    A_CONSTANT_REG   :=   don't care
      A2    B_CONSTANT_REG   :=   0
      A1    AB_CONSTANT_REG  :=   don't care INTERCEPT        :=  x_frac - 4.5

.- 5500
```
|------------------------------------
| PREG --> OBUS
| OBUS --> X LOOP REG
| CONSTANT PROM --> RBUS
| RBUS --> IBUS                            ; CONSTANT PROM = B800 (-4.5)
| PROC: D .OR. 0 --> RB17                  ; B800 (-4.5) --> RB17
| DATA = 2                                 ; DATA = XXX XXX XXX X1X
| LOAD ENABLE TOP                          ; 1 (bit 1) --> ENABLE TOP (active)
|------------------------------------
```
.+ 5550

.- 5550
|------------------------------------
| DATA = 5                                  ; DATA = 00X XXX XXX 101
| SELECT FLAGS3                             ; Load *ENFILL into flag register
| LOAD FLAG REG                             ; AND Save XMAJ = ymaj flag.
| DATA --> CBUS
| CBUS(2-0) --> INTEGER RAM ADDR REG        ; INTEGER RAM address = 1 (y,end).
| X FRACTION REG --> IBUS                   ; ENABLE TOP active
| PROC: D .+. RA17 --> RB17                 ; B800 (-4.5) + XFRAC --> RB17
| LOAD PREG                                 ;      RA17    + D
| DISP [ FREGDAT(0) ]                       ; Dispatch if slope is negative
|------------------------------------
.+ 5520 ; 5521

; Slope is positive

.- 5520
|------------------------------------
| FREGDAT1 --> XMAJ                         ; Cause XMAJ flag to be ymaj
| DATA = 0                                  ; DATA = XXX XXX XXX X00
| DATA --> CBUS                             ; Slope is positive
| CBUS --> IBUS
| IBUS --> MBUS
| MBUS --> SLOPE REG                        ; 0 --> SLOPE REGISTER
| PREG --> OBUS
| OBUS --> INTERCEPT B REG
| DISP [ *DORFSH(1), DONE(0) ]              ; Last vector done drawing?
|------------------------------------
.+ 5546 ; 5544 ; 5545 ; 5547

.- 5546
|------------------------------------
| FREGDAT1 --> XMAJ                         ; Cause XMAJ flag to be ymaj
| DATA = 0                                  ; DATA = XXX XXX XXX X00
| DATA --> CBUS                             ; Slope is positive
| CBUS --> IBUS
| IBUS --> MBUS
| MBUS --> SLOPE REG                        ; 0 --> SLOPE REGISTER
| PREG --> OBUS
| OBUS --> INTERCEPT B REG
| DISP [ *DORFSH(1), DONE(0) ]              ; Last vector done drawing?
|------------------------------------
.+ 5546 ; 5544 ; 5545 ; 5547

; Not Done, Do refresh.

.- 5544

|---------------------------------
| INCR STACK PNTR                          ; (Yes) go do refresh
| DISP [ FREGDAT(3) ]                      ; Dispatch if in fill mode
|---------------------------------
.+ 5541 ; 5551

; Done, Do refresh.

.- 5545

|---------------------------------
| INCR STACK PNTR                          ; (Yes) go do refresh
| DISP [ FREGDAT(3) ]                      ; Dispatch if in fill mode
|---------------------------------
.+ 5541 ; 5551

; Done, No refresh.

.- 5547

|---------------------------------
| INTEGER RAM --> IRBUS                    ; ENABLE TOP active
| IRBUS --> Y MATRIX CNTR
| X & Y LOOP REGS --> CNTRS
| DATA = 4                                 ; DATA = XXX XXX XXX 101
| DATA --> CBUS
| CBUS(2-0) --> INTEGER RAM ADDR REG       ; INTEGER RAM address = 0 (x,end)
| PG TOGGLE
| PROC: 0 .OR. RA0 --> RB16                ; Update present position for X
| DISP [ FREGDAT(3) ]                      ; Dispatch if in fill mode
|---------------------------------
.+ 5577 ; 5567

; Slope is negative

.- 5521

|---------------------------------
| FREGDAT1 --> XMAJ                        ; Cause XMAJ flag to be ymaj
| DATA = 2                                 ; DATA = XXX XXX XXX X10
| DATA --> CBUS                            ; Slope is negative
| CBUS --> IBUS
| IBUS --> MBUS
| MBUS --> SLOPE REG                       ; 0 --> SLOPE REGISTER
| PREG --> OBUS
| OBUS --> INTERCEPT B REG
| DISP [ *DORFSH(1), DONE(0) ]             ; Last vector done drawing?
|---------------------------------
.+ 5536 ; 5534 ; 5535 ; 5537

.- 5536

```
|----------------------------------
| FREGDAT1 --> XMAJ                    ; Cause XMAJ flag to be ymaj
| DATA = 2                             ; DATA = XXX XXX XXX X10
| DATA --> CBUS                        ; Slope is negative
| CBUS --> IBUS
| IBUS --> MBUS
| MBUS --> SLOPE REG                   ; 0 --> SLOPE REGISTER
| PREG --> OBUS
| OBUS --> INTERCEPT B REG
| DISP [ *DORFSH(1), DONE(0) ]         ; Last vector done drawing?
|----------------------------------
```
.+ 5536 ; 5534 ; 5535 ; 5537

; Not Done, Do refresh.

.- 5534
```
|----------------------------------
| INCR STACK PNTR                      ; (Yes) go do refresh
| DISP [ FREGDAT(3) ]                  ; Dispatch if in fill mode
|----------------------------------
```
.+ 5541 ; 5551

; Done, Do refresh.

.- 5535
```
|----------------------------------
| INCR STACK PNTR                      ; (Yes) go do refresh
| DISP [ FREGDAT(3) ]                  ; Dispatch if in fill mode
|----------------------------------
```
.+ 5541 ; 5551

; Done or Not done, Do refresh, Not fill mode.

.- 5551
```
|----------------------------------
| DATA = 5537
| DATA --> CBUS
| PUSH CBUS ON STACK
|----------------------------------
```
.+ 0074

; Done or Not done, Do refresh, Fill mode.

.- 5541
```
|------------------------------------
| DCR STACK PNTR
| INTEGER RAM --> IRBUS                 ; ENABLE TOP active
| IRBUS --> Y MATRIX CNTR
| X & Y LOOP REGS --> CNTRS
| DATA = 4                              ; DATA = XXX XXX XXX 100
| DATA --> CBUS
| CBUS(2-0) --> INTEGER RAM ADDR REG    ; INTEGER RAM address = 0 (x,end)
| PG TOGGLE
| PROC: 0 .OR. RA0 --> RB16             ; Update present position for X
|------------------------------------
```
.+ 5567

; Done, No refresh.

.- 5537
```
|------------------------------------
| INTEGER RAM --> IRBUS                 ; ENABLE TOP active
| IRBUS --> Y MATRIX CNTR
| X & Y LOOP REGS --> CNTRS
| DATA = 4                              ; DATA = XXX XXX XXX 100
| DATA --> CBUS
| CBUS(2-0) --> INTEGER RAM ADDR REG    ; INTEGER RAM address = 0 (x,end)
| PG TOGGLE
| PROC: 0 .OR. RA0 --> RB16             ; Update present position for X
| DISP [ FREGDAT(3) ]                   ; Dispatch if in fill mode
|------------------------------------
```
.+ 5577 ; 5567

; NOT fill mode

.- 5577
```
|------------------------------------
| INTEGER RAM --> IRBUS                 ; ENABLE TOP active
| IRBUS --> X MATRIX CNTR, TRANS X & Y FRAC REGS
| DATA = 5                              ; DATA = XXX XXX XXX 101
| DATA --> CBUS
| CBUS(2-0) --> INTEGER RAM ADDR REG    ; INTEGER RAM address = 1 (y,end)
| PROC: 0 .OR. RA1 --> RB17             ; Update present position Y
| GO DRAW
| SINGLE STEP PIXEL GENERATOR LOGIC
| POP UNCOND
|------------------------------------
```
.+ 5577

; Fill mode

.- 5567
```
|------------------------------------
| INTEGER RAM --> IRBUS                  ; ENABLE TOP active
| IRBUS --> X MATRIX CNTR, TRANS X & Y FRAC REGS
| DATA = 2005                            ; DATA = XXX XXX XXX 101
| DATA --> CBUS
| CBUS(2-0) --> INTEGER RAM ADDR REG     ; INTEGER RAM address = 1 (y,end)
| PROC: 0 .OR. RA1 --> RB17              ; Update present position Y
| SINGLE STEP PIXEL GENERATOR LOGIC
|
| SELECT FLAGS2                          ; load xmcdown.
| LOAD FLAG REG
|
| POP UNCOND
|------------------------------------
```
.+ 5567

; xmaj ****************************************************

CONSTANT REGISTER must be loaded in the following order
      B1    A_CONSTANT_REG     :=  -4
      A2    B_CONSTANT_REG     :=  -5 * slope
      A1    AB_CONSTANT_REG    :=  (-5 * slope) - 4

INTERCEPT         :=  y_frac + (slope * x_frac) - 3.5

; Slope is positive

.- 5600
```
|------------------------------------
| DATA = 1                        ; DATA = XXX XXX XXX X01
| DATA --> CBUS                   ; Slope is positive
| MULT MS PROD --> MBUS
| MBUS --> MULT Y REG, SLOPE REG  ; Store slope
| CONSTANT PROM --> RBUS
| RBUS --> IBUS                   ; CONSTANT PROM = C800 (-3.5)
| PROC: D .OR. 0 --> RB17         ; C800 (-3.5) --> RB17
|------------------------------------
```
.+ 5652

; Slope is negative

.- 5601
```
|------------------------------------
| DATA = 3                              ; DATA = XXX XXX XXX X11
| DATA --> CBUS                         ; Slope is negative
| MULT MS PROD --> MBUS
| MBUS --> MULT Y REG, SLOPE REG        ; Store slope
| CONSTANT PROM --> RBUS
|                                       ; CONSTANT PROM = C800 (-3.5)
| RBUS --> IBUS
| PROC: D .OR. 0 --> RB17               ; C800 (-3.5) --> RB17
|------------------------------------
```
.+ 5652

; Multiplier MULTIPLYing!    B000 (-5) * slope

.- 5652
```
|------------------------------------
| LOAD MULT P REG                       ; B000 (-5) * slope --> MULTP
| PREG --> OBUS
| OBUS --> MULT X REG                   ; XFRAC --> MULTX
| Y FRACTION REG --> IBUS               ; ENABLE TOP active
| PROC: D .+. RA17 --> RB17             ; YFRAC + C800 (-3.5) --> RB17
|                                       ;   D   +    R17
|------------------------------------
```
.+ 5653

; Multiplier MULTIPLYing!    XFRAC * slope

.- 5653
```
|------------------------------------
| LOAD MULT P REG                       ; XFRAC * slope --> MULTP
| MULT MS PROD --> MBUS
| MBUS --> IBUS
| PROC: D .OR. 0 --> RB2                ; B000 (-5) * slope --> RB2
| MBUS --> CONSTANT REG                 ; B000 (-5) * slope --> CONSTANT REG
|------------------------------------
```
.+ 5654

.- 5654
```
|------------------------------------
| PROC: RA2 .+. RB16 --> -              ; B000 (-5) * slope + C000 (-4)
| LOAD PREG                             ;       R2        +     R16
| DISP [ FREGDAT(3) ]                   ; Dispatch if in fill mode
|------------------------------------
```
.+ 5626 ; 5636

; Fill mode

```
.- 5626
|---------------------------------
| MULT MS PROD --> MBUS
| MBUS --> IBUS
| PROC: D .OR. 0 --> RB3            ; XFRAC * slope --> RB3
|---------------------------------
.+ 5637

; NOT fill mode

.- 5636
|---------------------------------
| MULT MS PROD --> MBUS
| MBUS --> IBUS
| PROC: D .OR. 0 --> RB3            ; XFRAC * slope --> RB3
| DISP [ *DORFSH(1), DONE(0) ]      ; Last vector done drawing?
|---------------------------------
.+ 5636 ; 5634 ; 5635 ; 5637

; Not Done, Do refresh.

.- 5634
|---------------------------------
| INCR STACK PNTR                   ; (Yes) go do refresh
|---------------------------------
.+ 5630

; Done, Do refresh.

.- 5635
|---------------------------------
| INCR STACK PNTR                   ; (Yes) go do refresh
|---------------------------------
.+ 5630

.- 5630
|---------------------------------
| DATA = 5637
| DATA --> CBUS
| PUSH CBUS ON STACK
|---------------------------------
.+ 0074

; Done, No refresh.
```

.- 5637
|---------------------------------
| PREG --> OBUS
| OBUS --> RBUS
| RBUS --> IBUS
| IBUS --> MBUS
| MBUS --> CONSTANT REG                            ; B000 (-5) * slope + C000 (-4)
| DATA = 5                                         ; DATA = XXX XXX XXX 101
| DATA --> CBUS
| CBUS(2-0) --> INTEGER RAM ADDR REG               ; INTEGER RAM address = 1 (y,end)
| PROC: RA3 .+. RB17 --> -                         ; XFRAC * slope + YFRAC + C800 (-3.5)
| LOAD PREG                                        ;      R5        +       R4
| DISP [ FREGDAT(3) ]                              ; Dispatch if in fill mode
|---------------------------------
.+ 5676 ; 5666

; NOT fill mode

.- 5676
|---------------------------------
| PREG --> OBUS
| OBUS --> INTERCEPT B REG
| INTEGER RAM --> IRBUS                            ; ENABLE TOP active
| IRBUS --> Y MATRIX CNTR
| X & Y LOOP REGS --> CNTRS
| DATA = 4                                         ; DATA = XXX XXX XXX 100
| DATA --> CBUS
| CBUS(2-0) --> INTEGER RAM ADDR REG               ; INTEGER RAM address = 0 (x,beg)
| PROC: 0 .OR. RA0 --> RB16                        ; Update present position for X
| PG TOGGLE
|---------------------------------
.+ 5677

.- 5677
|---------------------------------
| INTEGER RAM --> IRBUS                            ; ENABLE TOP active
| IRBUS --> X MATRIX CNTR, TRANS X & Y FRAC REGS
| PROC: 0 .OR. RA1 --> RB17                        ; Update present position for Y
| DATA = 5                                         ; DATA = XXX XXX XXX 101
| DATA --> CBUS
| CBUS(2-0) --> INTEGER RAM ADDR REG               ; INTEGER RAM address = 1 (y,end)
| GO DRAW
| SINGLE STEP PIXEL GENERATOR LOGIC
| POP UNCOND
|---------------------------------
.+ 5677

; Fill mode

```
.- 5666
|-----------------------------------
| PREG --> OBUS
| OBUS --> INTERCEPT B REG
| INTEGER RAM --> IRBUS              ; ENABLE TOP active
| IRBUS --> Y MATRIX CNTR
| X & Y LOOP REGS --> CNTRS
| DATA = 4                           ; DATA = XXX XXX XXX 100
| DATA --> CBUS
| CBUS(2-0) --> INTEGER RAM ADDR REG ; INTEGER RAM address = 0 (x,beg)
| PROC: 0 .OR. RA0 --> RB16          ; Update present position for X
| PG TOGGLE
|-----------------------------------
.+ 5657

.- 5657
|-----------------------------------
| INTEGER RAM --> IRBUS              ; ENABLE TOP active
| IRBUS --> X MATRIX CNTR, TRANS X & Y FRAC REGS
| PROC: 0 .OR. RA1 --> RB17          ; Update present position for Y
| DATA = 2005                        ; DATA = XXX XXX XXX 101
| DATA --> CBUS
| CBUS(2-0) --> INTEGER RAM ADDR REG ; INTEGER RAM address = 1 (y,end)
| SINGLE STEP PIXEL GENERATOR LOGIC
|
| SELECT FLAGS2                      ; load xmcdown.
| LOAD FLAG REG
|
| POP UNCOND
|-----------------------------------
.+ 5657

; ymaj *********************************************************

CONSTANT REGISTER must be loaded in the following order
        B1    A_CONSTANT_REG   := -5
        A2    B_CONSTANT_REG   := -4 * slope
        A1    AB_CONSTANT_REG  := (-4 * slope) - 5

INTERCEPT          := x_frac + (slope * yl_frac) - 4.5

;                  *
; AM FT RND FA YM XM
;  0  0  0  0  1  0    In for slope denominator
```

```
.- 5700
|------------------------------
| PREG --> OBUS
| OBUS --> BRLSHFTR REG              ; delta_x (normalized)
| LOAD MULT X REG                    ; delta_y (normalized) --> MULTX
| CONSTANT PROM --> RBUS
| RBUS --> IBUS
| PROC: D .OR. 0 --> RB16            ; B000 (-5) --> RB16
| IBUS --> MBUS
| MBUS --> CONSTANT REG              ; CONSTANT REG = B000 (-5)
| DATA = 302                         ; DATA = XXX XXX XXX XXX
| DATA --> CBUS
| CBUS --> CONST PROM ADDR REG       ; Constant = (C000) -4
|------------------------------
.+ 5750

;                  *
; AM FT RND FA YM XM
;  0  0   0  0  1  0    In for slope numerator .- 5750
|------------------------------
| BRLSHFTR OUT REG --> IBUS
| IBUS --> RBUS
| RBUS --> OBUS
| OBUS --> MULT Y REG                ; delta_y (normalized) --> MULTY
| PROC: 0 .OR. RB2 --> -             ; X LOOP REGISTER value
| LOAD PREG                          ;
| DATA = 3                           ; DATA = XXX XXX 000 011
| DATA --> CBUS
| LOAD MULT CNTRL REG                ; AM FT RND FA YM XM     for remaining
|                                    ;  0  0   0  0  1  1
|------------------------------
.+ 5751

; Multiplier MULTIPLYing!      slope
```

.- 5751
```
|------------------------------------
| LOAD MULT P REG                          ; Slope --> MULTP
| CONSTANT PROM --> RBUS
| RBUS --> OBUS
| OBUS --> MULT X REG                      ; CONSTANT PROM = C000 (-4)
| DATA = 306                               ; DATA = 00X XXX XXX XXX
| SELECT FLAGS3                            ; Load *ENFILL into flag register
| LOAD FLAG REG
| DATA --> CBUS
| CBUS --> CONST PROM ADDR REG             ; Constant = (B800) -4.5
| DISP [ FREGDAT(0) ]                      ; Dispatch if slope is negative
|------------------------------------
.+ 5720 ; 5721
```

; Slope is positive

.- 5720
```
|------------------------------------
| DATA = 1                                 ; DATA = XXX XXX XXX X01
| DATA --> CBUS                            ; Slope is positive
| MULT MS PROD --> MBUS
| MBUS --> MULT Y REG, SLOPE REG           ; Store slope
| CONSTANT PROM --> RBUS
| RBUS --> IBUS                            ; CONSTANT PROM = B800 (-4.5)
| PREG --> OBUS
| OBUS --> X LOOP REG
| PROC: D .OR. 0 --> RB17                  ; B800 (-4.5) --> RB17
|------------------------------------
.+ 5752
```

; Slope is negative

.- 5721
```
|------------------------------------
| DATA = 3                                 ; DATA = XXX XXX XXX X11
| DATA --> CBUS                            ; Slope is negative
| MULT MS PROD --> MBUS
| MBUS --> MULT Y REG, SLOPE REG           ; Store slope
| CONSTANT PROM --> RBUS
| RBUS --> IBUS                            ; CONSTANT PROM = B800 (-4.5)
| PREG --> OBUS
| OBUS --> X LOOP REG
| PROC: D .OR. 0 --> RB17                  ; B800 (-4.5) --> RB17
|------------------------------------
.+ 5752
```

; Multiplier MULTIPLYing!    C000 (-4) * slope

.- 5752
```
|---------------------------------
| LOAD MULT P REG                    ; C000 (-4) * slope --> MULTP
| Y FRACTION REG --> IBUS            ; ENABLE TOP active
| IBUS --> RBUS
| RBUS --> OBUS
| OBUS --> MULT X REG                ; YFRAC --> MULTX
| PROC: RA3 .+. RB17 --> B           ; XFRAC + B800 (-4.5) --> R17
|                                    ;   R3   +    R17
|
|---------------------------------
```
.+ 5753

; Multiplier MULTIPLYing!    YFRAC * slope

.- 5753
```
|---------------------------------
| LOAD MULT P REG                    ; YFRAC * slope --> MULTP
| MULT MS PROD --> MBUS
| MBUS --> IBUS
| PROC: D .OR. 0 --> RB2             ; C000 (-4) * slope --> RB2
| MBUS --> CONSTANT REG              ; C000 (-4) * slope --> CONSTANT REG
|---------------------------------
```
.+ 5754

.- 5754
```
|---------------------------------
| PROC: RA2 .+. RB16 --> -           ; C000 (-4) * slope + B000 (-5)
| LOAD PREG                          ;      R2       +     R16
| DISP [ FREGDAT(3) ]                ; Dispatch if in fill mode
|---------------------------------
```
.+ 5726 ; 5736

; Fill mode

.- 5726
```
|---------------------------------
| MULT MS PROD --> MBUS
| MBUS --> IBUS
| PROC: D .OR. 0 --> RB3             ; YFRAC * slope --> RB3
|---------------------------------
```
.+ 5737

; NOT fill mode

.- 5736
|------------------------------------
| MULT MS PROD --> MBUS
| MBUS --> IBUS
| PROC: D .OR. 0 --> RB3            ; YFRAC * slope --> RB3
| DISP [ *DORFSH(1), DONE(0) ]      ; Last vector done drawing?
|------------------------------------
.+ 5736 ; 5734 ; 5735 ; 5737

; Not Done, Do refresh.

.- 5734
|------------------------------------
| INCR STACK PNTR                   ; (Yes) go do refresh
|------------------------------------
.+ 5730

; Done, Do refresh.

.- 5735
|------------------------------------
| INCR STACK PNTR                   ; (Yes) go do refresh
|------------------------------------
.+ 5730

.- 5730
|------------------------------------
| DATA = 5737
| DATA --> CBUS
| PUSH CBUS ON STACK
|------------------------------------
.+ 0074

; Done, No refresh.

.- 5737
|------------------------------------
| PREG --> OBUS
| OBUS --> RBUS
| RBUS --> IBUS
| IBUS --> MBUS
| MBUS --> CONSTANT REG             ; C000 (-4) * slope + B000 (-5)
| DATA = 5                          ; DATA = XXX XXX XXX 101
| DATA --> CBUS
| CBUS(2-0) --> INTEGER RAM ADDR REG ; INTEGER RAM address = 1 (y,end)
| PROC: RA3 .+. RB17 --> -          ; YFRAC * slope + XFRAC + B800 (-4.5)
| LOAD PREG                         ;     R3    +    R17
| DISP [ FREGDAT(3) ]               ; Dispatch if in fill mode
|------------------------------------
.+ 5776 ; 5766

; NOT fill mode

.- 5776
|------------------------------------
| PREG --> OBUS
| OBUS --> INTERCEPT B REG
| INTEGER RAM --> IRBUS                     ; ENABLE TOP active
| IRBUS --> Y MATRIX CNTR
| X & Y LOOP REGS --> CNTRS
| DATA = 4                                  ; DATA = XXX XXX XXX 100
| DATA --> CBUS
| CBUS(2-0) --> INTEGER RAM ADDR REG        ; INTEGER RAM address = 0 (x,beg)
| PROC: 0 .OR. RA0 --> RB16                 ; Update present position for X
| PG TOGGLE
|------------------------------------
.+ 5777

.- 5777
|------------------------------------
| INTEGER RAM --> IRBUS                     ; ENABLE TOP active
| IRBUS --> X MATRIX CNTR, TRANS X & Y FRAC REGS
| PROC: 0 .OR. RA1 --> RB17                 ; Update present position for Y
| DATA = 5                                  ; DATA = XXX XXX XXX 101
| DATA --> CBUS
| CBUS(2-0) --> INTEGER RAM ADDR REG        ; INTEGER RAM address = 1 (y,end)
| GO DRAW
| SINGLE STEP PIXEL GENERATOR LOGIC
| POP UNCOND
|------------------------------------
.+ 5777

; Fill mode

.- 5766
|------------------------------------
| PREG --> OBUS
| OBUS --> INTERCEPT B REG
| INTEGER RAM --> IRBUS                     ; ENABLE TOP active
| IRBUS --> Y MATRIX CNTR
| X & Y LOOP REGS --> CNTRS
| DATA = 4                                  ; DATA = XXX XXX XXX 100
| DATA --> CBUS
| CBUS(2-0) --> INTEGER RAM ADDR REG        ; INTEGER RAM address = 0 (x,beg)
| PROC: 0 .OR. RA0 --> RB16                 ; Update present position for X
| PG TOGGLE
|------------------------------------
.+ 5757

.- 5757
```
|-----------------------------------------
| INTEGER RAM --> IRBUS                    ; ENABLE TOP active
| IRBUS --> X MATRIX CNTR, TRANS X & Y FRAC REGS
| PROC: 0 .OR. RA1 --> RB17               ; Update present position for Y
| DATA = 2005                             ; DATA = XXX XXX XXX 101
| DATA --> CBUS
| CBUS(2-0) --> INTEGER RAM ADDR REG      ; INTEGER RAM address = 1 (y,end)
| SINGLE STEP PIXEL GENERATOR LOGIC
|
| SELECT FLAGS2                           ; load xmcdown.
| LOAD FLAG REG
|
| POP UNCOND
|-----------------------------------------
```
.+ 5757

; MOVE ENTRY 1 (states 20,40) from poll loop ******************************
; FIFO = (y,end)
; FIFO = (x,end)

; Entry from refresh

.- 3020
```
|-----------------------------------------
| DATA = 1                                ; DATA = XXX X00 000 001
| DATA --> CBUS
| LOAD ENABLE TOP                         ; 0 (bit 1) --> ENABLE TOP (not active)
| CBUS --> IBUS
| IBUS --> RBUS
| RBUS --> OBUS
| OBUS --> BRLSHFTR CNT REG               ; Shift count = 1
| XBUS --> DSS STATUS REG                 ; Set RDSS BUSY Flag
| INCR STACK PNTR                         ; Push return to poll loop (60)
| DISP [ FREGDAT(0) ]                     ; Dispatch if absolute
|-----------------------------------------
```
.+ 5234 ; 5235

.- 0020
```
|-----------------------------------------
| DATA = 1                                ; DATA = XXX X00 000 001
| DATA --> CBUS
| LOAD ENABLE TOP                         ; 0 (bit 1) --> ENABLE TOP (not active)
| CBUS --> IBUS
| IBUS --> RBUS
| RBUS --> OBUS
| OBUS --> BRLSHFTR CNT REG               ; Shift count = 1
| XBUS --> DSS STATUS REG                 ; Set RDSS BUSY Flag
| INCR STACK PNTR                         ; Push return to poll loop (60)
| DISP [ FREGDAT(0) ]                     ; Dispatch if absolute
|-----------------------------------------
```
.+ 5234 ; 5235

```
.- 0040
|----------------------------------
| DATA = 1                                ; DATA = XXX X00 000 001
| DATA --> CBUS
| LOAD ENABLE TOP                         ; 0 (bit 1) --> ENABLE TOP (not active)
| CBUS --> IBUS
| IBUS --> RBUS
| RBUS --> OBUS
| OBUS --> BRLSHFTR CNT REG               ; Shift count = 1
| XBUS --> DSS STATUS REG                 ; Set RDSS BUSY Flag
| INCR STACK PNTR                         ; Push return to poll loop (60)
| DISP [ FREGDAT(0) ]                     ; Dispatch if absolute
|----------------------------------
.+ 5234 ; 5235

; NOTE: Only states 5234,5235 and 5236,5246 are different from each other.
;       The remaining states in both the RELATIVE and ABSOLUTE paths are
;       the same.
;
; RELATIVE
;

.- 5234
|----------------------------------
| SIGN EXTENDED DBUS --> IBUS             ; FIFO --> IBUS
| PROC: RA17 .-. D --> RB1                ; old_y - y(end) from FIFO --> R1
| LOAD PREG                               ;                          --> PREG
| DATA = 300                              ; DATA = XXX XXX XXX X00
| DATA --> CBUS
| CBUS --> CONST PROM ADDR REG            ; Constant = 2 (.25)  for y/4
| CBUS(1-0) --> MDSEL                     ; MBUS SOURCE/DESTINATION (0)
|----------------------------------
.+ 5233

;                   *
; AM FT RND FA YM XM
;  ?  ?  ?   ?  ?  ?    In for y/4

.- 5233
|----------------------------------
| CONSTANT PROM --> RBUS
| RBUS --> OBUS
| OBUS --> MULT X REG                     ; CONSTANT PROM (2) --> MULT X REG
| PROC: 0 .OR. RA1 --> RB17               ; Update present position for Y
| DATA = 4                                ; DATA = XXX XXX 000 100
| DATA --> CBUS
| LOAD MULT CNTRL REG                     ; AM FT RND FA YM XM      for y/4
|                                         ;  0  0   0  1  0  0
| DISP [ *FIFO(0) ]                       ; waiting (hopefully not) for x(end)
|----------------------------------
.+ 5237 ; 5236

.- 5237
|----------------------------------
| DISP [ *DORFSH(1) ]                     ; should I do a refresh?
|----------------------------------
.+ 5233 ; 5231
```

```
.- 5231
|----------------------------------
| INCR STACK PNTR                    ; (Yes) go do refresh
|----------------------------------
.+ 5232

.- 5232
|----------------------------------
| DATA = 5233
| DATA --> CBUS
| PUSH CBUS ON STACK
|----------------------------------
.+ 0074

;           *    *
; AM FT RND FA YM XM
;  0  0  0  1  0  0    In for y/4

.- 5236
|----------------------------------
| PREG --> OBUS
| OBUS --> MULT Y REG                ; y(end) x 2 (shift left)
| DATA = 314                         ; DATA = XXX XXX XXX XXX
| DATA --> CBUS
| CBUS --> CONST PROM ADDR REG       ; Constant = CCCC for x/5
| SIGN EXTENDED DBUS --> IBUS        ; FIFO --> IBUS
| PROC: D .+. RA16 --> RB0           ; x(end) from FIFO + old_x --> R0
| LOAD PREG                          ;                          --> PREG
|----------------------------------
.+ 5210

;
; ABSOLUTE
;

.- 5235
|----------------------------------
| SIGN EXTENDED DBUS --> IBUS        ; FIFO --> IBUS
| PROC: RA15 .-. D --> RB1           ; y(end) from FIFO, offset --> R1
| LOAD PREG                          ;                          --> PREG
| DATA = 300                         ; DATA = XXX XXX XXX X00
| DATA --> CBUS
| CBUS --> CONST PROM ADDR REG       ; Constant = 2 (.25) for y/4
| CBUS(1-0) --> MDSEL                ; MBUS SOURCE/DESTINATION (0)
|----------------------------------
.+ 5243

;                *
; AM FT RND FA YM XM
;  ?  ?  ?  ?  ?  ?    In for y/4
```

```
.- 5243
|-----------------------------------
| CONSTANT PROM --> RBUS
| RBUS --> OBUS
| OBUS --> MULT X REG              ; CONSTANT PROM (2) --> MULT X REG
| PROC: 0 .OR. RA1 --> RB17        ; Update present position for Y
| DATA = 4                         ; DATA = XXX XXX 000 100
| DATA --> CBUS
| LOAD MULT CNTRL REG              ; AM FT RND FA YM XM    for y/4
|                                  ;  0  0   0  1  0  0
| DISP [ *FIFO(0) ]                ; waiting (hopefully not) for x(end)
|-----------------------------------
.+ 5247 ; 5246

.- 5247
|-----------------------------------
| DISP [ *DORFSH(1) ]              ; should I do a refresh?
|-----------------------------------
.+ 5243 ; 5241

.- 5241
|-----------------------------------
| INCR STACK PNTR                  ; (Yes) go do refresh
|-----------------------------------
.+ 5242

.- 5242
|-----------------------------------
| DATA = 5243
| DATA --> CBUS
| PUSH CBUS ON STACK
|-----------------------------------
.+ 0074

;           *       *
; AM FT RND FA YM XM
;  0  0   0  1  0  0    In for y/4

.- 5246
|-----------------------------------
| PREG --> OBUS
| OBUS --> MULT Y REG              ; y(end) x 2 (shift left)
| DATA = 314                       ; DATA = XXX XXX XXX XXX
| DATA --> CBUS
| CBUS --> CONST PROM ADDR REG     ; Constant = CCCC for x/5
| SIGN EXTENDED DBUS --> IBUS      ; FIFO --> IBUS
| PROC: D .+. RA14 --> RB0         ; x(end) from FIFO, offset --> R0
| LOAD PREG                        ;                          --> PREG
|-----------------------------------
.+ 5210

; MOVE ENTRY 2    ***********************************************************
; R0 = (x,end)
; R1 = (y,end)
```

```
.- 5050
|----------------------------------
| DATA = 1                                  ; DATA = XXX X00 000 001
| DATA --> CBUS
| LOAD ENABLE TOP                           ; 0 (bit 1) --> ENABLE TOP (not active)
| CBUS --> IBUS
| IBUS --> RBUS
| RBUS --> OBUS
| OBUS --> BRLSHFTR CNT REG                 ; Shift count = 1
| DISP [ FREGDAT(0) ]                       ; Dispatch if absolute
|----------------------------------
.+ 5202 ; 5203

; NOTE: Only states 5202,5203 and 5205,5207 are different from each other.
;       The remaining states in both the RELATIVE and ABSOLUTE paths are
;       the same.
;
; RELATIVE
;

.- 5202
|----------------------------------
| PROC: RA17 .-. RB1 --> B                  ; old_y - y(end) from R1 --> R1
| LOAD PREG                                 ;                          --> PREG
| DATA = 300                                ; DATA = XXX XXX XXX X00
        the same.
;
; RELATIVE
;

.- 5202
|----------------------------------
| PROC: RA17 .-. RB1 --> B                  ; old_y - y(end) from R1 --> R1
| LOAD PREG                                 ;                          --> PREG
| DATA = 300                                ; DATA = XXX XXX XXX X00
| DATA --> CBUS
| CBUS --> CONST PROM ADDR REG              ; Constant = 2 (.25) for y/4
| CBUS(1-0) --> MDSEL                       ; MBUS SOURCE/DESTINATION (0)
|----------------------------------
.+ 5204

;                  *
; AM FT RND FA YM XM
;  ?  ?  ?   ?  ?  ?   In for y/4

.- 5204
|----------------------------------
| CONSTANT PROM --> RBUS
| RBUS --> OBUS
| OBUS --> MULT X REG                       ; CONSTANT PROM (2) --> MULT X REG
| PROC: 0 .OR. RA1 --> RB17                 ; Update present position for Y
| DATA = 4                                  ; DATA = XXX XXX 000 100
| DATA --> CBUS
| LOAD MULT CNTRL REG                       ; AM FT RND FA YM XM     for y/4
|                                           ;  0  0   0  1  0  0
|----------------------------------
.+ 5205
```

```
;         *    *
; AM FT RND FA YM XM
;  0  0  0  1  0  0    In for y/4

.- 5205
|------------------------------------
| PREG --> OBUS
| OBUS --> MULT Y REG              ; y(end) x 2 (shift left)
| DATA = 314                       ; DATA = XXX XXX XXX XXX
| DATA --> CBUS
| CBUS --> CONST PROM ADDR REG     ; Constant = CCCC for x/5
| PROC: RA16 .+. RB0 --> B         ; x(end) from R0 + old_x --> R0
| LOAD PREG                        ;                          --> PREG
|------------------------------------
.+ 5210

;
; ABSOLUTE
;

.- 5203
|------------------------------------
| PROC: RA15 .-. RB1 --> B         ; y(end) from R1, offset --> R1
| LOAD PREG                        ;                         --> PREG
| DATA = 300                       ; DATA = XXX XXX XXX X00
| DATA --> CBUS
| CBUS --> CONST PROM ADDR REG     ; Constant = 2 (.25) for y/4
| CBUS(1-0) --> MDSEL              ; MBUS SOURCE/DESTINATION (0)
|------------------------------------
.+ 5206

;              *
; AM FT RND FA YM XM
;  ?  ?  ?  ?  ?  ?    In for y/4

.- 5206
|------------------------------------
| CONSTANT PROM --> RBUS
| RBUS --> OBUS
| OBUS --> MULT X REG              ; CONSTANT PROM (2) --> MULT X REG
| PROC: 0 .OR. RA1 --> RB17        ; Update present position for Y
| DATA = 4                         ; DATA = XXX XXX 000 100
| DATA --> CBUS
| LOAD MULT CNTRL REG              ; AM FT RND FA YM XM      for y/4
|                                  ;  0  0  0  1  0  0
|------------------------------------
.+ 5207

;         *    *
; AM FT RND FA YM XM
;  0  0  0  1  0  0    In for y/4
```

.- 5207
```
|----------------------------------
| PREG --> OBUS
| OBUS --> MULT Y REG              ; y(end) x 2 (shift left)
| DATA = 314                       ; DATA = XXX XXX XXX XXX
| DATA --> CBUS
| CBUS --> CONST PROM ADDR REG     ; Constant = CCCC for x/5
| PROC: RA14 .+. RB0 --> B         ; x(end) from R0, offset --> R0
| LOAD PREG                        ;                         --> PREG
|----------------------------------
```
.+ 5210

; MOVE ENTRY CONVERGE  ************************************************

; Multiplier MULTIPLYing!      y/4

.- 5210
```
|----------------------------------
| PREG --> OBUS
| OBUS --> BRLSHFTR REG            ; Shift x(end) left by 1.
| LOAD MULT P REG                  ; Save result of multiplication y/4
| PROC: 0 .OR. RA0 --> RB16        ; Update present position for X
| DATA = 14                        ; DATA = XXX XXX 001 100
| DATA --> CBUS
| LOAD MULT CNTRL REG              ; AM FT RND FA YM XM   for x/5
|                                  ;  0  0   1  1  0  0
|----------------------------------
```
.+ 5211

;          *    *    *
; AM FT RND FA YM XM
;  0  0   1  1  0  0    In for x/5

.- 5211
```
|----------------------------------
| BEGEND TOGGLE                    ; INTEGER RAM address = 1 (y,end)
| BRLSHFTR OUT REG --> IBUS
| IBUS --> MBUS
| MBUS --> MULT Y REG              ; Numerator for x/5
| CONSTANT PROM --> RBUS
| RBUS --> OBUS
| OBUS --> MULT X REG              ; CONSTANT PROM = CCCC for x/5
|----------------------------------
```
.+ 5212

; Multiplier MULTIPLYing!      x/5

.- 5212
```
|----------------------------------
| MULT LS PROD --> MBUS
| MBUS --> INTEGER RAM, Y FRACTION REG ; Save y/4 result
| LOAD MULT P REG                      ; Save result of multiplication x/5
| DATA = 4                             ; DATA = XXX XXX XXX 100
| DATA --> CBUS
| CBUS(2-0) --> INTEGER RAM ADDR REG   ; INTEGER RAM address = 0 (x,end)
|----------------------------------
```
.+ 5213

```
.- 5213
|----------------------------------
| MULT MS PROD --> MBUS
| MBUS --> INTEGER RAM, X FRACTION REG  ; Save x/5 result
| DATA = 5                              ; DATA = XXX XXX XXX 101
| DATA --> CBUS
| CBUS(2-0) --> INTEGER RAM ADDR REG    ; INTEGER RAM address = 1 (y,end)
| POP UNCOND
|----------------------------------
.+ 5213
```

ATTACHMENT B

Intercept 2 array
 0.000000000000000E+00
 5.000000000000000E-01
 1.000000000000000E+00
 1.500000000000000E+00
 2.000000000000000E+00
 2.500000000000000E+00
 3.000000000000000E+00
 3.500000000000000E+00
 4.000000000000000E+00
 4.500000000000000E+00
 5.000000000000000E+00
 5.500000000000000E+00
 6.000000000000000E+00
 6.500000000000000E+00
 7.000000000000000E+00
 7.500000000000000E+00
-8.000000000000000E+00
-7.500000000000000E+00
-7.000000000000000E+00
-6.500000000000000E+00
-6.000000000000000E+00
-5.500000000000000E+00
-5.000000000000000E+00
-4.500000000000000E+00
-4.000000000000000E+00
-3.500000000000000E+00
-3.000000000000000E+00
-2.500000000000000E+00
-2.000000000000000E+00
-1.500000000000000E+00
-1.000000000000000E+00
-5.000000000000000E-01

Intercept 1 array
 0.000000000000000E+00
 5.000000000000000E-01
 1.000000000000000E+00
 1.500000000000000E+00
 2.000000000000000E+00
 2.500000000000000E+00
 3.000000000000000E+00
 3.500000000000000E+00
 4.000000000000000E+00
 4.500000000000000E+00
 5.000000000000000E+00
 5.500000000000000E+00
 6.000000000000000E+00
 6.500000000000000E+00
 7.000000000000000E+00
 7.500000000000000E+00

```
PROGRAM pixel_prom (OUTPUT,INPUT,prom_list);

{
For Apollo Domain - Pascal Language
This program generates the values for the Vector Processor Pixel Prom.
}

TYPE axis         = (X,Y) ;
    polarity     = (POS,NEG);
```

```
  il_var, i2_var                     : DOUBLE ;
  il_ppi, i2_ppi, emv                : DOUBLE ;

p                                  : ARRAY [1..2,1..5,1..4] OF INTEGER16 ;

i2_array                           : ARRAY [1..32] OF DOUBLE;
  il_array                           : ARRAY [1..16] OF DOUBLE;

k, l, prom_addr                    : INTEGER16;

prom                               : TEXT;

{ parameter register bits ----------------------------------------------- } up                                 : INTEGER16 ;
  slope_pr,s                         : polarity ;
  major_pr,m                         : axis ;

{ ************************************************************************ }

PROCEDURE pixel_prom;

{ entry : i2_ppi      - pixel prom address bits 0-4
          il_ppi      - pixel prom address bits 5-8
                        (positive input, actually a negative value)
          up (up = 0) - pixel prom address bit 9
          slope_pr    - pixel prom address bit 10
          major_pr    - pixel prom address bit 11 exit  : p[1,1..5,1..4]
}
LABEL 34,88,99;

VAR maj_matrix_max_pp, min_matrix_max_pp,
  maj_point_pp, min_point_pp,
  major_cnt,
  i,j                                           : INTEGER32 ;

slope_pp, intercept1_pp, intercept2_pp,
  e_pp                                          : DOUBLE ;

BEGIN intercept1_pp   := il_ppi - 8;
  intercept2_pp   := i2_ppi;

FOR i := 1 TO 5 DO
    FOR j := 1 TO 4 DO
      p[1,i,j] := 1 ;
```

```
{ Regenerate needed parameters from given parameters ------------------ }

IF (major_pr = X) THEN
    BEGIN
      maj_matrix_max_pp := 4 ;          { x axis ranges from 0 to 4 }
      min_matrix_max_pp := 3 ;          { y axis ranges from 0 to 3 }
      maj_point_pp      := 0 ;          { start on left side of major axis }
      intercept1_pp := intercept1_pp + 3.5 ;
      intercept2_pp := intercept2_pp + 3.5 ;
    END;

IF (major_pr = Y) THEN
    BEGIN
      maj_matrix_max_pp := 3 ;          { y axis ranges from 0 to 3 }
      min_matrix_max_pp := 4 ;          { x axis ranges from 0 to 4 }
      maj_point_pp      := 0 ;          { start on left side of major axis }
      intercept1_pp := intercept1_pp + 4.5 ;
      intercept2_pp := intercept2_pp + 4.5 ;
    END;

IF (up = 0) THEN intercept1_pp := intercept1_pp - min_matrix_max_pp - 1;

slope_pp := (intercept2_pp - intercept1_pp) / (maj_matrix_max_pp + 1) ;

IF (intercept1_pp >= 0) THEN min_point_pp := TRUNC(intercept1_pp);
  IF (intercept1_pp <  0) THEN min_point_pp := TRUNC(intercept1_pp) - 1;

e_pp :=  intercept1_pp - min_point_pp ;

major_cnt := 0 ;

{ Adjust minor point ------------------------------------------------------ }

88:

IF (e_pp >= 0.5) THEN
    BEGIN
      min_point_pp := min_point_pp + 1;
      e_pp := e_pp - 1;
    END;

{ If done or not in matrix, don't plot points ---------------------------- }

IF (min_point_pp < 0) THEN GOTO 34;
  IF (min_point_pp > min_matrix_max_pp) THEN GOTO 99;
  IF (maj_point_pp > maj_matrix_max_pp) THEN GOTO 99;
{ Plot points ------------------------------------------------------------ }
{ This is used if drawing in positive Y +++++++++++++++++++++++++++++++++++}

IF ((major_pr = X) AND (slope_pr = POS)) THEN
    p[1, (maj_point_pp + 1) , (min_point_pp + 1)] := 0 ;

IF ((major_pr = Y) AND (slope_pr = POS)) THEN
    p[1, (min_point_pp + 1) , (maj_point_pp + 1)] := 0 ;

IF ((major_pr = X) AND (slope_pr = NEG)) THEN
    p[1, (4 - maj_point_pp + 1) , (min_point_pp + 1)] := 0 ;
```

```
    IF ((major_pr = Y) AND (slope_pr = NEG)) THEN
      p[1, (4 - min_point_pp + 1) , (maj_point_pp + 1)] := 0 ;

{ Adjust major point ------------------------------------------------- }

34:

major_cnt := major_cnt + 1;
  IF (major_cnt > maj_matrix_max_pp ) THEN GOTO 99;
  maj_point_pp := maj_point_pp + 1;

{ Get new e ---------------------------------------------------------- } e_pp  := e_pp + abs(slope_pp);
  GOTO 88;

99:

FOR i := 1 TO 5 DO
    BEGIN
      WRITE (prom,prom_addr:5,major_pr:4,slope_pr:7);
      IF up = 0 THEN
        WRITE (prom,'    UP');
      IF up = 1 THEN
        WRITE (prom,'    OVER');
      WRITE (prom,il_ppi:7:1,i2_ppi:6:1);
      WRITE (prom,' ');
      FOR j := 1 TO 4 DO
        WRITE (prom,p[1,i,j]:2);
      WRITELN (prom);
    END;
    WRITELN (prom);

END;

{ ***************************************************************** }

BEGIN {main program}

OPEN (prom,'prom_list','unknown');
  REWRITE (prom);

WRITELN (prom,'Intercept 2 array');
  gen_i2_array;                              {Set up i2 array}
  WRITELN (prom,'Intercept 1 array');
  gen_il_array;                              {Set up il array}

WRITE (prom,' Addr Major Slope Over/Up');
  WRITE (prom,'  Int1  Int2');
  WRITE (prom,'  0 1 2 3');
  WRITELN (prom);

prom_addr := 0;
```

```
major_pr   := Y;
slope_pr   := POS;
up         := 0;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;

major_pr   := Y;
slope_pr   := POS;
up         := 1;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;

major_pr   := Y;
slope_pr   := NEG;
up         := 0;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;

major_pr   := Y;
slope_pr   := NEG;
up         := 1;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;
```

```
major_pr  := X;
slope_pr  := POS;
up        := 0;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;

major_pr  := X;
slope_pr  := POS;
up        := 1;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;

major_pr  := X;
slope_pr  := NEG;
up        := 0;

FOR k := 1 to 16 DO
   BEGIN
      il_ppi := il_array[k];
      FOR l := 1 to 32 DO
         BEGIN
            i2_ppi := i2_array[l];
            pixel_prom;
            prom_addr := prom_addr + 1;
         END;
   END;

major_pr  := X;
slope_pr  := NEG;
up        := 1;

FOR k := 1 to 16 DO
   BEGIN
      il_ppi := il_array[k];
      FOR l := 1 to 32 DO
         BEGIN
            i2_ppi := i2_array[l];
            pixel_prom;
```

```
        prom_addr := prom_addr + 1;
      END;
   END;

CLOSE (prom);

END.

EXAMPLE OF INPUTS TO & OUTPUTS FROM PIXEL_PROM PROGRAM
```

| Addr | Major | Slope | Over/Up | Int1 | Int2 | 0 | 1 | 2 | 3 |
|------|-------|-------|---------|------|------|---|---|---|---|
| 0 | Y | POS | UP | 0.0 | 0.0 | 1 | 1 | 1 | 1 |
| 0 | Y | POS | UP | 0.0 | 0.0 | 1 | 1 | 1 | 1 |
| 0 | Y | POS | UP | 0.0 | 0.0 | 1 | 1 | 1 | 1 |
| 0 | Y | POS | UP | 0.0 | 0.0 | 1 | 1 | 1 | 1 |
| 0 | Y | POS | UP | 0.0 | 0.0 | 1 | 1 | 1 | 1 |
| 1 | Y | POS | UP | 0.0 | 0.5 | 1 | 1 | 1 | 1 |
| 1 | Y | POS | UP | 0.0 | 0.5 | 1 | 1 | 1 | 1 |
| 1 | Y | POS | UP | 0.0 | 0.5 | 1 | 1 | 1 | 1 |
| 1 | Y | POS | UP | 0.0 | 0.5 | 1 | 1 | 1 | 1 |
| 1 | Y | POS | UP | 0.0 | 0.5 | 1 | 1 | 1 | 1 |
| 2 | Y | POS | UP | 0.0 | 1.0 | 1 | 1 | 1 | 1 |
| 2 | Y | POS | UP | 0.0 | 1.0 | 1 | 1 | 1 | 1 |
| 2 | Y | POS | UP | 0.0 | 1.0 | 1 | 1 | 1 | 1 |
| 2 | Y | POS | UP | 0.0 | 1.0 | 1 | 1 | 1 | 1 |
| 2 | Y | POS | UP | 0.0 | 1.0 | 1 | 1 | 1 | 1 |
| 3 | Y | POS | UP | 0.0 | 1.5 | 1 | 1 | 1 | 1 |
| 3 | Y | POS | UP | 0.0 | 1.5 | 1 | 1 | 1 | 1 |
| 3 | Y | POS | UP | 0.0 | 1.5 | 1 | 1 | 1 | 1 |
| 3 | Y | POS | UP | 0.0 | 1.5 | 1 | 1 | 1 | 1 |
| 3 | Y | POS | UP | 0.0 | 1.5 | 1 | 1 | 1 | 1 |
| 4 | Y | POS | UP | 0.0 | 2.0 | 1 | 1 | 1 | 1 |
| 4 | Y | POS | UP | 0.0 | 2.0 | 1 | 1 | 1 | 1 |
| 4 | Y | POS | UP | 0.0 | 2.0 | 1 | 1 | 1 | 1 |
| 4 | Y | POS | UP | 0.0 | 2.0 | 1 | 1 | 1 | 1 |
| 4 | Y | POS | UP | 0.0 | 2.0 | 1 | 1 | 1 | 1 |
| 5 | Y | POS | UP | 0.0 | 2.5 | 1 | 1 | 1 | 1 |
| 5 | Y | POS | UP | 0.0 | 2.5 | 1 | 1 | 1 | 1 |
| 5 | Y | POS | UP | 0.0 | 2.5 | 1 | 1 | 1 | 1 |
| 5 | Y | POS | UP | 0.0 | 2.5 | 1 | 1 | 1 | 1 |
| 5 | Y | POS | UP | 0.0 | 2.5 | 1 | 1 | 1 | 1 |
| 6 | Y | POS | UP | 0.0 | 3.0 | 1 | 1 | 1 | 1 |
| 6 | Y | POS | UP | 0.0 | 3.0 | 1 | 1 | 1 | 1 |
| 6 | Y | POS | UP | 0.0 | 3.0 | 1 | 1 | 1 | 1 |
| 6 | Y | POS | UP | 0.0 | 3.0 | 1 | 1 | 1 | 1 |
| 6 | Y | POS | UP | 0.0 | 3.0 | 1 | 1 | 1 | 1 |
| 7 | Y | POS | UP | 0.0 | 3.5 | 1 | 1 | 1 | 1 |
| 7 | Y | POS | UP | 0.0 | 3.5 | 1 | 1 | 1 | 1 |
| 7 | Y | POS | UP | 0.0 | 3.5 | 1 | 1 | 1 | 1 |
| 7 | Y | POS | UP | 0.0 | 3.5 | 1 | 1 | 1 | 1 |

| | | | | | | | | | |
|---|---|---|---|---|---|---|---|---|---|
| 825 | Y | POS | OVER | 4.5 | -3.5 | 1 | 1 | 1 | 1 |
| 825 | Y | POS | OVER | 4.5 | -3.5 | 0 | 0 | 0 | 0 |
| 825 | Y | POS | OVER | 4.5 | -3.5 | 1 | 1 | 1 | 1 |
| 825 | Y | POS | OVER | 4.5 | -3.5 | 1 | 1 | 1 | 1 |
| 825 | Y | POS | OVER | 4.5 | -3.5 | 1 | 1 | 1 | 1 |
| 826 | Y | POS | OVER | 4.5 | -3.0 | 1 | 1 | 1 | 1 |
| 826 | Y | POS | OVER | 4.5 | -3.0 | 0 | 0 | 0 | 0 |
| 826 | Y | POS | OVER | 4.5 | -3.0 | 1 | 1 | 1 | 1 |
| 826 | Y | POS | OVER | 4.5 | -3.0 | 1 | 1 | 1 | 1 |
| 826 | Y | POS | OVER | 4.5 | -3.0 | 1 | 1 | 1 | 1 |
| 827 | Y | POS | OVER | 4.5 | -2.5 | 1 | 1 | 1 | 1 |
| 827 | Y | POS | OVER | 4.5 | -2.5 | 0 | 0 | 1 | 1 |
| 827 | Y | POS | OVER | 4.5 | -2.5 | 1 | 1 | 0 | 0 |
| 827 | Y | POS | OVER | 4.5 | -2.5 | 1 | 1 | 1 | 1 |
| 827 | Y | POS | OVER | 4.5 | -2.5 | 1 | 1 | 1 | 1 |
| 828 | Y | POS | OVER | 4.5 | -2.0 | 1 | 1 | 1 | 1 |
| 828 | Y | POS | OVER | 4.5 | -2.0 | 0 | 0 | 1 | 1 |
| 828 | Y | POS | OVER | 4.5 | -2.0 | 1 | 1 | 0 | 0 |
| 828 | Y | POS | OVER | 4.5 | -2.0 | 1 | 1 | 1 | 1 |
| 828 | Y | POS | OVER | 4.5 | -2.0 | 1 | 1 | 1 | 1 |
| 829 | Y | POS | OVER | 4.5 | -1.5 | 1 | 1 | 1 | 1 |
| 829 | Y | POS | OVER | 4.5 | -1.5 | 0 | 1 | 1 | 1 |
| 829 | Y | POS | OVER | 4.5 | -1.5 | 1 | 0 | 0 | 1 |
| 829 | Y | POS | OVER | 4.5 | -1.5 | 1 | 1 | 1 | 0 |
| 829 | Y | POS | OVER | 4.5 | -1.5 | 1 | 1 | 1 | 1 |
| 830 | Y | POS | OVER | 4.5 | -1.0 | 1 | 1 | 1 | 1 |
| 830 | Y | POS | OVER | 4.5 | -1.0 | 0 | 1 | 1 | 1 |
| 830 | Y | POS | OVER | 4.5 | -1.0 | 1 | 0 | 0 | 1 |
| 830 | Y | POS | OVER | 4.5 | -1.0 | 1 | 1 | 1 | 0 |
| 830 | Y | POS | OVER | 4.5 | -1.0 | 1 | 1 | 1 | 1 |
| 831 | Y | POS | OVER | 4.5 | -0.5 | 1 | 1 | 1 | 1 |
| 831 | Y | POS | OVER | 4.5 | -0.5 | 0 | 1 | 1 | 1 |
| 831 | Y | POS | OVER | 4.5 | -0.5 | 1 | 0 | 1 | 1 |
| 831 | Y | POS | OVER | 4.5 | -0.5 | 1 | 1 | 0 | 0 |
| 831 | Y | POS | OVER | 4.5 | -0.5 | 1 | 1 | 1 | 1 |
| 832 | Y | POS | OVER | 5.0 | 0.0 | 1 | 1 | 1 | 1 |
| 832 | Y | POS | OVER | 5.0 | 0.0 | 1 | 1 | 1 | 1 |
| 832 | Y | POS | OVER | 5.0 | 0.0 | 0 | 0 | 1 | 1 |
| 832 | Y | POS | OVER | 5.0 | 0.0 | 1 | 1 | 0 | 1 |
| 832 | Y | POS | OVER | 5.0 | 0.0 | 1 | 1 | 1 | 0 |
| . | | | | | | | | | |
| . | | | | | | | | | |
| . | | | | | | | | | |
| 4092 | X | NEG | OVER | 7.5 | -2.0 | 1 | 1 | 1 | 1 |
| 4092 | X | NEG | OVER | 7.5 | -2.0 | 1 | 1 | 1 | 1 |
| 4092 | X | NEG | OVER | 7.5 | -2.0 | 1 | 1 | 1 | 1 |
| 4092 | X | NEG | OVER | 7.5 | -2.0 | 1 | 1 | 1 | 0 |
| 4092 | X | NEG | OVER | 7.5 | -2.0 | 1 | 1 | 1 | 0 |

| | | | | | | | | | |
|---|---|---|---|---|---|---|---|---|---|
| 4093 | X | NEG | OVER | 7.5 | -1.5 | 1 | 1 | 1 | 1 |
| 4093 | X | NEG | OVER | 7.5 | -1.5 | 1 | 1 | 1 | 1 |
| 4093 | X | NEG | OVER | 7.5 | -1.5 | 1 | 1 | 1 | 0 |
| 4093 | X | NEG | OVER | 7.5 | -1.5 | 1 | 1 | 1 | 0 |
| 4093 | X | NEG | OVER | 7.5 | -1.5 | 1 | 1 | 1 | 0 |
| 4094 | X | NEG | OVER | 7.5 | -1.0 | 1 | 1 | 1 | 0 |
| 4094 | X | NEG | OVER | 7.5 | -1.0 | 1 | 1 | 1 | 0 |
| 4094 | X | NEG | OVER | 7.5 | -1.0 | 1 | 1 | 1 | 0 |
| 4094 | X | NEG | OVER | 7.5 | -1.0 | 1 | 1 | 1 | 0 |
| 4094 | X | NEG | OVER | 7.5 | -1.0 | 1 | 1 | 1 | 0 |
| 4095 | X | NEG | OVER | 7.5 | -0.5 | 1 | 1 | 1 | 0 |
| 4095 | X | NEG | OVER | 7.5 | -0.5 | 1 | 1 | 1 | 0 |
| 4095 | X | NEG | OVER | 7.5 | -0.5 | 1 | 1 | 1 | 0 |
| 4095 | X | NEG | OVER | 7.5 | -0.5 | 1 | 1 | 1 | 0 |
| 4095 | X | NEG | OVER | 7.5 | -0.5 | 1 | 1 | 1 | 0 |

What is claimed is:

1. Apparatus for vector to pixel conversion to draw a vector on a display screen having pixels thereon extending in both x and y coordinate directions, said vector having directional characteristics indicating the direction thereof, comprising:
- means for dividing all of said pixels on said screen into a fixed array of matrices, each said matrix having a size defined by a given number of pixels in said x coordinate direction and by a selected number of pixels in said y coordinate direction, a first pixel of said vector being inside a first of said matrices and a last pixel of said vector being inside a last one of said matrices;
- means for defining the location of first and second decision points within each of said matrices of said display screen;
- first means for generating an exit intersection signal representing the location of an intersection of said vector with an exit side of each current matrix through which said vector extends before extending into a next matrix following each said current matrix;
- next matrix means responsive to said exit intersection signal and certain of said directional characteristics for generating a next matrix signal to identify which of said matrices in said fixed array is the next matrix with respect to a given current matrix, said next matrix signal being generated according to the location of said intersection relative to said first and second decision points; and
- matrix address means initially being effective for generating a matrix address signal for a current matrix, said matrix address means being responsive to said next matrix signals for changing said matrix address signal to that of the matrix address of each said next matrix through which said vector extends.

2. Apparatus according to claim 1, further comprising:
- means for counting the number of said matrices in the respective x and y coordinate directions through which said vector extends, said counting means being responsive to said next matrix signals that indicate next matrices in said x, y or both said x and y coordinate directions such that when said next matrix is said last matrix a vector end signal is generated; and
- the operation of said next matrix means is interrupted in response to said vector end signal.

3. Apparatus according to claim 1, in which:
- said first and second decision points are located on opposite sides of a selected pixel in each of said matrices and at the same x or y coordinate location within said selected pixel;
- said first means is effective to generate a first exit intersection signal for representing the location of said intersection of said vector with said exit side of a current matrix as being on the negative y side of said first decision point, said first means being effective to generate a second exit intersection signal representing the location of said intersection of said vector with said exit side of said current matrix as being on the positive y side of said second decision point, wherein said vector does not extend between said first and second decision points of said current matrix said first means being effective to generate a third exit intersection signal for representing the location of said intersection of said vector with said exit side of said current matrix as being on the positive y side of said second decision point wherein said vector does extend between said first and second decision points of said current matrix;
- said next matrix means is responsive to said first exit intersection signal for generating a next matrix signal identifying the matrix in the positive x coordinate direction as the next matrix relative to said current matrix;
- said next matrix means is responsive to said second exit intersection signal for generating a next matrix signal identifying the matrix in the positive y coordinate direction as the next matrix relative to said current matrix; and
- said next matrix means is responsive to said third exit intersection signal for generating a next matrix signal identifying the matrix that is in both said positive x and y coordinate directions as the next matrix relative to said current matrix.

4. Apparatus according to claim 2, further comprising:

said exit side of each said current matrix is the side through which said vector exits said current matrix as it extends into said next matrix;

said vector or an extension thereof also intersects an entrance side of each said current matrix through which said vector enters each said current matrix as it extends into each said current matrix;

second means for generating an entrance intersection signal representing the location of the intersection of said vector with said entrance side of said current matrix; and means responsive to said entrance and exit intersection signals and said certain directional characteristics for generating enabling signals for such pixels within a given current matrix as must be enabled so as to draw said vector on said display screen.

5. Apparatus according to claim 4, further comprising:

said vector starts or ends at a respective first or last pixel that is spaced from both said entrance side and said exit side of said respective first or last matrices; and means responsive to said enabling signals and to said vector end signals for masking those enabled pixels that are not at or between said first and last pixels in said first or last matrices so that said pixels that are masked are not drawn on said display screen.

6. Apparatus according to claim 4, further comprising:

means for storing said enabling signals for each said current matrix, said storing means being effective to store, at a selected storage address, said enabling signal that corresponds to a pixel that is at a given location in one of said matrices, said storing means being effective to store, at a different storage address, said enabling signal that corresponds to a pixel that is at said given location in a different one of said matrices; and means for adjusting said enabling signals according to the storage address relationship of said enabled pixels so that said vector is drawn on said display screen independently of the storage address relationships of said enabled pixels in said storing means.

7. Apparatus for vector to pixel conversion in which each pixel of a display screen is organized into one of a plurality of separate matrices each having a given number of pixels in an x coordinate direction and a selected number of pixels in a y coordinate direction, each said matrix being located on said screen at a fixed location relative to all other ones of said matrices, such conversion defining which pixels must be "on" in order to draw a first vector from a first pixel to a last pixel on said screen, a current matrix being one of such matrices during such conversion thereof, a matrix prior to said current matrix being one of said matrices that is adjacent said current matrix in a direction toward said first pixel, an exit side of one of said matrices being a side of said matrix that is intersected by said vector as said vector extends from said current matrix to a next matrix, each said matrix having a first decision point located therein at a selected location, comprising:

means responsive to first input signals defining the x and y coordinates of the first pixel of said vector for producing X and Y matrix address signals that define the respective X and Y matrix addresses of a first matrix that contains said first pixel of said vector;

said producing means also being responsive to said first input signals and second input signals defining the x and y coordinates of said last pixel for producing delta X and delta Y signals indicating how many matrices in each of the x and y coordinate directions there are from said first matrix to a last matrix that contains said last pixel;

said producing means also being responsive to said first and second input signals for producing a first directional signal representing a first directional characteristic of said vector and a first intercept signal representing the intersection of said vector with the exit side of the matrix prior to said current matrix;

said producing means also being responsive to said first and second input signals for producing a major signal representing a second directional characteristic of said vector;

current address means responsive to said matrix address signals for generating current matrix address signals to indicate the address of said current matrix;

next matrix means responsive to said first intercept signal for generating a second intercept signal representing the relationship of said first decision point to the location at which said vector exits said current matrix, said next matrix means also being responsive to said first intercept signal and to said first directional signal for generating next matrix signals that indicate the direction of the next matrix through which said vector extends, said direction being one of the x coordinate direction or the y coordinate direction or both of said x and y coordinate directions;

said current address means being responsive to said next matrix signals to change said current matrix address signals to the address of said next matrix;

counter means responsive to said delta X and delta Y signals and cycled in response to said next matrix signals for producing vector end signals indicating said first and last matrices;

said next matrix means being interrupted in response to one of said vector end signals that indicates that said current matrix is said last matrix;

means responsive to said first intercept signal for said matrix prior to said current matrix for generating a third intercept signal representing the intersection of said vector with an entrance side of said current matrix through which said vector enters said current matrix;

means responsive to the sign of said first directional signal, to said first and third intercept signals and to said major signal for generating pixel write enable signals that define these pixels within said current matrix that are to be "on" to draw said vector; and means responsive to said current matrix address signal for said current matrix and responsive to said pixel write enable signal for said current matrix for storing, at an address related to said matrix address, data representing said "on" pixels of each said current matrix through which said vector extends.

8. Apparatus according to claim 7 for vector to pixel conversion, in which said vector extends across only part of at least one of said first matrix or said last matrix, further comprising:

said producing means divides the x and y coordinate locations of said first and last pixels of said vector by the number of pixels in the respective x and y coordinate directions that are in each said matrix to produce remainder signals indicating the location of said first and last pixels in said respective first matrix and said last matrix;

means responsive to said sign of said first directional signal, to said vector end signal, to said second intercept signal and to said remainder signals for generating a mask enable signal for only those pixels in said first or last matrix that are at or between said first pixel and said last pixel of said first vector; and means responsive to said mask enable signals for modifying said pixel write enable signals to prevent the writing to said storage means of write enable signals for such pixels in said first and last matrices as are not at or between said first pixel and said last pixel of said vector.

9. Apparatus according to claim 8, in which:

different ones of said matrices have different storage address relationships between a given pixel in a selected location in one of said different matrices and the location in which said write enable data for said given pixel is stored in said storage means;

means are provided for producing matrix type signals according to said storage address relationship of said matrices; and said modifying means also responds to said matrix type signals for modifying said pixel write enable signals according to said storage address relationship.

10. Apparatus according to claim 7, in which:

said first and second input signals are in a selected order to indicate which represents said first pixel and said last pixel of said vector, but said first and second input signals are not ordered in respect to which represents a selected end of said vector;

said producing means is effective to identify said selected end of said vector and produce a top flag signal; and said current address means is also responsive to said top flag signal so that one of said current matrix address signals is for said matrix that contains said selected end of said vector.

11. Apparatus according to claim 7, wherein a second vector is drawn after drawing said first vector from said first pixel to said last pixel, said second vector starting at said last pixel and continuing to a third pixel, in which:

said current addrress means is rendered effective, upon processing of said pixels of said first vector in said last matrix, to identify the matrix address of said last matrix as the matrix address of a first matrix of said second vector.

12. Apparatus according to claim 11, in which:

said first and second input signals are in a selected order to indicate which represents said first pixel and said last pixel of said vectors, but said first and second input signals may not be ordered in respect to which represents a selected end of said vector;

said producing means is effective to identify said selected end of said vector and produce a top flag signal;

said current address means is also responsive to said top flag signal so that one of said current matrix address signals is for said matrix that contains said selected end of said vector; and said current address means identifies said first matrix of said second vector in response to said top flag signal.

13. Apparatus according to claim 7, in which:

said first vector is either an x major vector in which the path of said first vector from said first pixel to said last pixel always requires an increment of one whole pixel in the x direction and may require an increment of one whole pixel in the y direction, or a y major vector in which the path of said first vector from said first pixel to said last pixel always requires an increment of one whole pixel in the y direction and may require an increment of one whole pixel in the x direction;

said producing means is also effective to subtract said delta X signal from said delta Y signal for generating an x major flag signal corresponding to delta X being larger than delta Y and a y major flag signal corresponding to delta Y being larger than delta X; and said pixel write enable signal generating means is also responsive to said x and y major flag signals.

14. Apparatus according to claim 7, in which:

said next matrix signal separately indicates a next matrix in the x coordinate direction or in the y coordinate direction or indicates a diagonal next matrix in both the x and y coordinate directions; and said current address means includes separate counters for each of said X and Y matrix addresses, wherein each such counter is respectively separately responsive to said next matrix signals indicating a next matrix in one or both of the x coordinate direction and the y coordinate direction such that said current matrix address signals are separately varied to indicate the X and Y matrix addresses of said next matrix.

15. A method of converting a vector to pixel enable data for displaying said vector on a display screen having pixels extending in x and y coordinate directions, said vector being defined by a first pixel having a first x and y coordinate address on said screen and by a last pixel having a last x and y coordinate address, said vector having a directional characteristic, which comprises:

organizing all of said pixels on said screen into selected separate matrices, each said matrix being at a different fixed location on said display screen and having a given number of pixels in said x coordinate direction and a selected number of pixels in said y coordinate direction;

converting said x,y coordinates of said first pixel that defines one end of said vector into matrix coordinates that define the location of a first matrix in which said first pixel is located;

determining first and second quantities equal respectively to the number of said matrices in each of said x and y coordinate directions that are between said first matrix and a last matrix in which said last pixel is located, said last pixel defining the end of said vector;

determining the locations of said vector with respect to opposite sides of a given pixel in a current one of said matrices as said vector extends from said current matrix into a next matrix;

identifying the direction of said next matrix through which said vector extends upon exiting said current matrix according to said locations of said vector relative to decision points positioned at a predetermined location on each of said opposite sides of said given pixel;

reducing said first quantity by one if said next matrix is in said x coordinate direction and reducing said second quantity by one if said next matrix is in said y coordinate direction; and for each matrix through which said vector extends, defining which pixels are to be enabled in order to display said vector.

16. The method according to claim 15, in which:
said second determining step and said identifying step are repeated until said reducing step results in said first and second quantities in respect to both said x and y coordinate directions being zero.

17. The method according to claim 16, wherein said vector extends across only part of at least one of said first matrix and said last matrix, in which:
said step of determining said first and second quantities is performed for said matrix through which said vector partially extends by multiplying the x coordinate value of said first or last pixel by the reciprocal of the number of pixels in the x coordinate direction in said matrix and by multiplying the y coordinate value of said first or last pixel by the reciprocal of the number of pixels in the y coordinate direction in said matrix, to obtain said first and second quantities equal to an integer number of matrices in each said respective x and y coordinate direction and a remaining number of pixels, if any, in each of said x and y coordinate directions, said remaining number of pixels identifying the x and y coordinate addresses of said first or last pixel within said matrix; and masking said enabled pixels that are in said matrix beyond said first or last pixel to define said vector by enabling only those pixels that are at or between said first and last pixels.

18. A method according to claim 15, including:
identifying which of said first and last pixels is closest to a selected side of said display screen; and
identifying as said first matrix the matrix in which said closest pixel is contained so that said vector is drawn from said selected side of said display screen.

* * * * *